US009772116B2

(12) United States Patent
Hester et al.

(10) Patent No.: US 9,772,116 B2
(45) Date of Patent: *Sep. 26, 2017

(54) ENHANCED AUTOMATED CONTROL SCHEDULING

(71) Applicant: Google Inc., Mountain View, CA (US)

(72) Inventors: Todd Andrew Hester, San Francisco, CA (US); Allen Joseph Minich, Mountain View, CA (US); George Alban Heitz, III, Mountain View, CA (US)

(73) Assignee: Google Inc., Mountain View, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 14/532,626

(22) Filed: Nov. 4, 2014

(65) Prior Publication Data

US 2016/0123619 A1  May 5, 2016

(51) Int. Cl.
*F24F 11/00* (2006.01)
*G05B 13/02* (2006.01)
*H04L 12/28* (2006.01)

(52) U.S. Cl.
CPC ........ *F24F 11/006* (2013.01); *F24F 11/0012* (2013.01); *F24F 11/0034* (2013.01);
(Continued)

(58) Field of Classification Search
CPC ............... G05B 13/0265; G05B 15/02; G05D 23/1904; F24F 11/006; F24F 11/0012; F24F 11/0034; H04L 12/2803; H04L 2012/285
See application file for complete search history.

(56) References Cited

U.S. PATENT DOCUMENTS 8,630,740 B2 * 1/2014 Matsuoka ........... H04L 12/2825
 700/12
9,417,637 B2 * 8/2016 Matsuoka .......... G05D 23/1904
(Continued)

OTHER PUBLICATIONS

International Search Report and Written Opinion for PCT Application No. PCT/US2015/058402 dated Dec. 18, 2015; 11 pgs.
(Continued)

*Primary Examiner* — Crystal J Barnes-Bullock
(74) *Attorney, Agent, or Firm* — Kilpatrick Townsend & Stockton LLP

(57) ABSTRACT

In an embodiment, an electronic device may include storage containing processor-executable instructions, a preference function that maps weights indicating likely user preferences for the range of values of a device setting in relation to a range of values of a variable, and a current automated device control schedule configured to control the device setting of the electronic device in relation to the variable, and a processor. The instructions may cause the processor to determine the current automated device control schedule based on the preference function by detecting user behavior that indicates satisfaction or dissatisfaction with values of the device setting in relation to the variable, updating the preference function based on the detected user behavior, and determining the current automated device control schedule by comparing a number of candidate device control schedules against the weights of the preference function and selecting the candidate with the highest score.

26 Claims, 26 Drawing Sheets

(52) U.S. Cl.
CPC ....... *G05B 13/028* (2013.01); *G05B 13/0265* (2013.01); *H04L 12/2803* (2013.01); *F24F 2011/0035* (2013.01); *F24F 2011/0036* (2013.01); *F24F 2011/0053* (2013.01); *F24F 2011/0063* (2013.01); *F24F 2011/0064* (2013.01); *F24F 2011/0068* (2013.01)

(56) References Cited

U.S. PATENT DOCUMENTS

| | | | |
|---|---|---|---|
| 9,459,018 B2* | 10/2016 | Fadell | F24F 11/0009 |
| 2013/0103622 A1 | 4/2013 | Matsuoka et al. | |
| 2013/0274928 A1 | 10/2013 | Matsuoka et al. | |
| 2014/0151456 A1* | 6/2014 | McCurnin | G05D 23/1905 236/51 |
| 2014/0316581 A1 | 10/2014 | Fadell et al. | |
| 2015/0168003 A1* | 6/2015 | Stefanski | F24F 11/0034 164/237 |
| 2016/0123618 A1* | 5/2016 | Hester | F24F 11/006 700/276 |
| 2016/0223218 A1* | 8/2016 | Barrett | F24F 11/006 |

OTHER PUBLICATIONS

International Search Report and Written Opinion of PCT/US2015/058410 mailed Dec. 18, 2015, all pages.

* cited by examiner

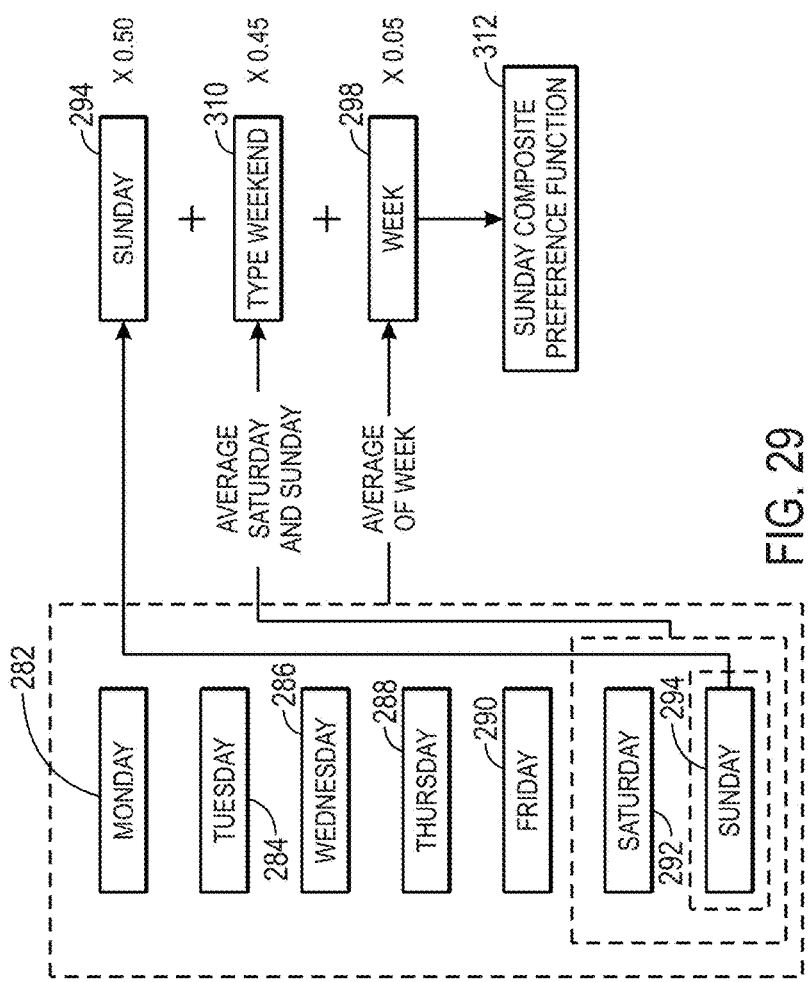

ENHANCED AUTOMATED CONTROL SCHEDULING

BACKGROUND

This disclosure relates to controlling an electronic device by generating an automated schedule tailored to preferences revealed by user behavior.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

People interact with many electronic devices in their daily lives. Many of these electronic devices are "smart" devices that can be controlled remotely or according to a schedule. Smart lighting, for example, may be controlled to be raised or lowered to set an appropriate mood. Likewise, a smart thermostat may manage a thermal environment of a structure, such as a residential or commercial building. A smart thermostat may decide how to condition the structure properly, which may include varying an internal temperature, humidity, and/or other environmental characteristic based on a setpoint schedule and/or temperatures selected by a person interacting with the thermostat.

Some smart devices may even learn from the way people control them. For example, some smart thermostats have applied an individual rules-and-exceptions-based learning approach to automatically generate temperature setpoint schedules. The rules-and-exceptions-based learning approach may involve observing interactions with the smart thermostat over time and, based on certain defined rules and exceptions, determine whether the interactions have some meaning that should be used to build a temperature setpoint schedule. In one example, the rules-and-exceptions-based learning approach may determine to include a temperature setpoint in a setpoint schedule when a person interacts with the thermostat to consistently select a similar temperature for several days in a row, or for the same day of the week for several weeks in a row, at about the same time of day, but not when the person selects a different temperature at about that time of day during an intervening day. Because there are numerous possible scenarios that could explain whether the person would want a temperature change to add or remove a temperature setpoint of an automated temperature setpoint schedule, the rules-and-exceptions-based learning approach may include a large number of rules and exceptions.

While a rules-and-exceptions-based learning approach may allow a smart device to generally learn what to do based on the person's interactions with the smart device, this may not be the case if the interactions happen not to match a defined rule or exception. As a result, the rules-and-exceptions-based learning approach may sometimes produce errant results. For instance, the rules-and-exceptions-based learning approach may too heavily consider interactions that occur soon after the smart device is installed, may produce setpoint schedules that are inefficient, or may change setpoints too often or too infrequently to effectively account for occupant preferences.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

To avoid pitfalls from the rules-and-exceptions-based learning approach mentioned above, an automated schedule to control an electronic device may be generated using a preference function. In this disclosure, a preference function represents a mapping of relative values—referred to herein as "weights" or "preference weights"—that indicate likely preferences for or against certain device settings, in relation to one or more variables. Various candidate automated device control schedules may be generated and tested against the preference function. The candidate schedule that best fits the preference function (and/or other factors, such as efficiency or wear and tear) may be used to control the electronic device. In effect, this form of enhanced automated control device scheduling may adapt to peoples' lives, rather than forcing people to adapt to their devices.

Some examples discussed below include various systems, apparatus, methods, and related computer programs for controlling an environmental control system using a "smart" thermostat. The smart thermostat may learn a person's temperature preferences by tracking the person's behavior. In one example, the thermostat may review the daily behavior of occupants in a structure at the end of each day. The thermostat may generate or update a preference function based on that behavior, and use the preference function to plan out an automated setpoint schedule—a schedule of temperature setpoints over time used to control the smart thermostat—for the next week. It should be appreciated, however, that while many of the specific examples below relate to generating an automated schedule for a smart thermostat, any suitable electronic devices that can be controlled by an automated schedule may employ the systems and methods of this disclosure. For instance, an automated schedule for smart lighting may be generated using a preference function that weights preferences for lighting level against the time of day (or even against other variables, such as content being displayed on a television or tablet device). Likewise, an automated schedule for a variable-height desk may be generated using a preference function that weights preferences for desk height against time of day.

In the case of the smart thermostat, a preference function may describe relative preferences for particular temperature settings in relation to the time of day. People may reveal their preferences for certain temperatures at certain times of the day in a variety of ways, such as by not adjusting the temperature setting, which may indicate satisfaction with that temperature setting; by adjusting the temperature up or down, which may indicate dissatisfaction with the previous temperature setting and satisfaction with the new temperature setting; by manually adding or deleting a temperature setpoint on a setpoint schedule that controls the thermostat; or exhibiting discomfort such as sweating, shivering, or fitful sleep. These behavioral indications of preferences for or against certain temperatures at different times of day are meant to be exemplary and are not exhaustive. The behavior may be used to build a preference function describing a relative preference (weight) in relation to temperatures over a time of day. In some cases, the preference function is a scalar function of two variables (e.g., temperature setting and time of day), with a scalar value (weight) associated with coordinates of the variables (e.g., a particular temperature at a particular time of day). For example, the preference function may take the form, f(temperature, time-of-day)= weight, indicating relative preference for particular temperatures at particular times-of-day.

Building the preference function may involve adding or subtracting weights at and/or around (temperature, time-of-day) coordinates where a person exhibited behavior indicating a preference for or a preference against particular temperatures at particular times of day. For example, if a person turned the thermostat dial from 66° F. to 75° F. at 6:00 AM, weight at a (66° F., 6:00 AM) coordinate of the preference function may be reduced, while weight at a (75° F., 6:00 AM) coordinate of the preference function may be increased. The preference function may also be smoothed by reducing slightly the weights around the (66° F., 6:00 AM) coordinate of the preference function and by increasing slightly the weights around the (75° F., 6:00 AM) coordinate of the preference function.

There may also be several kinds of separate preference functions that are developed and maintained. The preference functions may include a day preference function for each particular day (e.g., Monday, Tuesday, Wednesday, Thursday, Friday, Saturday, and Sunday). In some cases, there may be different sets of preference functions maintained for each particular day for different modes of operation of the thermostat, such as one set for cooling mode and one set for heating mode. These preference functions may maintain preferences that have been revealed on those particular days of the week, since people tend to have schedules that remain relatively constant week by week, and thus behavior indicating their preferences may also be fairly consistent. The daily preference functions may be updated each week at the end of the day. For example, a preference function for Monday may be updated at midnight going into Tuesday. However, before a daily preference function is updated, the weights of the preference function may be reduced across the board by some percentage or amount. This may be referred to as decay. Periodically decaying the weights of the preference function across the board allows preferences stored by the preference function to gradually recede over time, so that more recent behavior weighs more heavily in the preference function than older behavior.

Using one or more of the preference functions, an automated setpoint schedule can be generated. Setpoints may be defined by a temperature and a time. Candidate setpoint schedules may be generated that vary from each other slightly. These candidate setpoint schedules may be tested against the preference function(s). Candidate setpoint schedules that better fit the weights of the preference function will have higher scores. The candidate setpoint schedule with the highest score, and therefore likely best matches a person's revealed preferences, may itself be used to generate several more candidate setpoint schedules, and these may also be tested against the preference function(s). This process may continue as long as desired, and the ultimate candidate setpoint schedule with the highest score may be selected to control the thermostat.

In a first embodiment, an electronic device may include storage containing processor-executable instructions, a number of preference functions, each of which maps weights indicating likely relative user preferences for a range of possible setpoint temperatures for a range of times of day for a particular day of the week, and a current setpoint schedule of temperature setpoints over time. The electronic device may also include a processor configured to execute the instructions. The instructions may be configured to cause the processor to control an environmental control system based at least in part on the current setpoint schedule, and to cause the processor to determine the current setpoint schedule by detecting user behavior occurring on a first day of the week that indicates satisfaction or dissatisfaction with setpoint temperatures of the environmental control system in relation to time of day for the first day of the week, updating one of the number of preference functions that corresponds to the first day of the week based at least in part on the detected user behavior, blending the weights of the preference function corresponding to the first day of the week with the weights of other of the number of preference functions to obtain a first composite preference function, and determining the current setpoint schedule at least partly by comparing a number of candidate setpoint schedules against the weights of the first composite preference function and selecting the candidate setpoint schedule that has a highest score against the weights of the first composite preference function or has a highest score after one or more scoring modifications, or both.

In a second embodiment, an electronic device may include storage containing processor-executable instructions, a preference function that maps weights indicating likely relative user preferences for a range of possible setpoint temperatures for a range of times of day, and a current setpoint schedule of temperature setpoints over time. The electronic device may also include a processor configured to execute the instructions. The instructions may be configured to cause the processor to control an environmental control system based at least in part on the current setpoint schedule, and to determine the current setpoint schedule based on the preference function by detecting user behavior that indicates satisfaction or dissatisfaction with setpoint temperatures of the environmental control system in relation to time of day, updating the preference function based on the detected user behavior according to a first method for an initial period of time beginning when the processor first determined the current setpoint schedule based on the preference function, and according to a second method for a subsequent period of time after the initial period of time, where the first method prioritizes new behavior over older behavior more than the second method, determining the current setpoint schedule at least partly by comparing a number of candidate setpoint schedules against the weights of the preference function and selecting the candidate setpoint schedule that has a highest score against the weights of the preference function or has a highest score after one or more scoring modifications, or both.

In a third embodiment, a method may include using a first electronic device or a second electronic device to detect user behavior that indicates satisfaction or dissatisfaction with device settings of the first electronic device having a range of possible values in relation to a variable, based at least in part on the detected user behavior, using the first electronic device or the second electronic device to determine a preference function that maps weights indicating likely user preferences for the range of possible values of the device setting in relation to a range of values of the variable, using the first electronic device or the second electronic device to generate a first automated device control schedule configured to control the first electronic device in relation to the variable by determining a number of candidate automated device control schedules, comparing each of the number of candidate automated device control schedules to the preference function to obtain a first score, where the candidate automated device control schedule that best fits the weights of the preference function has the highest first score, modifying or not modifying the first score of each of the number of candidate automated device control schedules to obtain a second score, and selecting one of the number of candidate automated device control schedules with the highest second score to be the first automated device control schedule, and controlling the first electronic device according to the first automated device control schedule.

In a fourth embodiment, an electronic device may include storage containing processor-executable instructions, a preference function that maps weights indicating likely user preferences for the range of possible values of a device setting in relation to a range of values of a variable, and a current automated device control schedule configured to control the device setting of the electronic device in relation to the variable. The electronic device may also include a processor configured to execute the instructions. The instructions may be configured to cause the processor to determine the current automated device control schedule based on the preference function by detecting user behavior that indicates satisfaction or dissatisfaction with one or more values of the device setting in relation to the variable, updating the preference function based on the detected user behavior, and determining the current automated device control schedule at least partly by comparing a number of candidate device control schedules against the weights of the preference function and selecting the candidate automated device control schedule that has a highest score against the weights of the preference function or has a highest score after one or more scoring modifications, or both.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein:

FIG. 29 illustrates a blend of day preference functions used to generate a composite preference function for Sunday, in accordance with an embodiment;

FIG. 30 illustrates a set of composite preference functions for each day of the week that make up a week composite preference function, in accordance with an embodiment;

DETAILED DESCRIPTION

Figure 1:
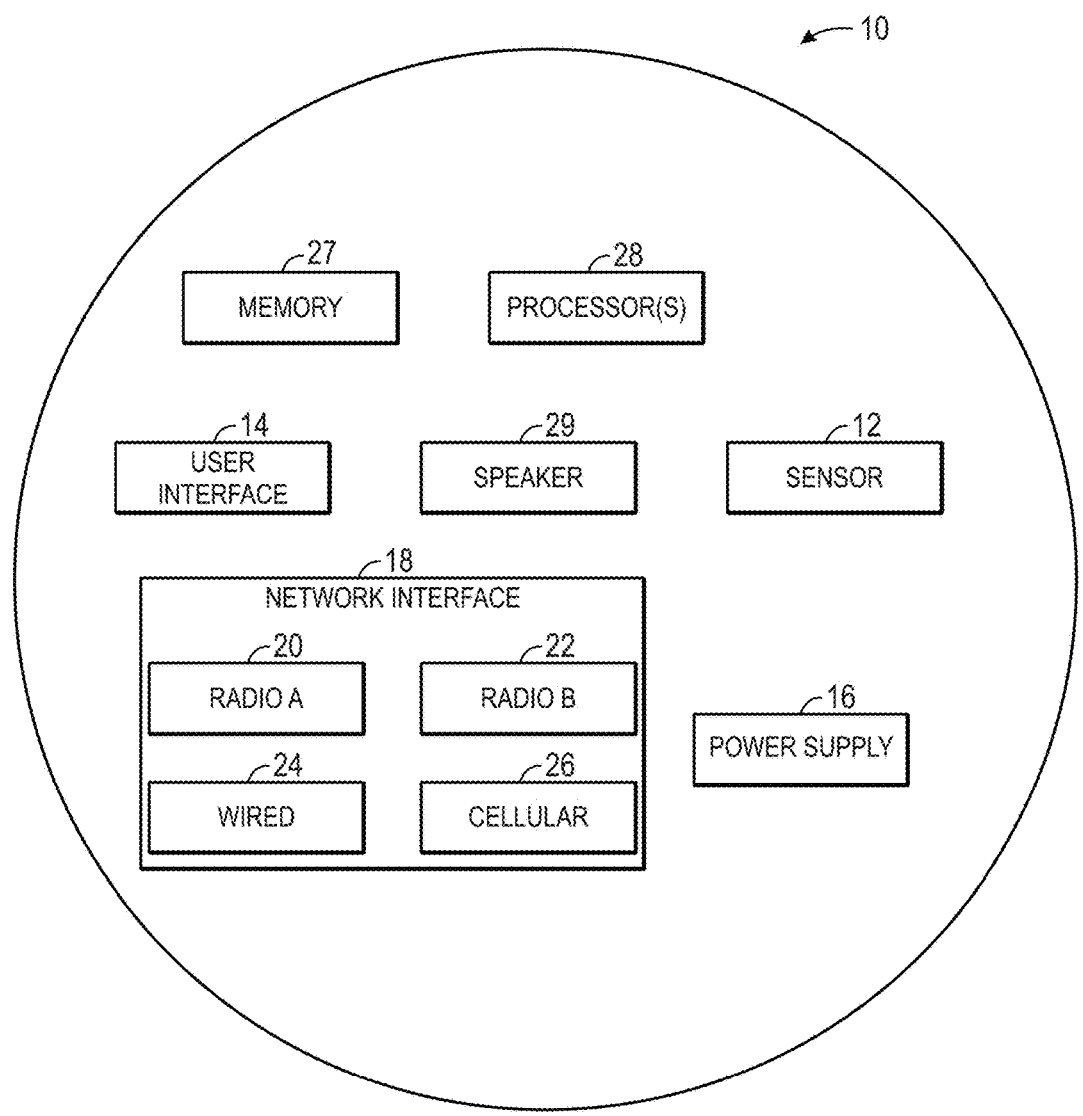
FIG. 1 illustrates a block diagram of a device that may communicate with other devices disposed in a smart-home environment, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. In this disclosure, the term "smart home environments" may refer to smart environments or smart networks for any building type, such as single-family houses, duplexes, townhomes, multi-unit apartment buildings, hotels, retail stores, office buildings, industrial buildings, and any building that may include one or more smart devices.

This disclosure relates to systems, methods, and devices to generate automatic control schedules for a smart device using a preference function that relates a relative preference—referred to herein as "weight" or "preference weight"—for certain device settings (e.g., particular temperature settings) in relation to one or more variables (e.g., the time of day or the day of the week). Various candidate automated device control schedules may be generated and tested against the preference function. The candidate schedule that best fits the preference function (and/or other factors, such as efficiency or wear and tear) may be used to control the electronic device.

As will be discussed further below, a "smart" thermostat represents one type of electronic device that may be controlled according to an automated device schedule generated based on such a preference function. In some examples discussed below, the smart thermostat may learn a person's temperature preferences by tracking the person's behavior and identifying whether the behavior indicates satisfaction or dissatisfaction with particular temperatures at particular times of day. Tracking the person's behavior may take place using the thermostat or using other smart devices of a smart home environment. For instance, the thermostat may record physical interactions (or the lack thereof) or remote interactions (or the lack thereof) via an application program running on a personal device (e.g., a smartphone) that is in communication with the thermostat or with an online service associated with the thermostat. Additionally or alternatively, the online service or other devices in the smart home environment may record such behavior. For example, a camera system may identify when a person is exhibiting apparent discomfort with the current temperature setting by sweating, shivering, or sleeping fitfully.

By identifying user behavior that indicates satisfaction or dissatisfaction with particular device settings (e.g., temperature) in relation to one or more variables (e.g., time of day), a preference function based on that behavior may be generated. The preference function may be used to plan out an automated device control schedule. In the case of smart lighting, the automated device control schedule may be a lighting schedule that controls lighting levels in relation to time of day or other factors, such as content being displayed on a television or tablet device. In the case of a variable-height desk, the automated device control schedule may control a height of the desk in relation to time of day. Indeed, any suitable control schedule for any suitable electronic device that can be controlled automatically according to such a schedule may be generated based on a corresponding preference function as taught by this disclosure. In effect, this enhanced automated control scheduling provides a holistic view of user behavior upon which to generate an automated control schedule.

The subject of most examples in this disclosure is that of a smart thermostat. A smart thermostat may control an environmental control system that may include a heater, an air conditioner, a heating, ventilation and/or air conditioning (HVAC) system, or the like. It should be appreciated that, while an HVAC system is discussed by way of example in this disclosure, the disclosed systems, apparatus, methods, and related computer programs may involve any suitable environmental control system that can adjust the temperature of a structure (e.g., an environmental control system that automatically opens windows or vents to raise or lower the temperature in the structure, or a system that cools only or heats only). Based on user behavior indicative of satisfaction or dissatisfaction with temperature settings of a thermostat over the times of day, a preference function that relates user preferences for specific temperatures at specific times of day may be developed. The preference function may be adjusted to account for other factors, such as efficiency.

In addition to considering active interactions, lack of interactions (indicating satisfaction with the current temperature) may be considered as well. Indeed, people may reveal their preferences for certain temperatures at certain times of the day in a variety of ways, such as by not adjusting the temperature setting, which may indicate satisfaction with that temperature setting; by adjusting the temperature up or down, which may indicate dissatisfaction with the previous temperature setting and satisfaction with the new temperature setting; by manually adding or deleting a temperature setpoint on a setpoint schedule that controls the thermostat; or exhibiting discomfort such as sweating, shivering, or fitful sleep. These behavioral indications of preferences for or against certain temperatures at different times of day are meant to be exemplary and are not exhaustive. Taking such user behavior into account to build a preference function may be understood to provide a holistic view of user preferences. By taking the history of the user's behavior into account, the enhanced automated control scheduling may more accurately translate consistent and intentional temperature changes over a period of time into learned setpoints. As will be discussed further below, the resulting preference functions that are built based on the user behavior may be maintained and adjusted based on new user behavior.

The tracked user behavior may be used to build a preference function describing a relative preference (weight) in relation to temperatures over a time of day. In some cases, the preference function is a scalar function of two variables (e.g., temperature setting and time of day), with a scalar value (weight) associated with coordinates of the variables (e.g., a particular temperature at a particular time of day). For example, the preference function may take the form, f(temperature, time-of-day)=weight, indicating relative preference for particular temperatures at particular times-of-day. Indeed, the preference functions may be mathematical function with one or more variables, or the preference functions may utilize a multi-dimensional array. For example, as previously noted, the preference functions may be characterized as a scalar function including two variables, time-of-day and temperature, and a scalar including a range of suitable weights that indicate relative user preferences for particular temperatures at particular times. The preference functions may be decayed over time, essentially giving more weight to newer behavior than older behavior. The preference functions may be understood to be empirical in the sense that they are based on observation of user behavior.

A preference function or a combination of preference functions may be used to generate an automated setpoint schedule—a schedule of temperature setpoints over time used to control the smart thermostat—for some period in the future (e.g., for the next day, the next few days, the next week, the next few weeks, or the next month). To do so, several candidate setpoint schedules may be generated and scored against a preference function. The scoring process may involve comparing the candidate setpoint schedule to the preference function and to obtain a score relating to the weights of the preference function. In some cases, the score may represent a summation of all the weights assigned at the setpoint temperatures in the candidate setpoint schedule at each setpoint time over the duration of time (and/or certain score modifications to account for system wear and/tear or other factors). The process may take place iteratively by generating a few candidate setpoint schedules by varying a previous candidate setpoint schedule, scoring the candidate setpoint schedules against the preference function, and selecting the highest scoring candidate setpoint to generate new candidate setpoint schedules in a next iteration. This may continue until there are no more variations of candidate setpoint schedules that increase the score or until time runs out. The highest-scoring candidate setpoint schedule may be selected to control the thermostat for the next week.

In some embodiments, as described in detail below, composite preference functions may be obtained for each particular day of the week by blending percentages of the particular day preference function with a day type preference function for weekdays or the weekend, a week preference function, or some combination thereof. The day type preference function for weekdays may be obtained by averaging the day preference functions of the weekdays together, the day type preference function for the weekend may be obtained by averaging the day preference functions for Saturday and Sunday together, and the week preference function may be obtained by averaging the day preference functions for each day of the week together. In some embodiments, a week composite preference function may be made up of each of the individual composite preference functions for each day and the week composite preference function is the function that candidate setpoint schedules are processed against during optimization to select the candidate setpoint schedule to apply for a forthcoming week.

This essentially holistic enhanced automated control scheduling may provide increased efficiency while respecting user inputs and maintaining comfort, and improved responsiveness of schedule learning as compared to a rules-and-exceptions-based approach. Indeed, the enhanced automated control scheduling may reduce energy consumption by running the HVAC system more efficiently (e.g., fewer setpoints, more efficient setpoint temperatures at certain times). Indeed, in some embodiments, the enhanced automated control scheduling may save users 6.1% in cooling and 5.6% in heating as compared to a rules-and-exceptions-based approach. While the enhanced automated control scheduling may select more efficient setpoints in some scenarios to obtain higher savings, the savings is not forced on the user. If the user prefers more comfortable temperatures and adjusts the thermostat accordingly, the enhanced automated control scheduling of this disclosure does not resist. However, if the user does make temperature changes to more efficient temperatures, the enhanced automated control scheduling may pay more attention to these changes.

Further, uniformity of setpoints may be encouraged across each individual day (e.g., Mondays, Tuesdays, Wednesdays, Thursdays, Fridays, Saturdays, Sundays) and day type (e.g., weekday or weekend) by reducing scores of candidate setpoint schedules due to excessive setpoints and/or irregular setpoints. The user's different temperature preferences may be tracked on weekdays versus weekends. That is, the user may prefer the ambient temperature of his/her home to be cool (72° F.) all day on the weekend, whereas the user prefers the ambient temperature to be warmer (80° F.) during the day during the week when the user is away at work to reduce electricity usage. Also, the user may have different temperature preferences for Monday through Friday, and the disclosure may enable determining those preferences and providing an enhanced automated setpoint schedule accordingly.

As may be appreciated, a selected candidate setpoint schedule may include learned setpoints (e.g., setpoints added by the methods) and manually added setpoints (e.g., setpoints added by the user). Over time, the setpoints may be changed to different setpoint times, removed altogether to shrink the setpoint schedule, or remain the same. In any scenario, the enhanced automated control scheduling may enable providing individualized automated setpoint schedules that more accurately reflect the user's temperature preferences and that may improve efficiency of the environmental control system, thereby potentially saving the user money and increasing the life of the environmental control system. Further, the selected setpoint schedules may be adapted to the user's temperature preferences, and with a better adapted schedule, users are able to maintain their preferred temperatures with fewer dial turns and schedule edits.

Smart-Home Network

With the foregoing in mind, FIG. 1 illustrates an example of a device 10 that may communicate with other like devices within a smart-home environment. In one embodiment, the device 10 may include one or more sensors 12, a user-interface component 14, a power supply 16 (e.g., including a power connection and/or battery), a network interface 18 (e.g., including a radio A 20, a radio B 22, a wired component 24, and a cellular component 26), a memory 27, a processor 28, a speaker 29, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor 12, many embodiments may include multiple sensors 12. In some instances, the device 10 may include one or more primary sensors 12 and one or more secondary sensors 12. Here, the primary sensor(s) 12 may sense data central to the core operation of the device (e.g., sensing a temperature in a thermostat or sensing smoke in a smoke detector), while the secondary sensor(s) 12 may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components 14 may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface component 14 (e.g., adjusting a set point temperature by 1 degree F. for every 10° rotation of a rotatable-ring component). Physically and virtually movable user-interface components 14 can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component 14 may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or the audio speaker 29.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices 10 or to an online service (e.g., the Nest® service) via the Internet. In one embodiment, the network interface 18 may communicate using a standard network protocol, such as Bluetooth® Low Energy (BLE), Dust Networks®, Z-Wave®, WiFi, and ZigBee®. Additionally or alternatively, the network interface 18 may communicate via an efficient network layer protocol (e.g., Thread™). For example, the efficient network layer protocol may enable the device 10 to wirelessly communicate IPv6-type data or traffic using a RIPng routing mechanism and a DTLS security scheme. To communicate wirelessly on the network, the network interface 18 may include a wireless card (e.g., SIM card) or some other transceiver connection. Further, in some examples, the network interface 18 may include two radios: represented in FIG. 1 as radio A 20 and radio B 22. These radios 20 and 22 may send and/or receive heartbeat signals over a shared or overlapping spectrum usable to both of the radios 20 and 22. For example, the radio A 20 may be a WiFi radio and the radio B 22 may be a Bluetooth® Low Energy radio. Additionally or alternatively, the radios 20 or 22 may be any other suitable radio circuitry. The radios 20 and 22 may use certain overlapping spectrum such that one can detect signals from the other. In some embodiments, when one of the radios 20 or 22 fails to receive a heartbeat signal from the other, the device 10 may leverage a cellular component 26 (e.g., 3G, 4G, or LTE circuitry) to communicate with devices outside of the local network. The network interface 18 may also include a wired component 24, in certain embodiments. The wired component 24 may enable wired communication (e.g., Ethernet communication) with other devices 10.

The memory 27 may be any suitable article of manufacture that can serve as media to store processor-executable code, data, or the like. These articles of manufacture may represent tangible, non-transitory, computer-readable media (e.g., any suitable form of memory or storage) that may store the processor-executable code used by the processor 28 to perform the presently disclosed methods. Also, the memory 27 may be used to store certain data, such as one or more preference functions including past weights assigned, candidate setpoint schedules, and so forth. Additionally, the memory 27 may be used to store parameters used by the disclosed methods to generate the preference function, such as weight decay value, weight of changing the schedule, weight added for following a target temperature, weight added for temperature dial changed to, weight subtracted for temperature dial changed from, weight added for a manually added setpoint, weight subtracted for a manually deleted setpoint, weight to add when burning in current schedule, weight subtracted for setpoints after certain time, percentage of composite preference function that comes from day preference function, percentage of composite preference function that comes from day type preference function, percentage of composite preference function that comes from week preference function, percentage, among others.

The processor 28 may support one or more of a variety of different device 10 functionalities. As such, the processor 28 may include one or more processors 28 configured and programmed to carry out and/or cause to be carried out one or more of the functionalities described herein. In one embodiment, the processor 28 may include general-purpose processors 28 carrying out computer code stored in memory 27 (e.g., flash memory, hard drive, random access memory), special-purpose processors or application-specific integrated circuits, combinations thereof, and/or using other types of hardware/firmware/software processing platforms. Further, the processor 28 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 28 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 28 may include image recognition technology to identify particular occupants or objects.

In certain embodiments, the processor 28 may also include a high-power processor and a low-power processor. The high-power processor may execute computationally intensive operations such as operating the user-interface component 14, and the like. The low-power processor, on the other hand, may manage less complex processes. In some embodiments, the low-power processor may detect a hazard or temperature from the sensor 12. In one embodiment, the low-power processor may wake or initialize the high-power processor for computationally intensive processes. That is, the low-power processor may function as a watchdog for certain conditions during times where the high-power processor is deactivated or sleeping. The conditions may include a desired temperature being reached, a certain amount of time elapsing, an event occurring that requires the high-power processor's attention, or the like.

In some instances, the processor 28 may predict desirable settings and/or implement those settings. For example, based on the presence detection, the processor 28 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 28 may initiate an audio or visual indicator of where the person, animal or object is or may initiate an alarm or security feature if an unrecognized person is detected under certain conditions (e.g., at night or when lights are off).

In some embodiments, devices 10 may interact with each other such that events detected by a first device 10 influences actions of a second device 10. For example, a first device 10 can detect that a user has pulled into a garage (e.g., by detecting motion in the garage, detecting a change in light in the garage or detecting opening of the garage door). The first device 10 can transmit this information to a second device 10 via the efficient network layer, such that the second device 10 can, e.g., adjust a home temperature setting, a light setting, a music setting, and/or a security-alarm setting. As another example, a first device 10 can detect a user approaching a front door (e.g., by detecting motion or sudden light pattern changes). The first device 10 may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 10 may include a thermostat such as a Nest® Learning Thermostat. Here, the thermostat may include sensors 12 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user-interface component 14. As such, a user may interact with or program the thermostat using the rotatable ring such that the thermostat controls the temperature of the building by controlling the HVAC system/unit, or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off wall switches (e.g., light switch) or other electronic devices 10 when it determines that the building is vacant. As such, the thermostat may use the network interface 18 to communicate with a wall switch device 10 such that it may send a signal to the wall switch device 10 when the building is determined to be vacant. In this manner, the thermostat may efficiently manage the energy use of the building.

It should be understood that the device 10 may include all of the components illustrated (e.g., sensor 12, user interface 14, power supply 16, network interface 18, memory 27, processor 28, speaker 29), a subset of those components, or additional components. For example, some devices 10 may not include a speaker 29, some devices' network interfaces 18 may not include a cellular component 26, some devices' network interfaces 18 may include only one radio or may include more than two radios, and so forth.

Figure 2:
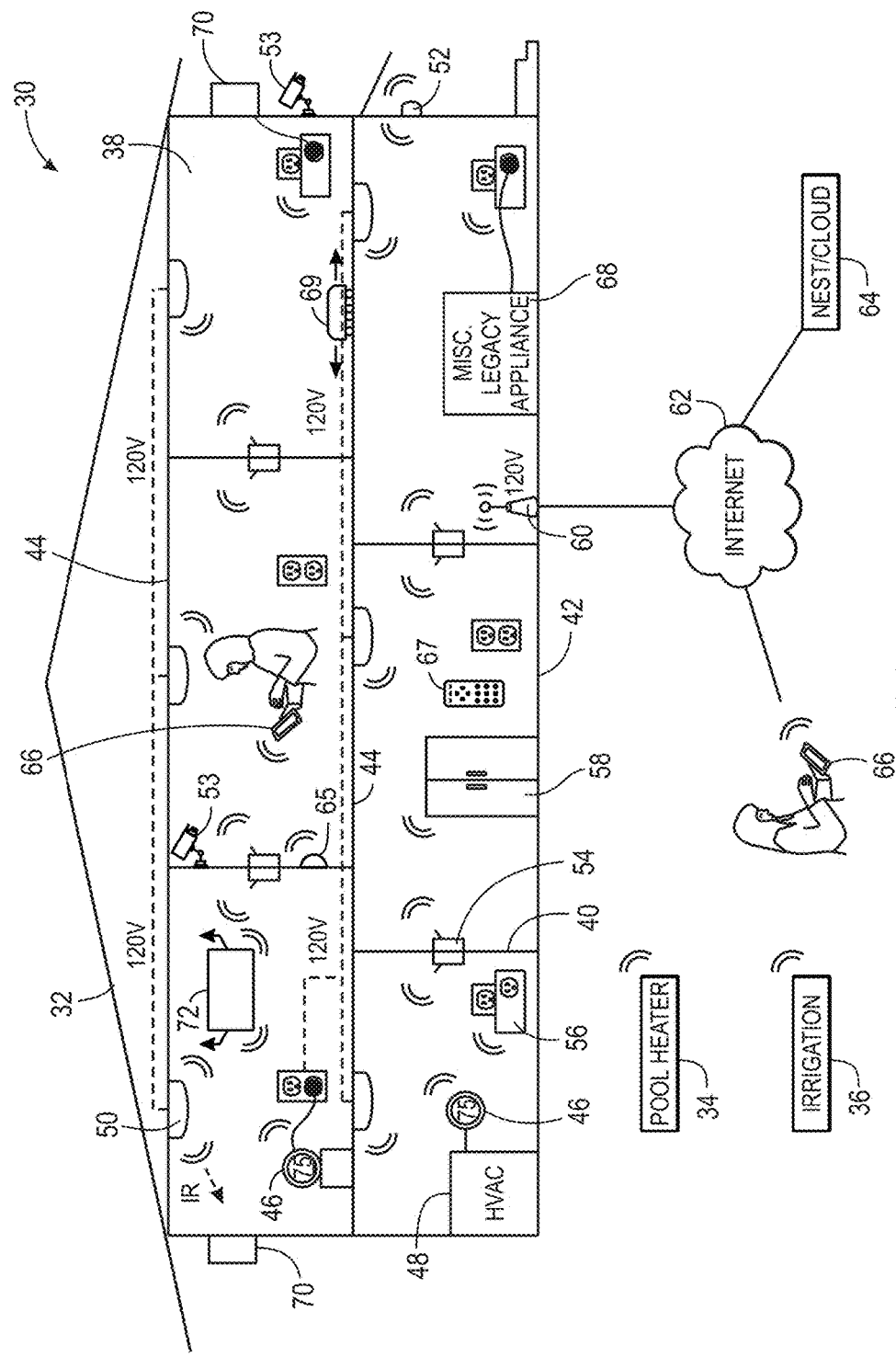
FIG. 2 illustrates a block diagram of a smart-home environment, in accordance with an embodiment.

An example of a smart-home environment 30 within which one or more of the devices 10 of FIG. 1, methods, systems, services, and/or computer program products described further herein can be applicable is illustrated in FIG. 2. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment 30 can control and/or be coupled to devices 10 outside of the actual structure 32. Indeed, several devices 10 in the smart home environment 30 need not physically be within the structure 32 at all. For example, a device 10 controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices 10 can be mounted on, integrated with and/or supported by a wall 40, floor 42, or ceiling 44.

In some embodiments, the smart-home environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), one or more intelligent, multi-sensing, network-connected entryway interface devices 52 (hereinafter referred to as "smart doorbells 52"), and one or more intelligent, multi-sensing, network-connected video cameras 53 (hereinafter referred to as "smart video cameras 53"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly. The smart hazard detector 50 may detect the presence of a hazardous substance or a substance indicative of a hazardous substance (e.g., smoke, fire, or carbon monoxide). The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come).

The smart video camera 53 may be located inside or outside of the structure 32, as depicted. In some embodiments, the smart video camera 53 may be a Nest® Dropcam®. The smart video camera 53 may be wireless (e.g., WiFi) and/or wired and configured to communicate with one or more devices 10 in the smart home environment 30. Also, the smart video camera 53 may be configured to buffer video and record and send video to user devices 66 via the Internet and/or Nest® cloud service 64. Additionally, a software application may be installed on user devices 66 that is configured to access a live feed of the smart video camera 53 so that a user may view current footage. The smart video camera 53 may include a microphone and a speaker in order to enable two-way talk between the camera 53 and a user of the application. Further, the smart video camera 53 may be battery-powered or hard-wired and include infrared LEDs that enable night-vision. In addition, the smart video camera 53 may be configured to provide alerts to a subscribed or interested user of newly recorded available footage (e.g., configurable detected activities). For example, an outdoor smart video camera 53 may communicate with the smart doorbell 52 so that any time the doorbell 52 is rung and the user is not home, the camera 53 may send the video data a configurable amount of time before the doorbell 52 was rung and a configurable amount of time after the doorbell was rung 52 to the user. In this way, the user may determine who visited the home while they are away. In addition, the smart video camera 53 may begin recording footage any time movement occurs in a desired location of a field of view (e.g., if a person traverses a doorway in a room, the smart video camera 53 may begin recording for a set period of time).

In some embodiments, the smart-home environment 30 of FIG. 2 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-home environment 30 may further include a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment 30 by cooperating with the respective manufacturers of the appliances. For example, the appliances 58 can be space heaters, window AC units, motorized duct vents, etc. When plugged in, an appliance 58 can announce itself to the smart-home network, such as by indicating what type of appliance 58 it is, and it can automatically integrate with the controls of the smart-home. Such communication by the appliance 58 to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-home environment 30 are modular and can be incorporated into older and newer houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices 10 described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices 10 outside of the physical home but within a proximate geographical range of the home. For example, the smart-home environment 30 may include a pool heater monitor 34 that communicates a current pool temperature to other devices 10 within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices 10 of FIG. 2 can further allow a user to interact with the device 10 even if the user is not proximate to the device 10. For example, a user can communicate with a device 10 using a computer (e.g., a desktop computer, laptop computer, or tablet) or other portable electronic device (e.g., a smartphone) 66. A webpage or app can be configured to receive communications from the user and control the device 10 based on the communications and/or to present information about the device's operation to the user. For example, the user can view a current setpoint temperature for a device 10 and adjust it using a computer or portable electronic device 66. The user can be in the structure 32 during this remote communication or outside the structure 32. The changes to setpoints, either via the device 10 or portable electronic device 66, may be recorded and used when determining the optimal setpoint schedule to apply for a forthcoming period of time.

As discussed, users can control the smart thermostat 46 and other smart devices 10 in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device 66 as being associated with the home and to give permission to the occupant to use the device 66 to control the smart devices 10 in the home. An occupant can use their registered device 66 to remotely control the smart devices 10 of the home, such as when the occupant is at work or on vacation. The occupant may also use their registered device 66 to control the smart devices 10 when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment 30 "learns" who is an occupant and permits the devices 66 associated with those individuals to control the smart devices 10 of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices 10), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices 10. For example, the guest layer of controls will not permit the guest to adjust the heat-pump lockout temperature.

A use case example of this is when a guest is in a smart home, the guest could walk up to the thermostat 46 and turn the dial manually, but the guest may not want to walk around the house "hunting" for the thermostat 46, especially at night while the home is dark and others are sleeping. Further, the guest may not want to go through the hassle of downloading the necessary application to their device for remotely controlling the thermostat 46. In fact, the guest may not have the home owner's login credentials, etc., and therefore cannot remotely control the thermostat 46 via such an application. Accordingly, according to embodiments of the present disclosure, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device 10, such as the smart thermostat 46, the home owner is asked if they want to enable a Local Web App (LWA) on the smart device 10. Business owners will likely say no; home owners will likely say yes. When the LWA option is selected, the smart device 10 broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device 10 is purchased from the same manufacturer. Further, according to embodiments, if there is more than one smart device 10 on the LAN, the second and subsequent smart devices 10 do not offer to set up another LWA. Instead, they register themselves as target candidates with the master LWA. And in this case the LWA user would be asked which smart device 10 they want to change the temperature on before getting the simplified user interface for the particular smart device 10 they choose.

According to embodiments, a guest layer of controls may also be provided to users by means other than a device 66. For example, the smart device 10, such as the smart thermostat 46, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device 10, the smart device 10 provides the guest with the guest layer of controls, rather than full controls.

As described below, the smart thermostat 46 and other smart devices 10 "learn" by observing occupant behavior. For example, the smart thermostat 46 learns occupants' preferred temperature set-points for mornings and evenings, and it learns when the occupants are asleep or awake, as well as when the occupants are typically away or at home, for example. According to embodiments, when a guest controls the smart devices 10, such as the smart thermostat 46, the smart devices 10 do not "learn" from the guest. This prevents the guest's adjustments and controls from affecting the learned preferences of the occupants. The smart thermostat 46 may learn the user's temperature preferences for different days of the week and different day types (e.g., weekday or weekend).

According to some embodiments, a smart television remote control 67 is provided. The smart remote control 67 recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control 67 only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices 10 in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices 10") is capable of data communications and information sharing with any other of the smart devices 10, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices 10 can serve as wireless or wired repeaters. For example, a first one of the smart devices 10 can communicate with a second one of the smart device 10 via a wireless router 60. The smart devices 10 can further communicate with each other via a connection to a network, such as the Internet 62. Through the Internet 62, the smart devices 10 can communicate with a central server or a cloud-computing system 64. The central server or cloud-computing system 64 can be associated with a manufacturer, support entity, or service provider associated with the device 10. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals).

According to embodiments, the smart devices 10 combine to create a mesh network of spokesman and low-power nodes in the smart-home environment 30, where some of the smart devices 10 are "spokesman" nodes and others are "low-powered" nodes. Some of the smart devices 10 in the smart-home environment 30 are battery powered, while others have a regular and reliable power source, such as by connecting to wiring (e.g., to 120V line voltage wires) behind the walls 40 of the smart-home environment 30. The smart devices 10 that have a regular and reliable power source are referred to as "spokesman" nodes. These nodes are equipped with the capability of using any wireless protocol or manner to facilitate bidirectional communication with any of a variety of other devices 10 in the smart-home environment 30 as well as with the central server or cloud-computing system 64. On the other hand, the devices 10 that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices 10 in the smart-home environment 30, such as the spokesman nodes, cannot send information to these low-power nodes.

As described, the smart devices 10 serve as low-power and spokesman nodes to create a mesh network in the smart-home environment 30. Individual low-power nodes in the smart-home environment 30 regularly send out messages regarding what they are sensing, and the other low-powered nodes in the smart-home environment 30—in addition to sending out their own messages—repeat the messages, thereby causing the messages to travel from node to node (i.e., device 10 to device 10) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able send messages across the entire smart-home environment 30 as well as over the Internet 62 to the central server or cloud-computing system 64. According to embodiments, the mesh network enables the central server or cloud-computing system 64 to regularly receive data from all of the smart devices 10 in the home, make inferences based on the data, and send commands back to one of the smart devices 10 to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment 30, as well as to other spokesman nodes that did not receive the commands directly from the central server or cloud-computing system 64.

An example of a low-power node is a smart nightlight 65. In addition to housing a light source, the smart nightlight 65 houses an occupancy sensor, such as an ultrasonic or passive IR sensor, and an ambient light sensor, such as a photoresistor or a single-pixel sensor that measures light in the room. In some embodiments, the smart nightlight 65 is configured to activate the light source when its ambient light sensor detects that the room is dark and when its occupancy sensor detects that someone is in the room. In other embodiments, the smart nightlight 65 is simply configured to activate the light source when its ambient light sensor detects that the room is dark. Further, according to embodiments, the smart nightlight 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device 10 to smart device 10) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors 12, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors 12 to the other devices 10 and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment 30. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart nightlight 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65.

In some embodiments, the mesh network can be used to automatically turn on and off lights as a person transitions from room to room. For example, the low-powered and spokesman nodes detect the person's movement through the smart-home environment 30 and communicate corresponding messages through the mesh network. Using the messages that indicate which rooms are occupied, the central server or cloud-computing system 64 or some other device 10 activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart nightlight 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device 10 could automatically determine the routes using uploaded maps, diagrams, architectural drawings of the smart-home house, as well as using a map generated based on positional information obtained from the nodes of the mesh network (e.g., positional information from the devices 10 is used to construct a map of the house). In operation, when an alarm is activated (e.g., when one or more of the smart hazard detector 50 detects smoke and activates an alarm), the central server or cloud-computing system 64 or some other device 10 uses occupancy information obtained from the low-powered and spokesman nodes to determine which rooms are occupied and then turns on lights (e.g., nightlights 65, wall switches 54, wall plugs 56 that power lamps) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor 12, a processor 28, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-and-exceptions-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-and-exceptions-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-and-exceptionsbased inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet 62. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot(s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots 69"). Included in the embodiments are methods and systems for ensuring that home security systems, intrusion detection systems, and/or occupancy-sensitive environmental control systems (for example, occupancy-sensitive automated set-back thermostats that enter into a lower-energy-using condition when the home is unoccupied) are not erroneously triggered by the away-service robots 69.

Provided according to one embodiment is a home automation and security system (e.g., as shown in FIG. 2) that is remotely monitored by a monitoring service by virtue of automated systems (e.g., cloud-based servers or other central servers 64, hereinafter "central server 64") that are in data communications with one or more network-connected elements of the home automation and security system. The away-service robots 69 are configured to be in operative data communication with the central server 64, and are configured such that they remain in a non-away-service state (e.g., a dormant state at their docking station) unless permission is granted from the central server 64 (e.g., by virtue of an "away-service-OK" message from the central server) to commence their away-service activities. An away-state determination made by the system, which can be arrived at (i) exclusively by local on-premises smart device(s) 10 based on occupancy sensor data, (ii) exclusively by the central server 64 based on received occupancy sensor data and/or based on received proximity-related information such as GPS coordinates from user smartphones or automobiles, or (iii) any combination of (i) and (ii) can then trigger the granting of away-service permission to the away-service robots 69 by the central server 64. During the course of the away-service robot 69 activity, during which the away-service robots 69 may continuously detect and send their in-home location coordinates to the central server 64, the central server 64 can readily filter signals from the occupancy sensing devices to distinguish between the away-service robot 69 activity versus any unexpected intrusion activity, thereby avoiding a false intrusion alarm condition while also ensuring that the home is secure. Alternatively or in conjunction therewith, the central server 64 may provide filtering data (such as an expected occupancy-sensing profile triggered by the away-service robots 69) to the occupancy sensing nodes or associated processing nodes of the smart home, such that the filtering is performed at the local level. Although somewhat less secure, it would also be within the scope of the present teachings for the central server 64 to temporarily disable the occupancy sensing equipment for the duration of the away-service robot 69 activity.

According to another embodiment, functionality similar to that of the central server 64 in the above example can be performed by an on-site computing device such as a dedicated server computer, a "master" home automation console or panel, or as an adjunct function of one or more of the smart-home devices 10 of FIG. 2. In such an embodiment, there would be no dependency on a remote service provider to provide the "away-service-OK" permission to the away-service robots 69 and the false-alarm-avoidance filtering service or filter information for the sensed intrusion detection signals.

According to other embodiments, there are provided methods and systems for implementing away-service robot 69 functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot 69 activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots 69 are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots 69 are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots 69 to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot 69 requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s) 69, on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot 69, and are further configured such that no disturbance-detected outcome will occur for as long as that particular detectable signal or environmental "signature" is detected. By way of example, a particular kind of vacuum-cleaning away-service robot 69 may emit a specific sound or RF signature. For one embodiment, the away-service environmental signatures for each of a plurality of known away-service robots 69 are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots 69 for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots 69 by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot 69 will remain relatively constant from event to event, and in view of the fact that the away-service events will likely either (a) themselves be triggered by some sort of nonoccupancy condition as measured by the away-service robots 69 themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots 69 are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors 12 of the smart devices 10 located in the mesh network of the smart-home environment 30 in combination with rules-and-exceptions-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device 10 in the smart-home environment 30 that happens to be closest to the occupant when the occupant falls asleep will be the device 10 that transmits messages regarding when the occupant stopped moving, from which the central server or cloud-computing system 64 will make inferences about where and when the occupant prefers to sleep. Also, the closest smart device 10 to the sleeping occupant may be the device 10 that sounds the alarm to wake the occupant. In this manner, the "smart alarm clock" will follow the occupant throughout the house, by tracking the individual occupants based on their "unique signature", which is determined based on data obtained from sensors 12 located in the smart devices 10. For example, the sensors 12 include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC system in an efficient manner so as to pre-heat or cool the house to the occupant's desired "sleeping" and "awake" temperature settings. The preferred settings can be learned over time, such as by observing which temperature the occupant sets the thermostat 46 to before going to sleep and which temperature the occupant sets the thermostat 46 to upon waking up According to an embodiment, a device 10 is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices 10 in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors 12 of the smart devices 10 located throughout the smart-home environment 30 in combination with rules-and-exceptions-based inference engines or artificial intelligence provided at the central server or cloud-computing system 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment 30 to identify such patterns.

In addition, another device 10 in the smart-home environment 30 may include a hub device 72, such as a Nest® hub device. In some embodiments, the hub device 72 may be an example of the "master" panel previously mentioned regarding the security system. The hub device 72 may communicate wirelessly over the wireless network provided by the router 60 with each of the other devices 10 in the smart-home environment 30 via separate channels. For example, the hub device 72 may monitor each device 10 to ensure it is active and communicating by pinging each device 10 over its individual channel. Further, the hub device 72 may communicate with remote servers such as Nest® servers 64, over the Internet via WiFi or its wired component 24 and/or over 3G via its cellular component 26. Additionally, the hub device 72 may communicate with cellular towers via its cellular component 26 as an alternative communication medium in case its wireless network is being subjected to a jamming attack. Thus, the hub device 72 provides robust mechanisms to detect wireless communication jamming attacks and notify the proper parties of the incident. As may be appreciated, employing such techniques greatly enhances the security a homeowner may experience and may deter crime.

Figure 3:
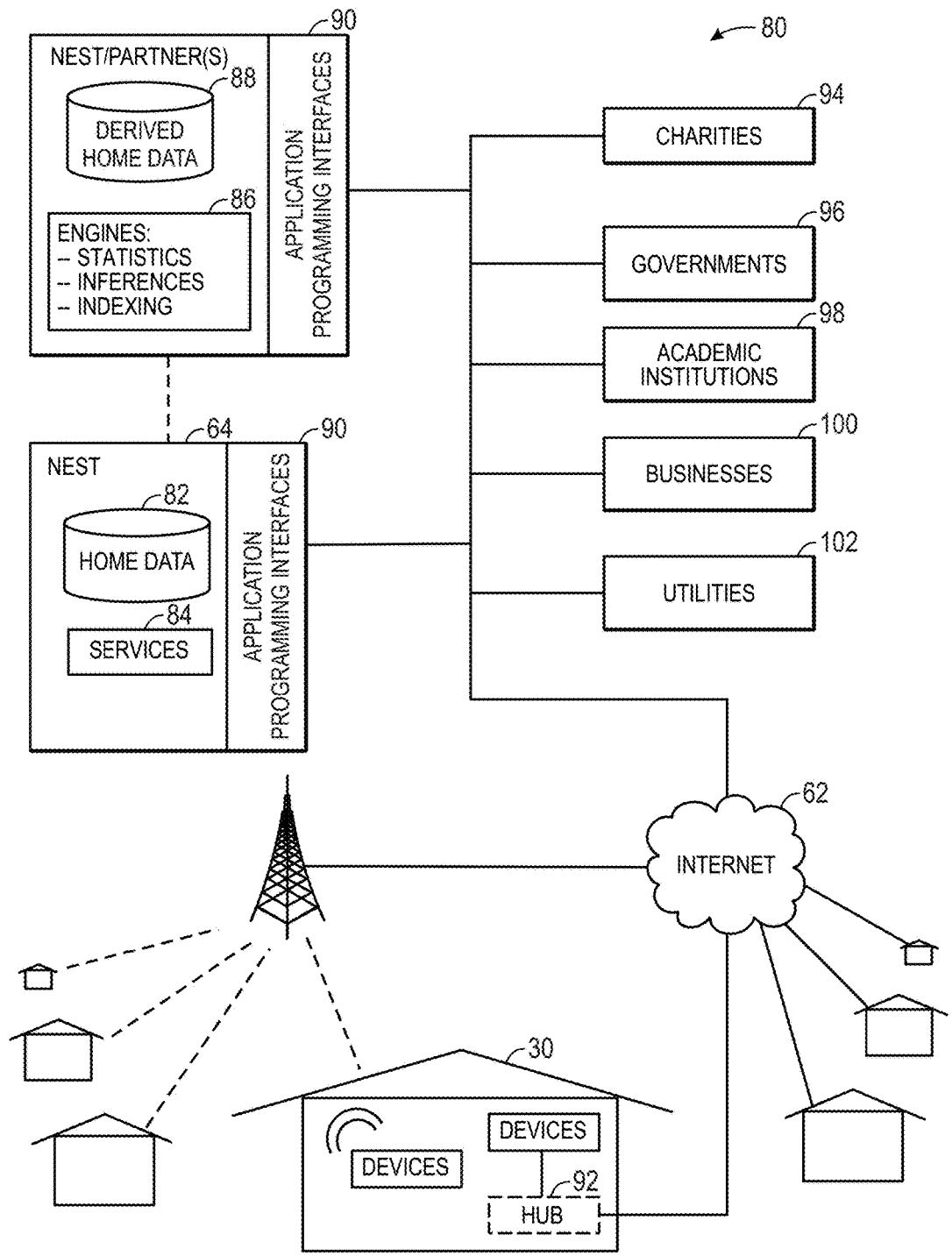
FIG. 3 illustrates a network-level view of an extensible devices and services platform with which the smart-home environment of FIG. 2 can be integrated, in accordance with an embodiment.

As illustrated in FIG. 3, an embodiment of the extensible devices and services platform 80 includes a processing engine 86, which can be concentrated at a single server or distributed among several different computing entities without limitation. The processing engine 86 can include engines configured to receive data from devices of smart-home environments 30 (e.g., via the Internet 62 or a hubbed network), to index the data, to analyze the data and/or to generate statistics based on the analysis or as part of the analysis. The analyzed data can be stored as derived home data 88.

Results of the analysis or statistics can thereafter be transmitted back to the device 10 that provided home data used to derive the results, to other devices 10, to a server providing a webpage to a user of the device 10, or to other non-device entities. For example, use statistics, use statistics relative to use of other devices 10, use patterns, and/or statistics summarizing sensor 12 readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device 10 usage across a population of devices 10 and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices 10 located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices 10 are used to detect sound, vibration, and/or motion created by running water. Based on the detected sound, vibration, and/or motion, the central server or cloud-computing architecture 64 makes inferences about water usage in the home and provides related services. For example, the central server or cloud-computing architecture 64 can run programs/algorithms that recognize what water sounds like and when it is running in the home. According to one embodiment, to map the various water sources of the home, upon detecting running water, the central server or cloud-computing architecture 64 sends a message to an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing architecture 64 will know that the water usage at that time is associated with that toilet. Thus, the central server or cloud-computing architecture 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices 10 are used to detect sound, vibration, and/or motion created by mice and other rodents as well as by termites, cockroaches, and other insects (collectively referred to as "pests"). Based on the detected sound, vibration, and/or motion, the central server or cloud-computing architecture 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing architecture 64 can determine the "signatures" of particular types of pests.

For example, in the event the central server or cloud-computing architecture 64 detects sounds that may be associated with pests, it notifies the occupants of such sounds and suggests hiring a pest control company. If it is confirmed that pests are indeed present, the occupants input to the central server or cloud-computing architecture 64 confirms that its detection was correct, along with details regarding the identified pests, such as name, type, description, location, quantity, etc. This enables the central server or cloud-computing architecture 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third-party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps, that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
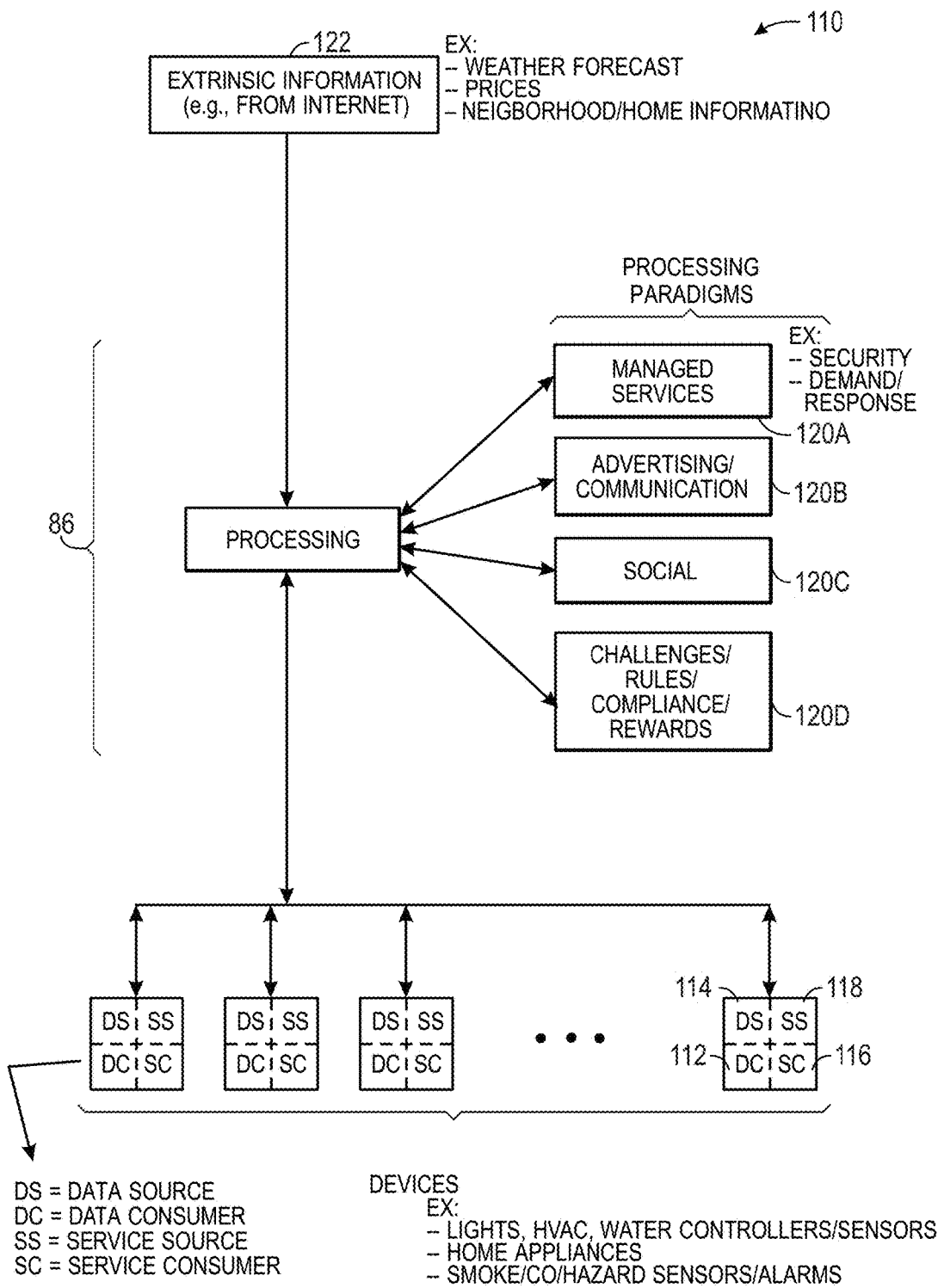
FIG. 4 illustrates an abstracted functional view of the extensible devices and services platform of FIG. 3, with reference to a processing engine as well as devices of the smart-home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices 10 situated in smart-home environments 30 will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices 10 to achieve their local and immediate objectives, the extensible devices and services platform 80 can also be configured to harness the large amount of data that is flowing out of these devices. In addition to enhancing or optimizing the actual operation of the devices 10 themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120a that monitors and manages primary or secondary device 10 functions. The device 10 functions can include ensuring proper operation of a device 10 given user inputs, estimating that (e.g., and responding to an instance in which) an intruder is or is attempting to be in a dwelling, detecting a failure of equipment coupled to the device 10 (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device 10 interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share the setpoint schedules generated that result in low power bills and other users may download the setpoint schedule to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat 46 by one degree for one week. Those that successfully complete the challenge are rewarded, such as by coupons, virtual currency, status, etc. Regarding compliance, an example involves a rental-property owner making a rule that no renters are permitted to access certain owner's rooms. The devices 10 in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device 10, to determine a characteristic of the environment near the device 10 (e.g., outside a structure that the device is enclosed in), to determine services or products available to the user, to identify a social network or social-network information, to determine contact information of entities (e.g., public-service entities such as an emergency-response team, the police or a hospital) near the device 10, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Enhanced Automated Control Scheduling

An enhanced automated control scheduling may enable improving efficiency and providing automated device control schedules that may control device settings of smart devices 10 in a way that is more closely tailored to the user's preferences as revealed through their behavior than might be a rules-and-exceptions-based approach. The device control schedules also may be more efficient, among other things. The preference function may be used to plan out an automated device control schedule. In the case of smart lighting, the automated device control schedule may be a lighting schedule that controls lighting levels in relation to time of day or other factors, such as content being displayed on a television or tablet device. In the case of a variable-height desk, the automated device control schedule may control a height of the desk in relation to time of day. Indeed, any suitable control schedule for any suitable electronic device that can be controlled automatically according to such a schedule may be generated based on a corresponding preference function as taught by this disclosure. In effect, this enhanced automated control scheduling provides a holistic view of user behavior upon which to generate an automated control schedule.

In the following discussion, the automated device control schedule may include a setpoint schedule used by a smart thermostat to control an environmental control system. It should be appreciated that, while an HVAC system is discussed by way of example as an environmental control system that may be controlled by a smart thermostat according to this disclosure, the disclosed systems and methods may be used with any suitable environmental control system that can adjust the temperature of a structure (e.g., an environmental control system that automatically opens windows or vents to raise or lower the temperature in the structure, or a system that cools only or heats only). It should also be appreciated that, while the enhanced automated control scheduling is performed by the smart thermostat by way of example according to this disclosure, in some embodiments, the enhanced automated control scheduling may be performed by another device in the smart home environment, an online service, or some combination thereof, and the automated schedule may be provided to the device.

Figure 5:
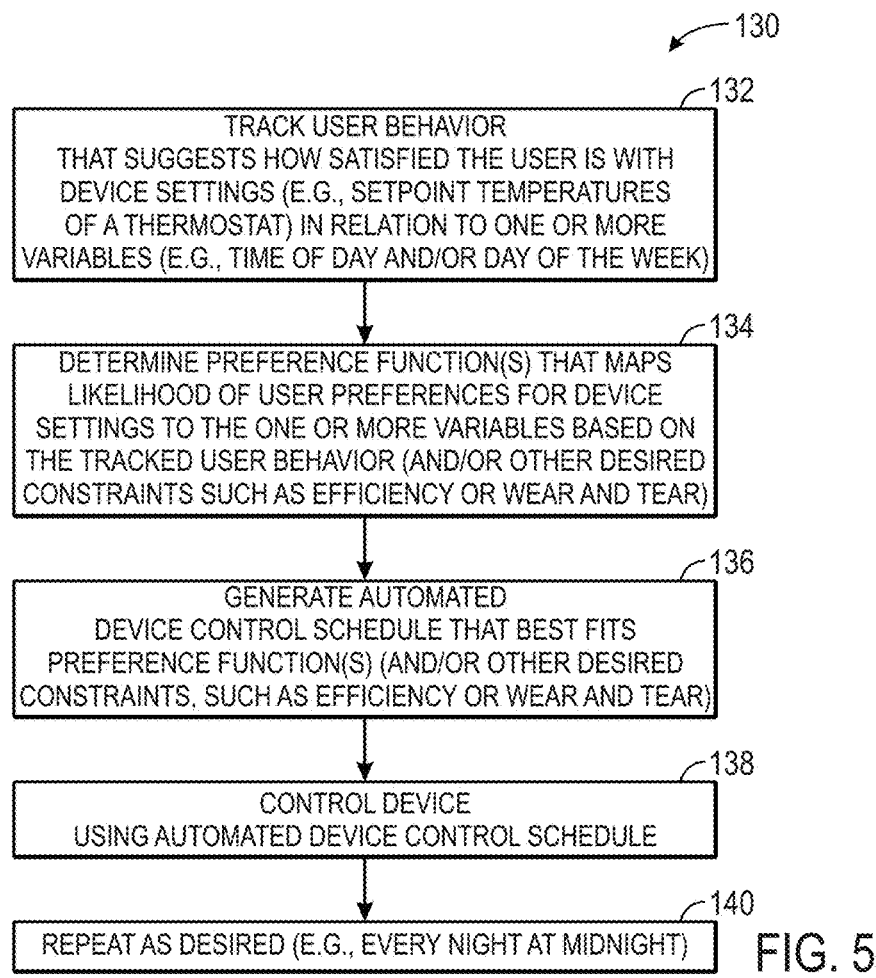
FIG. 5 illustrates a flow diagram of a process suitable to determine an automated device control schedule that best fits a preference function based at least partly on user behavior, in accordance with an embodiment.

With the foregoing in mind, FIG. 5 illustrates a flow diagram of a process 130 suitable for determining an automated device control schedule that best fits a preference function, in accordance with an embodiment. The process 130 may be implemented as computer instructions stored on one or more tangible, non-transitory computer-readable medias (e.g., memory 27) and executable by one or more processors 28. The process 130 may include tracking user behavior that suggests how satisfied the user is with device settings (e.g., setpoint temperatures of a thermostat) in relation to one or more variables (e.g., time of day and/or day of the week) (process block 132). The process 130 may also include determining one or more preference functions that map the likelihood of user preferences for device settings to the one or more variables based on the tracked user behavior and/or other desired constraints, such as efficiency or wear and tear (process block 134). Once the preference function is determined, the process 130 may include generating an automated device control schedule that best fits the preference functions and/or other desired constraints, such as efficiency or wear and tear (process block 136). The device may be controlled using the automated device control schedule (process block 138), and the process 130 may be repeated as desired (e.g., every night at midnight) (process block 140).

Figure 6:
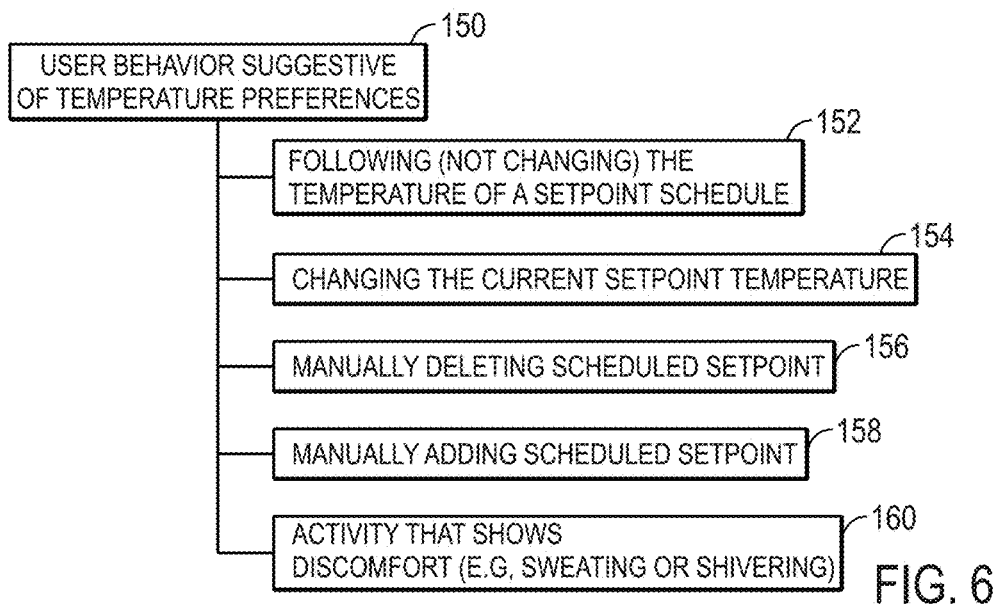
FIG. 6 illustrates a schematic diagram of user behavior suggestive of preferences for temperature settings of a smart thermostat, in accordance with an embodiment.

Some user behavior that may be suggestive of temperature preferences 150 is illustrated in FIG. 6. A first user behavior 152 that may be tracked includes following (not changing) the temperature of a setpoint schedule. If the user follows (does not change) the temperature of a setpoint schedule while the device, it may be presumed that the user is comfortable with that temperature and prefers that temperature at the times the temperature was followed. A second user behavior 154 that may be tracked includes changing the current setpoint temperature. Changing the current setpoint temperature may refer to a user using the device or accessing the device via a web application to move the setpoint temperature up or down. Changing the current setpoint temperature is not equivalent to adding a setpoint to a setpoint schedule because changing the current setpoint temperature may be a onetime change.

A third user behavior 156 that may be tracked is manually deleting a scheduled setpoint. This behavior strongly suggests that the user does not want a temperature setpoint where it has been deleted. A fourth user behavior 158 that may be tracked is manually adding a schedule setpoint. Manually adding a scheduled setpoint may refer to adding or moving a setpoint temperature at a setpoint time on a setpoint schedule for an upcoming period of time. A fifth user behavior 160 that may be tracked includes activity that shows discomfort (e.g., sweating, shivering, or fitful sleep). If the device detects that the user is sweating at a certain setpoint temperature and time period, the device may learn that the setpoint temperature is too warm during that time period. Likewise, if the device detects that the user is shivering, the device may raise the setpoint temperature during the associated time period where the user is presumed to be uncomfortable in future setpoint schedules.

Figure 7:
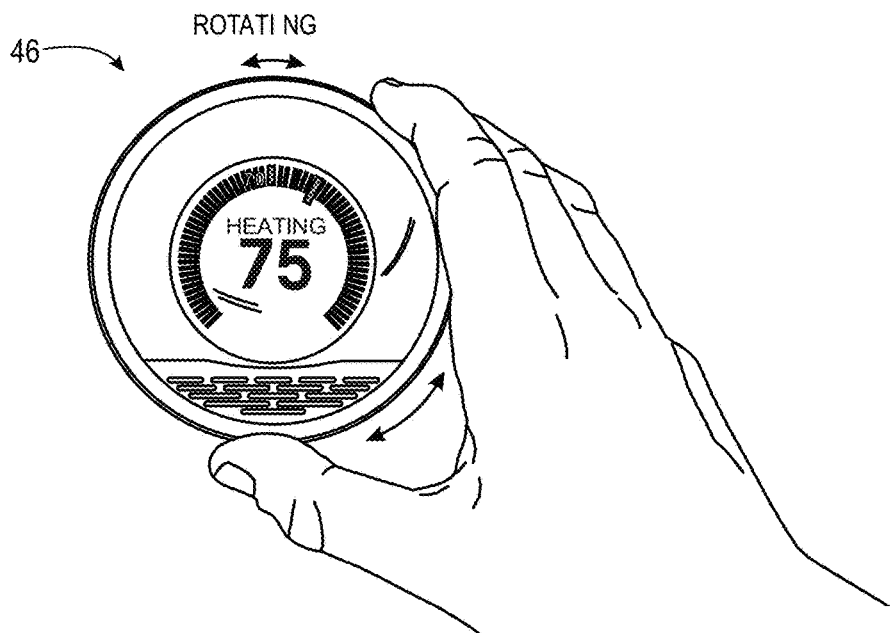
FIG. 7 illustrates a perspective view of a user changing a temperature setting of a thermostat by physically rotating the thermostat, in accordance with an embodiment.
Figure 8:
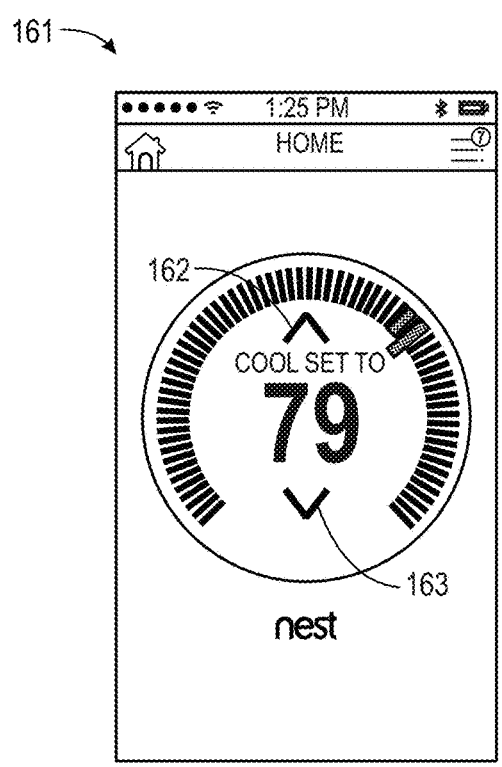
FIG. 8 illustrates a view of a user changing a temperature setting of a thermostat via an application program that remotely controls the thermostat, in accordance with an embodiment.
Figure 9:
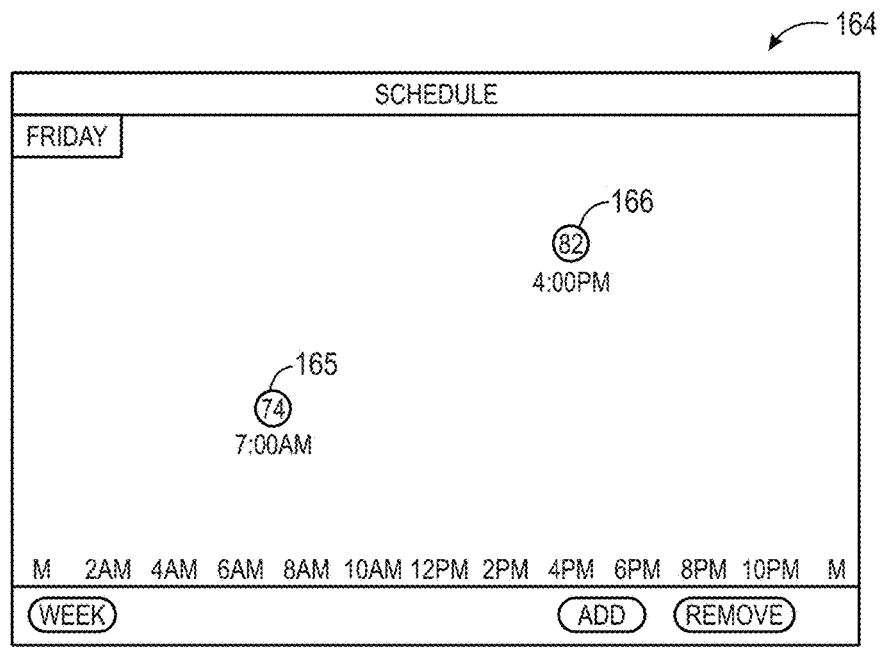
FIG. 9 illustrates a view of a user manually adjusting a setpoint schedule used to control the thermostat via an application program that remotely controls the thermostat, in accordance with an embodiment.

FIGS. 7-9 provide examples of some of the behavior mentioned above. In particular, FIG. 7 illustrates a perspective view of a user changing a temperature setting of a smart thermostat 46 by physically rotating the thermostat, in accordance with an embodiment. It should be noted that although a smart thermostat 46 is used as an example throughout the discussion, any suitable electronic device 10 may be used that has access to a structure's thermal properties and temperature feedback. The thermostat 46 may include the hardware and/or software of the device 10 described above that can be used to implement the specific embodiments described herein. In the depicted embodiment, the thermostat 46 may be controlled by two types of physical user input, the first being a rotation of the outer ring 132, and the second being an inward push on an outer cap 134 until an audible and/or tactile "click" occurs. In some embodiments, controlling the thermostat 46 may also include accessing the thermostat 46 from a portable electronic device using an application program or from a secure web portal using a browser on a computer or portable electronic device.

FIG. 8 illustrates a view of a user changing a temperature setting of a thermostat 46 via an application program screen 161 that remotely controls the thermostat 46, in accordance with an embodiment. The application program may be accessible via a smart phone, tablet, computer, or the like which includes an electronic display. As illustrated, the user may actuate an upward arrow 162 by pressing a touch screen or clicking a mouse cursor to raise the temperature. Also, the user may actuate a downward arrow 163 by pressing a touch screen or clicking a mouse cursor to lower the temperature. The screen 161 may display the updated setpoint temperature to the user.

FIG. 9 illustrates a view of a user manually adjusting a setpoint schedule used to control the thermostat via a screen 164 on an application program that remotely controls the thermostat 46, in accordance with an embodiment. The setpoint schedule represents the setpoints manually added to a weekly schedule, here modifying a Friday, using the application program. In the depicted embodiment, the user has manually added two setpoints 165 and 166. The first setpoint 165 was manually added with a setpoint temperature of 74° F. for 7:00 AM and the second setpoint 166 was manually added with a setpoint temperature of 82° F. for 4:00 PM (16:00). It may be understood that the user followed the setpoint temperature from midnight to 7:00 because there are no setpoints prior to 7:00. Likewise, it should also be assumed that the user followed the first setpoint temperature from 7:00 AM to 4:00 PM, and the user followed the second setpoint temperature from 4:00 PM to midnight. By tracking the user's behavior, a preference function may be determined that maps the likelihood of user preferences for device settings to one or more variables.

Figure 10:
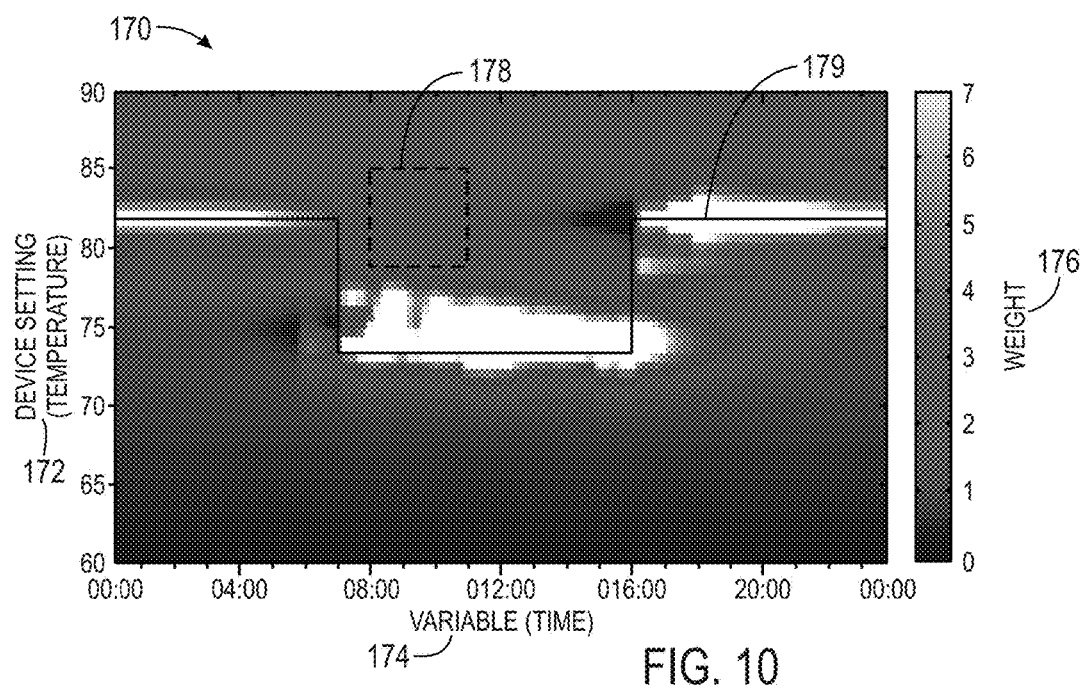
FIG. 10 illustrates a preference function that may be developed based on the user interactions of FIGS. 7-9, in accordance with an embodiment.

For example, FIG. 10 illustrates a preference function that may be developed based on the user interactions of FIGS. 7-9, in accordance with an embodiment. In the illustrated embodiment, the preference function 170 relates user preferences for device settings 172 (in this case, temperature settings of the thermostat 46) to a variable 174 (in this case, time of day) by adding or subtracting a weight 176 (process block 134 of FIG. 5). The weight that was added or subtracted from each temperature and time coordinate may be selected from a range of weights 176. It should be noted that any suitable range of weights 176 may be used and the disclosure is not limited to the specific weights used in the range of weights 176. The depicted range of weights 176 ranges from 0, being the lowest weight and represented by the darkest color, to 7, being the highest weight and represented by the lightest color. Since the weights are relative, however, any suitable range may be employed.

In the example preference function of FIG. 10, from midnight to 7:00, where the user followed the setpoint temperature, a relatively light (e.g., heavily weighted) band is present around 82° F., representing a medium weight has been added to 82° F. from midnight to 7:00. Then, at 7:00, when the user manually added a setpoint to 74° F., a relatively high weight is added around that point and gradually reduced to produce a very light band around 74° F. until 16:00. Here, a relatively high weight (e.g., 6 or 7) has been added to 74° F. at 7:00 and gradually smoothed to a relatively constant lower weight extending to 16:00. After the setpoint temperature was changed from 82° F. at 7:00 to the manually added setpoint of 74° F., there may be a banned area 178 introduced in the preference function that inhibits setpoints from being selected in automated device control schedules too close in time after the added setpoint because it may be assumed that the user prefers the added setpoint temperature at the setpoint time and changing the setpoint too quickly may cause user frustration. Further, at 16:00, a very light band is present around 82° F. until midnight because the user manually added a setpoint with a setpoint temperature of 82° F. at 16:00, according to the setpoint schedule of FIG. 9.

Figure 11:
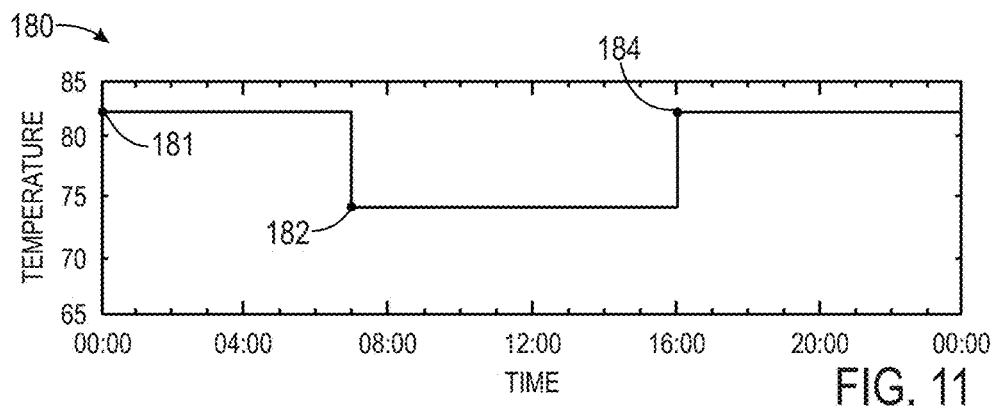
FIG. 11 illustrates an automated device control schedule that best fits the preference function of FIG. 10, in accordance with an embodiment.

An automated device control schedule may be generated that best fits the preference function (process block 136 of FIG. 5). A line 179 represents a candidate setpoint schedule that may best fit the preference function 170. The line 179 goes from midnight to 7:00 setpoint temperature=82° F., 7:00 to 16:00 setpoint temperature=74° F., 16:00 to midnight setpoint temperature=82° F., exactly along the highest weights of the preference function 170. FIG. 11 illustrates an example of an automated device control schedule 180 that tracks the line 179, which best fits the preference function 170 of FIG. 10. The automated device control schedule 180 generated includes a setpoint temperature 181 of 82° F. from midnight to 7 AM, then a scheduled setpoint 182 with a setpoint temperature of 74° F. at 7:00 until 16:00, and a scheduled setpoint 184 with a setpoint temperature of 82° F. at 16:00 to midnight. The automated device control schedule 180 selected the setpoint temperatures and setpoint times that optimized the score when processed against the preference function 170 of FIG. 10. It should be appreciated that the automated device control schedule 180 "learned" two setpoints 182 and 184 using a preference function indicative of user preferences based on user behavior. The generated automated device control schedule 180 may be applied to control the device accordingly (process block 138 of FIG. 5).

Generating Preference Functions

Keeping the overview of the enhanced automated control scheduling discussed above in mind, certain details of generating preference functions are now described. As noted above, a preference function may indicate a likelihood of user preferences for device settings (e.g., temperature settings for a smart thermostat) in relation to some variable (e.g., time of day). As previously described, a preference function may be characterized as a function including at least two variables (in one example, temperature and time of day), and a scalar range of weights. The preference function may accept a temperature and time as input and output an associated weight. The weight may be added to or subtracted from a temperature and time combination based on the type of user behavior and whether the behavior suggests user preference or disinterest in the temperature and time combination.

Figure 12:
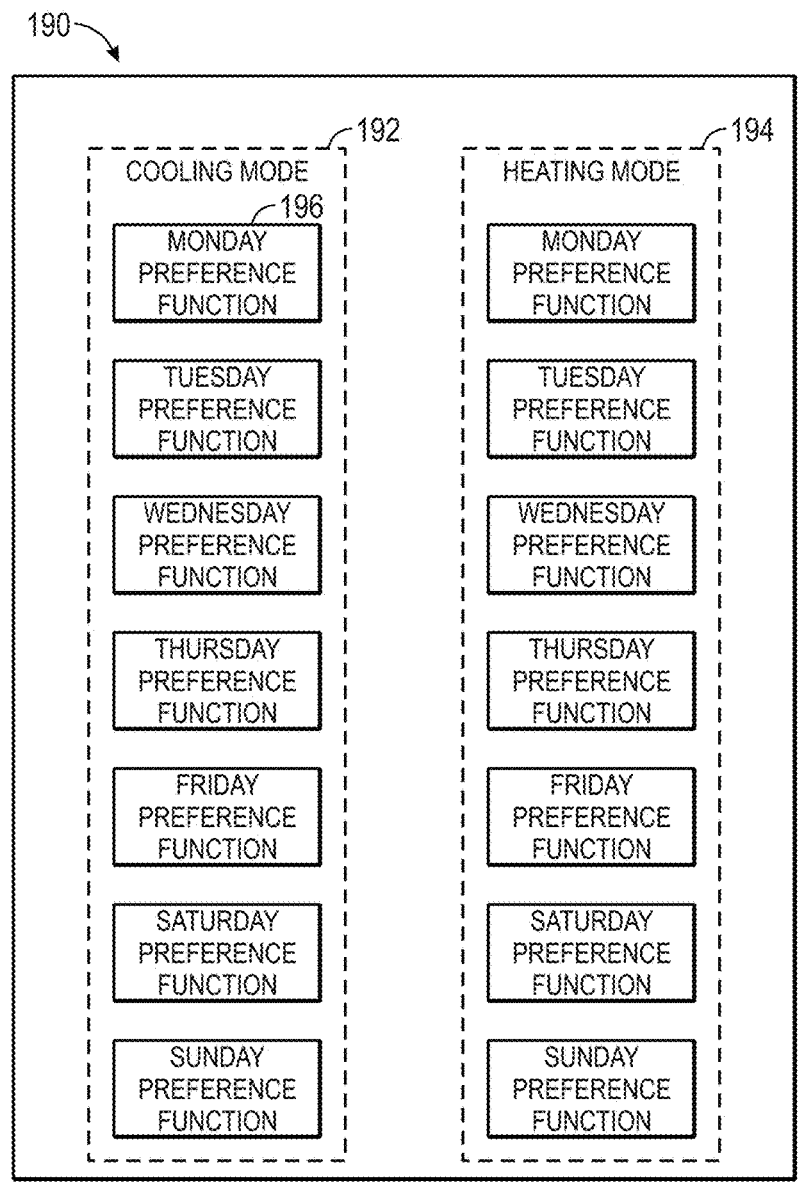
FIG. 12 illustrates a tangible, non-transitory computer-readable medium storing cooling mode and heating mode preference functions for each particular day of the week, in accordance with an embodiment.

Before discussing the generation of preference functions in greater detail, it may be first appreciated that any suitable number of preference functions may be maintained. For example, FIG. 12 illustrates a tangible, non-transitory computer-readable medium 190 that maintains a first set 192 of seven preferences functions for a cooling mode and a second set 194 of seven preference functions for a heating mode, for a total of two preference functions corresponding to each day of the week. As may be appreciated, an HVAC system may include various modes, such as cooling, heating, and range (e.g., heat if temperatures drop below some level and cool if temperatures exceed some level). In some embodiments, the preference functions may not be updated with new user interactions unless the user has kept the device in a mode for some amount of time. For example, the cooling mode preference function for Monday 196 may only be updated if the thermostat 46 was in cooling mode for at least some threshold percentage of time on Monday (e.g., 75%, 80%, 90%, 95% or beyond). Likewise, a heating preference function may only be updated based on user behavior if the thermostat was in heating mode for at least some threshold percentage of time on a given day. Also, it should be noted that the cooling mode preference functions 192 may be used for cooling in ranged mode and the heating mode preference functions 194 may be used for heating in ranged mode. The cooling mode preference functions 192 may apply efficiency bonuses differently than the heating mode preference functions 194. For example, higher efficiency bonus weights may be added to higher temperatures that are more efficient in cooling mode, whereas higher efficiency bonus weights may be added to lower temperatures that are more efficient in heating mode. Separating the preference functions into cooling and heating modes may enable more accurate automated setpoints schedules being selected when weather seasons change and the thermostat 46 switches between cooling, heating, and ranged modes.

It should be appreciated that, while certain embodiments involve preference functions of one day duration as shown in FIG. 12, other embodiments may employ preference functions of other suitable duration (e.g., a weeklong preference, a weekday preference function, a weekend preference function, a daytime preference function, a nighttime preference function, and so forth).

Figure 13:
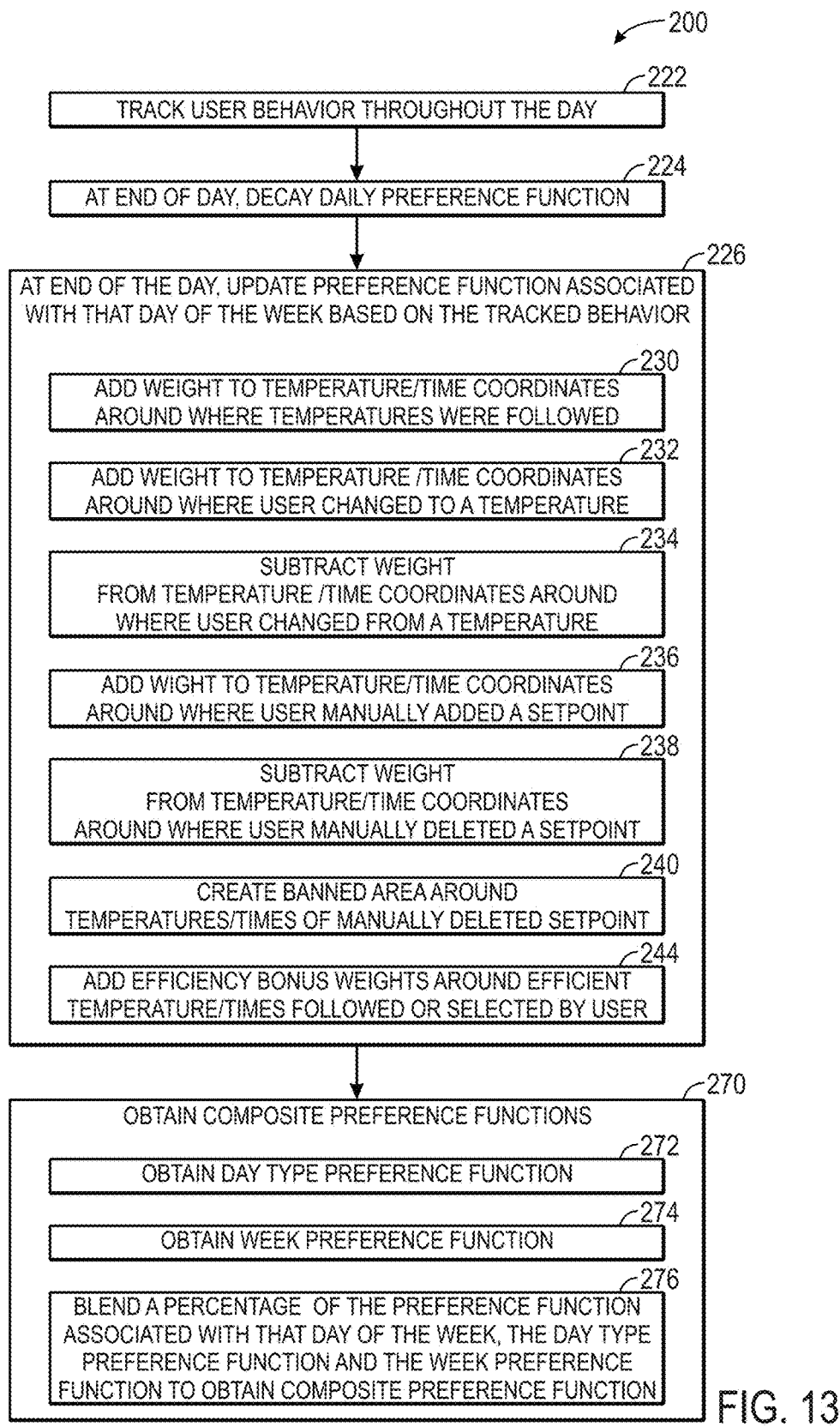
FIG. 13 illustrates a flow diagram of a process for obtaining a weekly preference function by updating a daily preference function based at least partly on user behavior and compositing multiple preferences including the daily preference function, in accordance with an embodiment.

A process 200 suitable for generating a preference function for a particular day of the week based on tracked user behaviors during that day is illustrated in a flow diagram in FIG. 13, in accordance with an embodiment. The process 200 may be implemented as computer instructions stored on one or more tangible, non-transitory computer-readable medias (e.g., memory 27) and executable by one or more processors 28. Some or all components of the process 200 may take place on the device 10 (e.g., thermostat 46) that is going to be controlled, or may take place elsewhere (e.g., another device 10 or an online service, such as the Nest® service).

Figure 14:
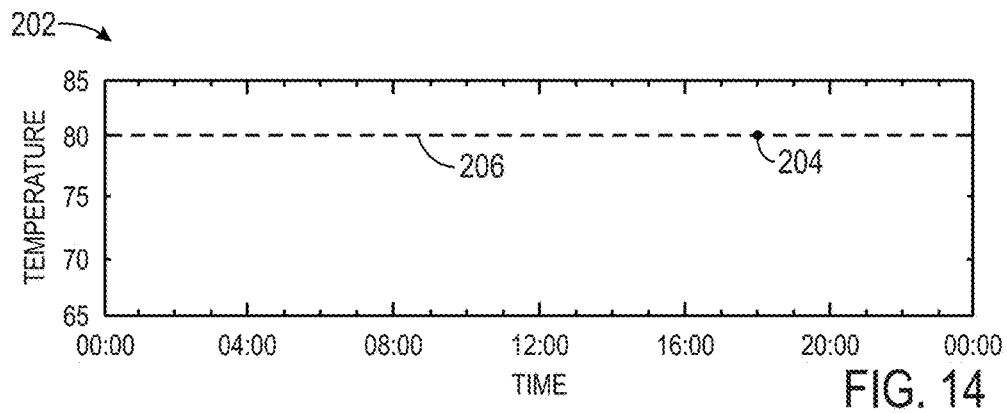
FIG. 14 illustrates an example setpoint schedule for a current day, in accordance with an embodiment.
Figure 15:
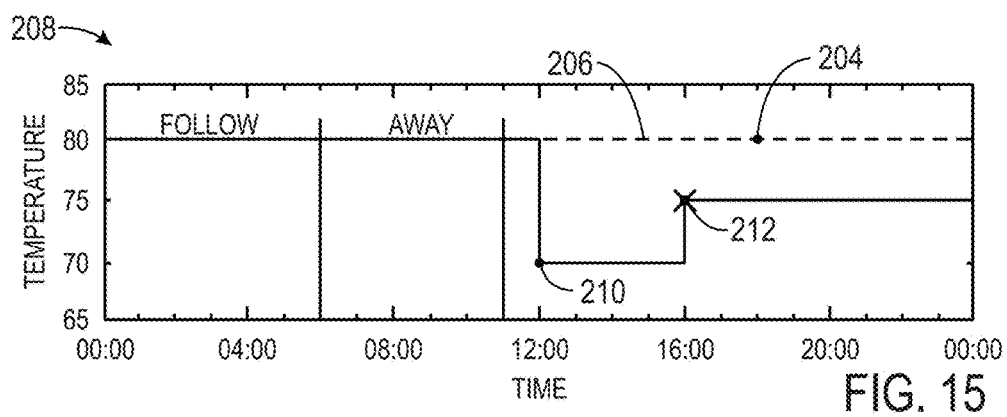
FIG. 15 illustrates an example of user behavior during the current day relating to temperature preferences, in accordance with an embodiment.

For purposes of this discussion, the process 200 should be understood to be updating a setpoint schedule 202 for a current day as shown in FIG. 14. The setpoint schedule 202 of FIG. 14 includes only one setpoint 204 at 80° F. at 18:00. Thus, the setpoint temperature 206 would remain the same (80° F.) throughout the entire day if the user did not adjust the temperature throughout the day. However, on this particular day, the user is shown to have interacted with the thermostat 46, as illustrated in FIG. 15, which provides an example of daily user behavior in a plot 208. As depicted in the plot 208, the user followed the original setpoint temperature 206 until 6:00, when the user left the structure and was away until almost 12:00. After returning to the structure, the user changed the setpoint temperature 206 from 80° F. to a new temperature 210 of 70° F. at 12:00. Also, at some point during the day, the user manually added setpoint 212 including a setpoint temperature of 74° F. at 16:00 and manually deleted the previously scheduled setpoint 204 represented by the "X."

Using the user's behavior (e.g., as shown in the plot 208 of FIG. 15) for the current day, a preference function 220 may be determined that maps weights relating the user's revealed preferences for certain temperature and time coordinates. For example, FIGS. 16-21 illustrate how a preference function 220 may be built by updating a previously stored preference function 220 for the current day. The preference function 220 is illustrated in FIGS. 16-20 as a matrix with mapped weights that will be adjusted based on the user's behavior shown in FIG. 15. For discussion purposes, the preference function is represented as a 12 row by 12 column matrix of weights associated with time/temperature coordinates. In an actual implementation, any suitable number of coordinates in any suitable discrete increments may be employed.

It should be noted that the elements that are shown as empty in the preference function 220 may include a weight of 0. It should also be noted that "elements" may also be referred to as "coordinates" herein. In the example of FIGS. 16-21, each element represents a 2.5° F. temperature range and a 2 hour time interval. It should be understood that the temperature ranges and time intervals represented by the elements are for illustration purposes only and, in some embodiments, the preference function may assign a weight to any suitable temperature range (e.g., every 1° F. or ° C., every 0.5° F. or ° C., every 0.1° F. or ° C., every 0.05° F. or ° C., or the like) or time interval (e.g., every second, every 5 seconds, every 30 seconds, every 1 minute, every 15 minutes, every 30 minutes, every 1 hour, or the like).

Figure 16:
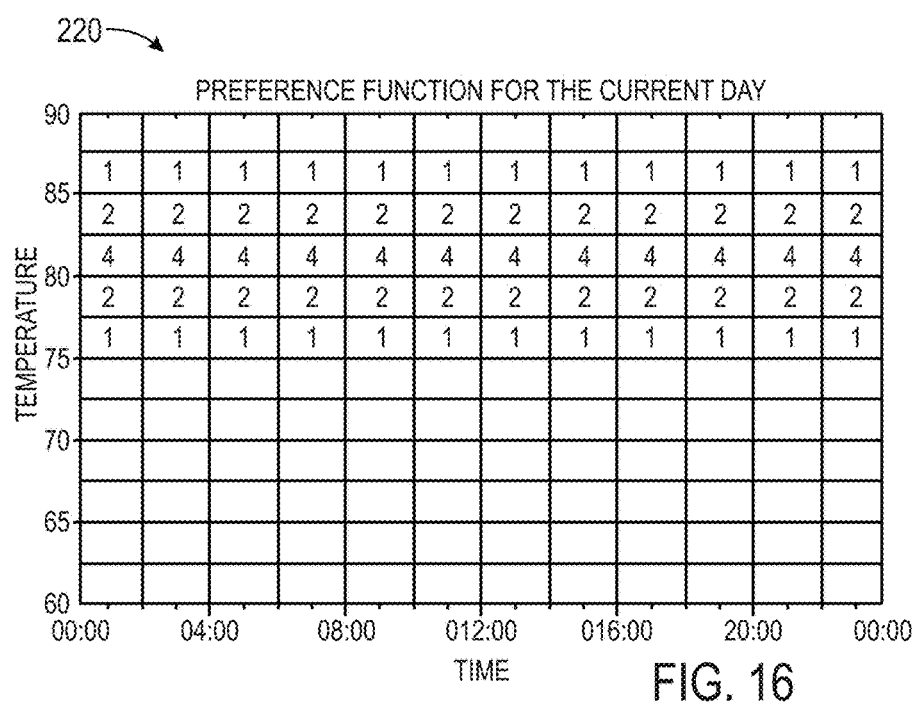
FIG. 16 illustrates a daily preference function for the current day, which maps weights indicating user preferences for particular temperatures at certain times of day, in accordance with an embodiment.

The preference function 220 in the example of FIG. 16 is a previously generated daily preference for the current day (e.g., Monday). It should be noted that zero weight may be added to any default temperatures in the preference function where no event (e.g., setpoint change, manual setpoint addition, setpoint followed, being nearby a setpoint, etc.) occurred. Also, if the preference function is generated anew based on a previous setpoint schedule from a rules-and-exception approach, the highest weights (e.g., 7, 9, 10.50, 12, or the like) may be added to the setpoint temperature/time coordinates from the previous setpoint schedule to provide the highest learning deference, and a larger decay (e.g., 60%, 65%, 70%, 75%, or the like) applied to nearby temperatures to create a wider spread of weight distributions, as discussed in more detail below. It may be understood that past user behavior resulted in the previously generated preference function 220, and that from the previously generated preference function 220 of FIG. 16, the current setpoint schedule of FIG. 14 was previously generated. But as noted above, the user's behavior on this day, as shown in FIG. 15, is suggestive of preferences for a setpoint schedule different from than that of FIG. 14. Thus, the previously generated daily preference function 220 of FIG. 16 will be updated to incorporate that new user behavior of FIG. 15.

Indeed, the process 200 of FIG. 13 may include tracking user behavior throughout the day (process block 222) to track the user behavior shown in FIG. 15. It should be noted that if there is a threshold amount of data missed for a day (e.g., more than 5 MB, LOMB, 15 MB, or the like) or a threshold amount of time where data was missed (e.g., more than 5 minutes, 10 minutes, 15 minutes, or the like), then the process 200 may not continue—that is, the preference function 220 for the day, shown in FIG. 16, may be allowed to remain unchanged; likewise, the current weekly setpoint schedule may also be allowed to remain unchanged under those conditions.

The user behavior that is tracked at process block 222 may include the examples described above (e.g., following a temperature, changing a setpoint temperature, manually adding or deleting a scheduled setpoint, or the like). Examples of these behaviors are presented by way of example in FIG. 15. Continuing with the process 200 of FIG. 13, at the end of each day, the preference function 220 associated with that particular concluding day may be decayed (process block 224) to gradually reduce the impact of past user behavior in relation to new user behavior. Decaying the preference function may refer to reducing the weights assigned to each temperature and time coordinate by a certain amount or percentage. For example, the preference functions for each day may be decayed each week to half, 75%, 85%, 90%, 95%, 96%, 97%, or 98%, to name a few examples, of their previous state. In some embodiments, the decay may be exponential, but it should be appreciated that any form of decay may be used, such as linear, non-linear, logarithmic, quadratic, Gaussian, and the like. For example, if a constant rate of decay is desired, linear decay may be used, or if a constant percentage rate of decay is desired, exponential decay may be used.

Decaying the older weights in the preference function may enable determining consistent user temperature preferences by identifying overlaps of weights when the new user behaviors are mapped to the decayed preference function, among other things, thereby gradually filtering out inconsistent or onetime temperature changes that happened in the past. Further, using the decay functionality may enable phasing out the old weights over a configurable amount of time (e.g., two weeks, three weeks, a month, two months, and so forth) by increasing the decay factor based on the age of the data. In some embodiments, the amount of decay may be higher earlier on in the life of the electronic device 10 and lower after the electronic device 10 has had a chance to "learn" the preferences of the user. For example, if the current setpoint schedule is obtained from an external source, the setpoint schedule may be initially "burned-in" for some period of time (e.g., the first week or the first few weeks after transferring from a rule-and-exception-based learning approach) by adding certain weights to the temperature/time coordinates associated with a previous setpoint schedule into the preference function so the enhanced automated control scheduling can learn the setpoint schedule. Further, there may be a higher "burn-in" decay applied to the weights at the temperature and time coordinates to allow the preference function to change rapidly at first (e.g., the first week or the first few weeks after transferring from a rule-and-exception-based learning approach), and to change more slowly later. In some embodiments, if a current setpoint schedule does not exist, a setpoint schedule for the upcoming week may be generated anew and a new preference function started based on that new setpoint schedule.

Figure 17:
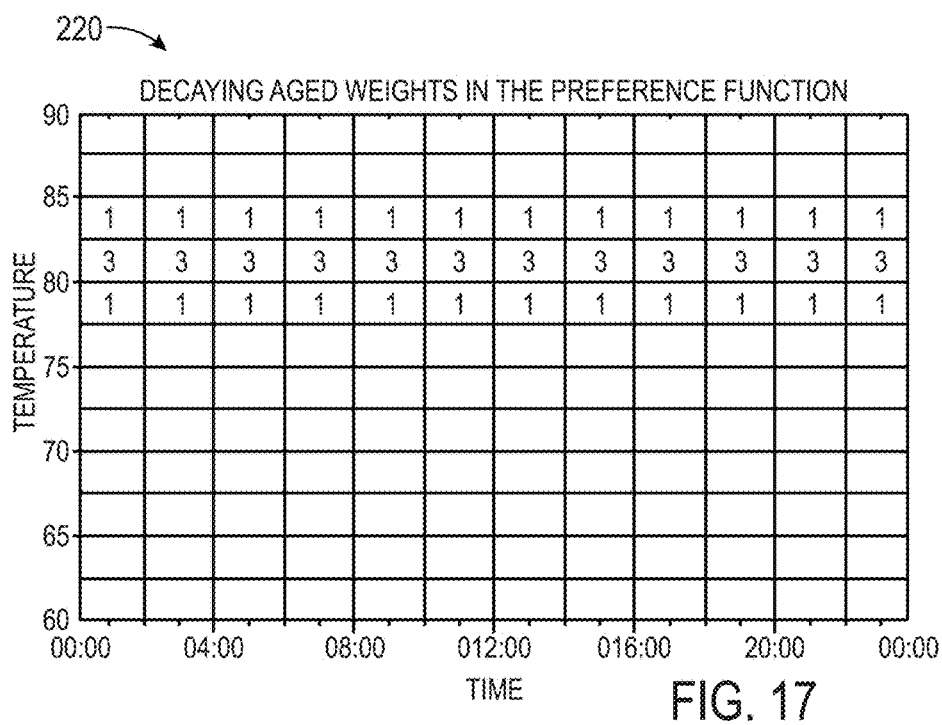
FIG. 17 illustrates decaying aged weights in the daily preference function to give more weight to more recent user behavior over time, in accordance with an embodiment.

Decaying the preference function 220 of FIG. 16 as in the process block 224 of FIG. 13 may produce a preference function 220 shown in FIG. 17. FIG. 17 illustrates the preference function 220 that results after decaying the weights of FIG. 16, in accordance with an embodiment. As illustrated, the weights previously mapped have been reduced by a percentage using decay in the preference function 220. That is, the decayed weight for the setpoint temperature is now 3 instead of 4 and the nearby temperature weights are now 1 instead of 2 or 0 instead of 1.

After the preference function for the associated day is decayed (process block 204), the preference function may also be updated based on the user interactions with the thermostat 46, or lack thereof, during the current day (process block 226 of FIG. 13). As described above, in the present example, according to the plot 208 of user behavior shown in FIG. 15, the user followed the setpoint temperature for a period of time, went away for a period of time, changed the setpoint temperature, manually added a setpoint, and manually deleted a setpoint. As such, various weights may be added and subtracted from temperatures and time coordinates where events occurred or did not occur. It should be appreciated that the various adjustments to the preference function may occur in any suitable order and are provided in the following order by way of example for ease of discussion.

Before describing the specifics of how the weights of the preference function are added and subtracted based on user behavior, it may be useful to describe several functions that the process 200 may use to add and subtract weights from temperature and time coordinates in the preference function. For purposes of explanation, it should be assumed that the preference function may be expressed as PREF(TOD, TEMP), where TOD stands for "time of day" and TEMP stands for temperature. Next, assume that the user interacts with the thermostat 46 by, for example, changing the setpoint temperature. Based on the user interaction, an ADD mathematical operation may be triggered to add a weight of magnitude "X" to the preference function at TOD1, TEMP1. In some embodiments, the ADD operation may be expressed as follows:

PREFNEW(TOD,TEMP)=PREF(TOD,TEMP)+(X)
ADD(TOD−TOD1,TEMP−TEMP1)

The ADD operation may have a width in both the horizontal (time of day) and vertical (temperature) directions. That is, the ADD operation may add a certain weight to the specific temperature and time of day implicated in the event and also add an exponentially decayed weight forward in time for a certain duration of time. Based on certain parameters, the weight may not be decayed less than a percentage of its peak value from the past and, based on hindsight, the horizontal width of the ADD operation may be stopped when a known event at a subsequent time is encountered. For example, the decay may be stopped if it is known that the setpoint temperature changes again at a subsequent time during the same day. Vertically, the ADD operation may cause weights to be added above and below the setpoint temperature to nearby temperatures within a threshold amount of degrees from the setpoint temperature. The weights may decay exponentially as they expand further away from the setpoint temperature (increase and decrease in temperature).

Likewise, a SUBTRACT mathematical operation may be used to subtract weights from the preference function. For example, if a user turns away from a setpoint temperature, then weights of magnitude "X" may be subtracted from TOD2, TEMP2. The SUBTRACT operation may also include a width in both the horizontal (time of day) and vertical (temperature) directions, similar to the ADD operation. In some embodiments, the SUBTRACT operation may be expressed as follows:

PREFNEW(TOD,TEMP)=PREF(TOD,TEMP)−(X)
SUBTRACT(TOD−TOD2,TEMP−TEMP2)

In some embodiments, when adding and subtracting weights based on user interactions using the above operations, a hierarchy of weighting amounts may be followed. For example, in an embodiment where a highest weight of 10.50 may be assigned to manually added setpoints, for all other user interactions, various percentages of the highest weight may be added or subtracted. To illustrate, in some embodiments, a low weight of ~38%, 40%, 42%, or the like, of the highest weight (10.50), which equals a weight of 4, may be added to followed setpoint temperatures. For setpoint temperature changes, a high weight of ~59.5%, 60%, 61%, or the like, of the highest weight, which equals 6.25 may be added to the respective temperature and time coordinates. For the temperature from which the user changed, a low weight of ~28.5%, 29%, 30%, or the like, of the highest weight, which equals 3, may be subtracted from the respective temperature and time coordinates. To further illustrate the relative differences in percentages of the amount of weights added, in some embodiments, the amount of weight added to followed setpoint temperatures may be 100% to 140% greater than the amount of weight subtracted from temperatures from which the user changed away. Also, in some embodiments, the amount of weight added to setpoint temperatures changed to may be 130% to 160% greater than the amount of weight added to the followed setpoint temperatures. Further, in some embodiments the amount of weight added to manually added setpoints may be 230% to 280% greater than the amount of weight added to followed setpoint temperatures and may be 140% to 180% greater than the amount of weight added to temperatures to which the user changed.

Returning to the process 200 in FIG. 13, process block 230 may include adding weight to the temperature and time coordinates around where temperatures were followed using the ADD operation, as described above. In some embodiments, if the user follows a setpoint temperature, a low weight may be added to that temperature over the duration of time the temperature was followed (horizontally). That is, if a setpoint temperature is not changed away from for a duration of time, that setpoint temperature may receive a relatively low weight during that duration of time, since the user may be communicating a preference for that setpoint temperature at those times by not changing away from that setpoint temperature. In some embodiments, there may be a configurable amount of time that the device 10 has to be following the temperature before the low weight is added. For example, for every 15 minutes that the device 10 was following a setpoint temperature, whether the user selected the setpoint via interacting with the device 10 or the setpoint temperature was from the setpoint schedule, a low weight may be applied to the followed setpoint temperature. In some embodiments, the added weight may be decayed exponentially forward in time. In addition, weights may be added to temperatures nearby followed temperatures. The weights added to nearby temperatures may be decayed exponentially forward in time (horizontally) and as the temperatures increase or decrease away from the setpoint temperature (vertically). For example, in some embodiments, the percentage of decay applied to nearby temperatures may be 20%, 30%, 40%, 50%, 60%, or any suitable percentage. It should be understood, that in some embodiments, when the user is away, the preference function may treat those temperature and time coordinates as if the user were following those temperatures and add a weight to them.

Figure 18:
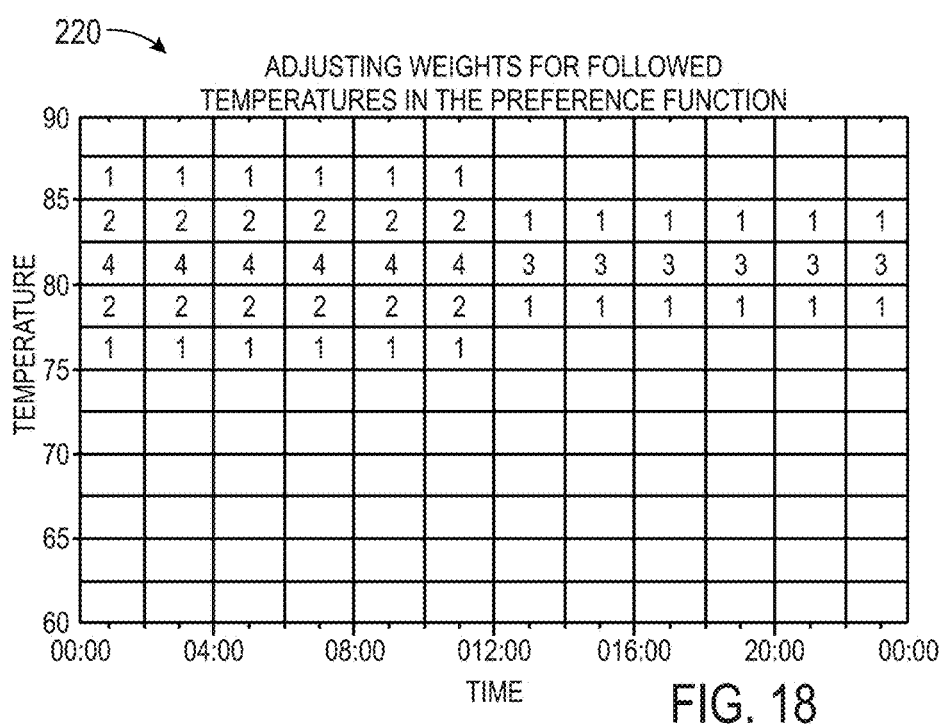
FIG. 18 illustrates adjusting weights for followed temperatures in the daily preference, in accordance with an embodiment.

As illustrated in FIG. 18, the preference function 220 is shown with adjusted weights for followed temperatures. According to the user's behavior in the graph 208 of FIG. 15, the user followed the setpoint temperature 206 until 6:00 and then went away until nearly 12:00. As a result, the preference function 220 of FIG. 18 added a low weight (1) to the setpoint temperature of 80° F. from midnight to 6:00, which increased the weight from 3 to 4. Also, low weights were added to nearby temperatures vertically from the setpoint temperature that was followed. Likewise, since the setpoint temperatures during away may be treated as followed setpoint temperatures, the setpoint temperature from 6:00 to 12:00 also increased from 3 to 4, and the nearby temperatures were increased as well. As should be understood, at 12:00 the user changed the setpoint temperature, thereby no longer following the setpoint temperature 206 of 80° F., so no weight is added to 80° F. after 12:00. In some embodiments, the decay forward in time may be added to a temperature changed away from. For example, the decay may be set to 85% instead of 92% of the original weight if it is known that the user changed away from the temperature (e.g., larger decay).

The process 200 in FIG. 13 may include adding weight to temperature and time coordinates around where the user changed to a temperature (process block 232). The process 200 may add (e.g., using ADD operation) a high weight to the temperature that is changed to, as it is highly indicative of the user's temperature preference. Thus, providing a high weight may enable learning that temperature as a setpoint temperature for future automated setpoint schedules. The weight that is added to the selected temperature may be decayed exponentially forward in time. For example, the high weight would apply at the time the temperature was selected but would be a moderate weight in two hours. Also, low weights may be added vertically to temperatures nearby the selected temperature with an exponential decay. In addition, when the user selects a temperature, the weight assigned to the temperature turned away from at that time may be reduced (e.g., using SUBTRACT operation) to inhibit that temperature from being selected at that time in future automated setpoint schedules. Also, in some embodiments, when the user changes to a temperature, a "banned" area may be applied for a duration of time after the selected temperature, and any setpoint that is already scheduled in that banned area may be removed from the setpoint schedule temporarily for that day.

Figure 19:
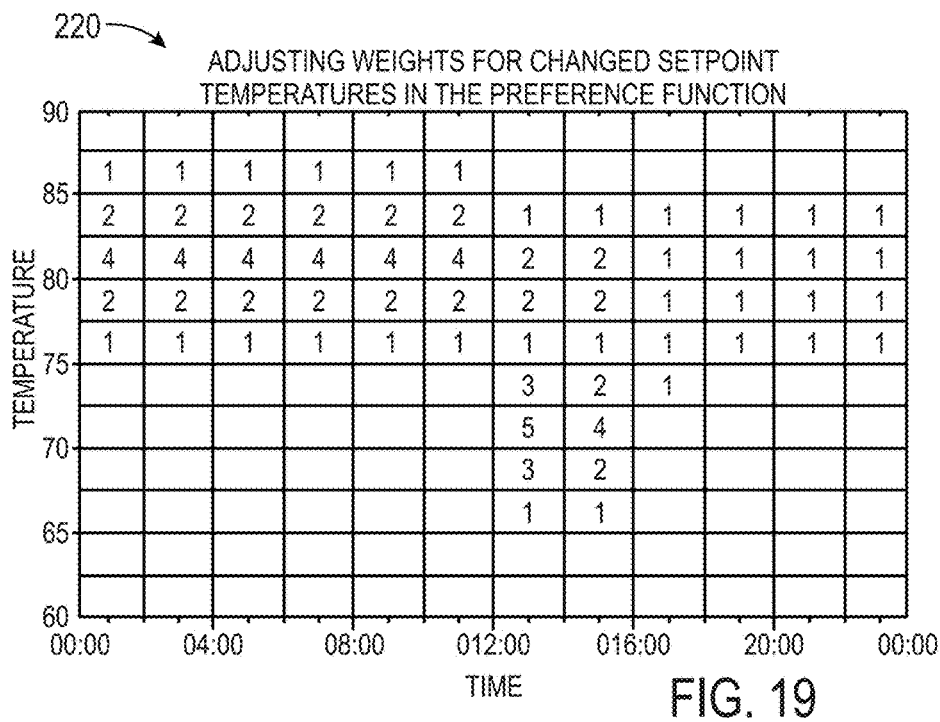
FIG. 19 illustrates adjusting weights for changed setpoint temperatures in the daily preference function, in accordance with an embodiment.

For example, FIG. 19 illustrates the preference function 220 that results after adjusting the weights when the user changes setpoint temperatures. As previously discussed regarding graph 208 in FIG. 15, the user changed the setpoint temperature from 80° F. to 70° F. at 12:00 by interacting with the thermostat 46. As illustrated the selected temperature of 70° F. at 12:00 was mapped (e.g., using the ADD operation) a high weight of 5 and decayed exponentially forward in time (horizontally) until 16:00 when the next known event (manually added setpoint) occurred during the day. Also, weights were added to nearby temperatures vertically away from the selected temperature that exponentially decay (3, 2, 1). Additionally, the weights for the prior setpoint temperature of 80° F. was reduced from 3 to 2 and decayed exponentially forward in time. In some embodiments, the reduced weight may not be decayed forward in time. Returning to process 200 in FIG. 13, process block 236 may include adding (e.g., using the ADD operation) weight to temperature and time coordinates around where the user manually added a setpoint. If the user manually adds a setpoint, then that setpoint is added to the current setpoint schedule and a very high weight is added to that setpoint, also decaying exponentially into the future for a desired amount of time (e.g., a few hours). As previously mentioned, the decay forward in time may be stopped at a time when the next known event is to occur. Also, the decay may be inhibited by a persistence parameter that prevents the weight from dropping below a percentage (e.g., 40%, 50%, 60%, 70%, or any suitable percentage) of its peak weight. Also, weights may be added to nearby temperatures vertically away from the manually added setpoint and the weights may exponentially decay as the temperatures increase and decrease further away from the setpoint.

Process block 238 may include subtracting (e.g., using the SUBTRACT operation) weight from temperature and time coordinates around where the user manually deleted a setpoint. That is, if the user manually deletes a setpoint, then weight is subtracted from the setpoint temperature and setpoint time, also decaying forward in time. In some embodiments, nearby temperature and time coordinates may be reduced (e.g., using the SUBTRACT operation) as well. After subtracting weight from the deleted setpoint, a "banned" area may be created around the temperatures and times surrounding the manually deleted setpoint (process block 240). The banned area inhibits setpoints from being scheduled inside the banned area when generating candidate setpoint schedules until the user selects a temperature inside the banned area again. In some embodiments, a configuration parameter may control the maximum number of deleted setpoints to remember for banning. In some embodiments, there may be a maximum number of deleted setpoints (e.g., 20) to be remembered for banning.

Figure 20:
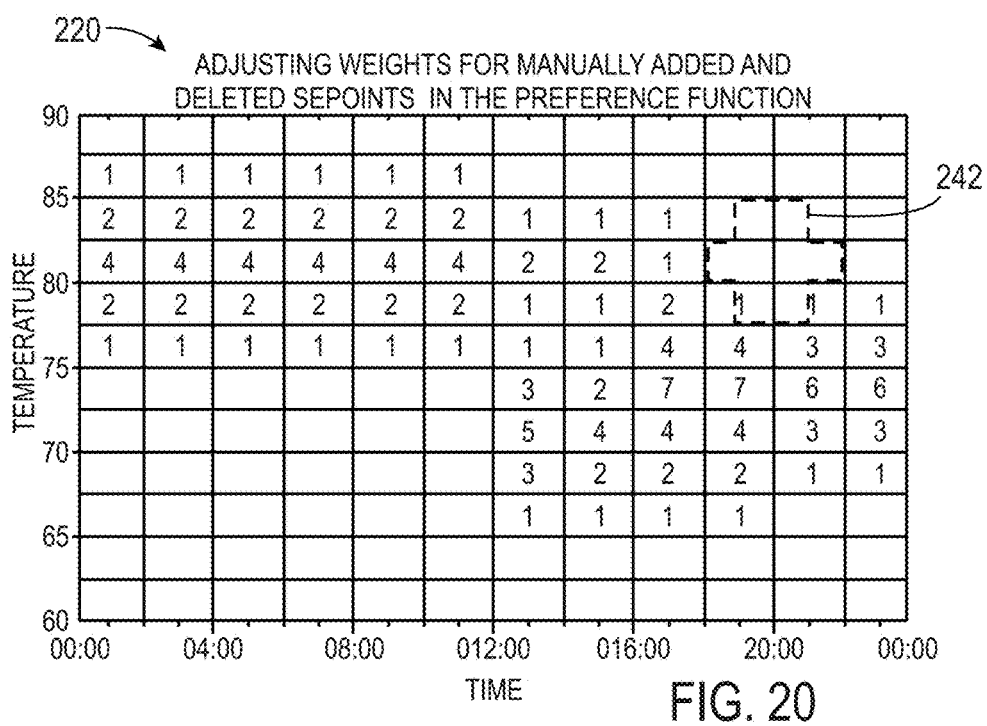
FIG. 20 illustrates adjusting weights for manually added and deleted setpoints in the daily preference function, in accordance with an embodiment.

FIG. 20 illustrates the preference function 220 that results after adjusting weights for manually added and deleted setpoints. As previously discussed regarding graph 208 of FIG. 15, the user manually added setpoint 212 (74° F. at 16:00) and deleted setpoint 204 (80° F. at 18:00). As a result of the manually added setpoint, a very high weight (7) was added to setpoint temperature 74° F. at 16:00 and decayed exponentially forward in time. In some embodiments, the decay percentage for manually added setpoints may be set to 90%, 92%, 94%, 96%, or the like, of the weight at the previous time until the persistence parameter. It should be noted, that in some embodiments the decay forward in time may occur until the next known event occurs (e.g., setpoint temperature change, manually added setpoint, etc.), a period of time has elapsed (e.g., one hour, two hours, the remainder of the day, or the like), or the weight is reduced to a percentage of its peak value (e.g., persistence parameter). Also, weights were added vertically around the setpoint temperature that decay exponentially away from the setpoint temperature as the nearby temperatures increase and decrease. In some embodiments, a configuration parameter may dictate that the manually added setpoint is kept for a certain number of days (e.g., 28) before it can be modified or deleted by the enhanced automated control scheduling. Moreover, to the extent that any weights are added near to midnight, such that decaying to a persistence value (e.g., 60% of the total of the newly added weight over some period of time of day horizontally in the preference function), the next day's preference function may also be updated accordingly by adding an appropriate amount of weight.

For the manually deleted setpoint, weight was subtracted from previous setpoint temperature 80° F. at 18:00, thus reducing the prior weight of 3 to 0. In some embodiments, the nearby temperatures to the deleted setpoint may be reduced as well. As may be seen, a banned area (represented by the dotted cross 242) is introduced to the preference function. In some embodiments, the banned area may have a horizontal width to ban certain setpoints within a small temperature difference and a large time difference and a vertical height to ban setpoints within a large temperature difference and a small time difference. The size of the banned area may be configurable using parameters of the software application. As mentioned above, the banned area may inhibit setpoints from being scheduled inside the banned area when generating candidate setpoint schedules.

In process 200 in FIG. 13, process block 244 may include adding efficiency bonus weights around efficient temperature and times followed or selected by the user. That is, in some embodiments, after the weights have been added to or subtracted from the preference function as indicated above, the efficiency bonus weight may be added to all temperatures the user has ever set. For example, if the user has selected or followed temperatures between 60 and 70° F., and the thermostat 46 is in cooling mode (higher temperatures are more efficient), then a weight of 0.1 may be added to 61, 0.2 to 62, 0.3 to 63, up to 1.0 for 70. The efficiency bonus may be a weight that is added to temperatures that are efficient at certain times during the day so that those temperatures may have a higher chance of being selected as setpoints in a generated candidate setpoint schedule, particularly when the user instructed the thermostat 46 to control the environmental control system more efficiently. Efficiency may refer to the energy savings provided by the HVAC system. For example, during a hot summer day, an indoor ambient temperature that is warmer during the afternoon may be more energy efficient since the HVAC system does not need to run as long, if at all, to maintain the warmer temperature. In such a scenario, an efficiency bonus weight may be added to that temperature at the respective times to aid in selecting setpoints. Thus, the device 10 may have access to weather forecasts and that information may be accessible to the preference function when mapping weights to temperatures at each time. Thus, the preference function is not limited to information in the setpoint schedule for the current time period when assigning weights. In some embodiments, the preference function may have access to numerous other sources of information (e.g., energy availability, type of energy, HVAC system efficiency, type of structure). The efficiency bonus may also enable reducing the number of setpoints by inhibiting frequent setpoint changes to inefficient setpoint temperatures. It should be appreciated that any range of weights may be added to the various temperatures as desired for the efficiency bonus. In some embodiments, there may be a configurable parameter related to the number of days (e.g., 7) over which to "phase-in" the efficiency bonus when the thermostat 46 is first "learning" the user's preferences. That is, in some embodiments, the efficiency bonus that is applied to efficient temperatures may be smaller on earlier days and gradually increased over some number of "phase-in" days. Delaying the efficiency bonus may enable establishing the user's likely preferred temperatures initially without overly valuing efficiency.

Figure 21:
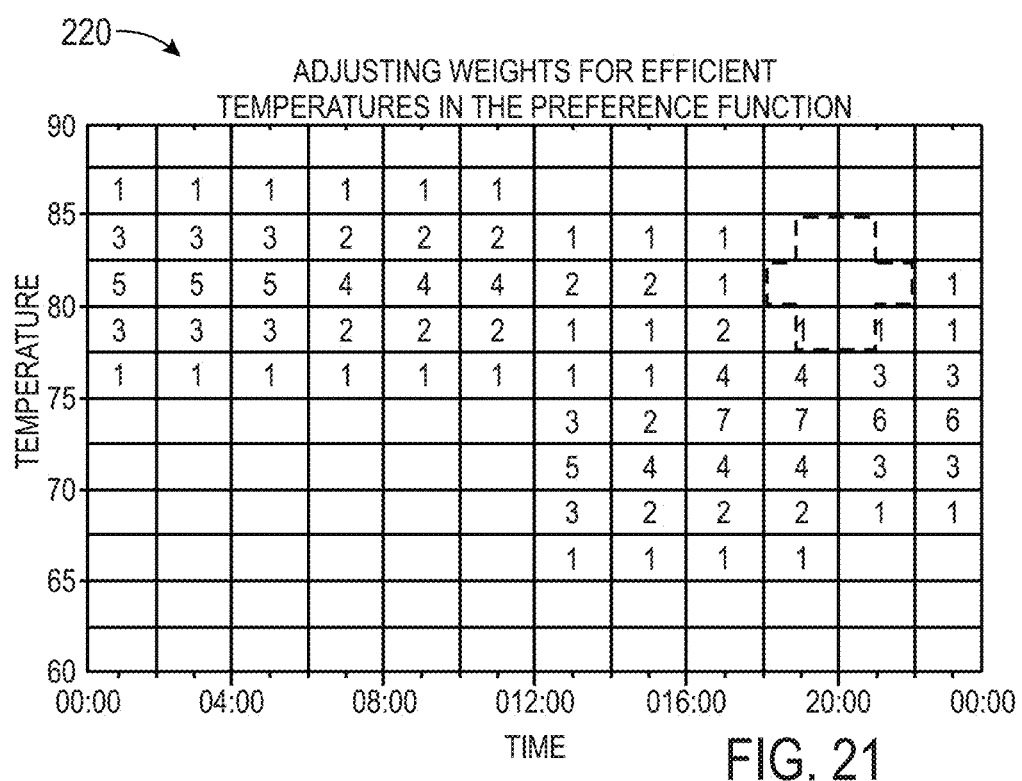
FIG. 21 illustrates adjusting weights for efficient temperatures in the daily preference function, in accordance with an embodiment.

For example, FIG. 21 illustrates the preference function 220 that results after adjusting weights for efficient temperatures selected by the user or followed by the user, in accordance with an embodiment. As previously discussed regarding graph 208 in FIG. 15, the user followed the setpoint temperature of 80° F. for a period of time and then changed the setpoint temperature to 70° F. and added a manual setpoint at 74° F. Thus, the range of temperatures that the user selected or followed is from 70° F. to 80° F. Assuming that the thermostat 46 is in cooling mode, higher weights were added to higher setpoint temperatures. Thus, as may be seen, an efficiency bonus weight (1) was added to 80° F. from midnight to 6:00, thereby increasing the weight from 4 to 5. Lower weights were added to the other setpoint temperatures that the user selected or followed but, in the depicted example, they did not substantially affect the weight previously added (e.g., 0.1 was added to the weight at setpoint temperature of 70° F. increasing the weight from 5 to 5.1). As will be illustrated in more detail below, the efficiency bonus may enable breaking ties between temperature and time coordinates that have similarly mapped weights. After the efficiency bonus has been added to the preference function 220, the preference function 220 for the particular day is generated.

Figure 22:
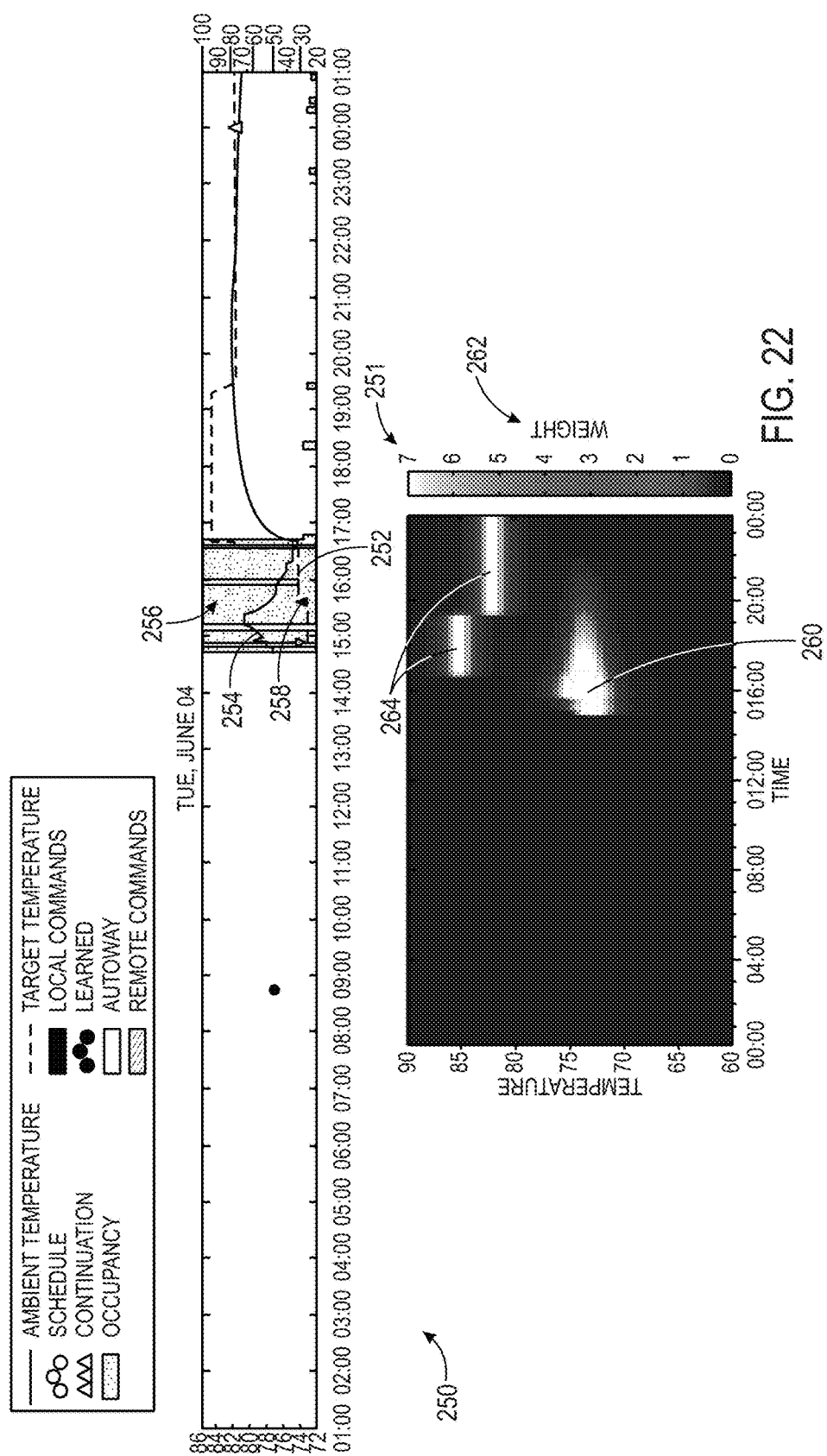
FIG. 22 illustrates a graph including user interactions and an associated preference function generated from the graph, in accordance with an embodiment.

FIG. 22 illustrates a graph including example user interactions and an associated preference function 251 generated based on the user's behavior using the process described above, in accordance with an embodiment. In the depicted embodiment, the user interactions occurred on a Tuesday. It should be noted that target temperature and setpoint temperature may be used interchangeably herein. In the graph 250, the setpoint temperature is represented by line 252 and the ambient temperature is represented by line 254. As illustrated in the graph 250, the user is occupying the structure in the gray shaded region 256, which is approximately between 15:00 to 16:30. At roughly 15:30, the user enters a local command 258 (using the thermostat 46, an app, etc.) to the setpoint temperature from ~72° F. to ~74° F. The user follows this setpoint temperature until about 16:30 when the user leaves the building and the setpoint temperature 252 is raised to ~85° F. because the thermostat 46 may have detected that the user is away or the thermostat 46 learned previously that the user leaves the building at this time and entered an auto-away mode. Accordingly, the setpoint temperature 252 is followed from 16:30 hours to roughly 19:30 hours when the thermostat changes the setpoint temperature 252 again from ~85° F. to ~82° F. At this time, the setpoint temperature 252 falls in line with the ambient temperature 254.

Based on the setpoint schedule including user interactions represented in the graph 250, the associated preference function 251 may be generated by adding and subtracting weights around temperature and time coordinates where events (e.g., user interactions) happened during the day. As previously described, the preference function 251 may be characterized as a scalar function with two variables, time and temperature, and a scalar including a range of weights. The preference function may map a weight to each temperature at each time based on the setpoint schedule and the type of user interaction involved. For example, a high weight (e.g., 5 or 6) may be added to a temperature and time coordinate where the user made a temperature change. Accordingly, the setpoint temperature 260 changed to by the user's local command 258 at roughly 15:30 hours is reflected in the preference function 251 with a light color indicating a high weight (e.g., 5 or 6) according to the range of weights 262. Also, lower weights were added to temperatures 264 at the times where the setpoint temperature was followed (e.g., not changed). Thus, a less light color band is used as representing the lower weight (e.g., 3 or 4) for the followed setpoint temperatures at each time the setpoint temperatures were followed. As may be appreciated, the user did not select the setpoint temperature or add a manual setpoint to the schedule for the setpoints temperatures around ~80-85° F. and, thus, the setpoint temperatures around ~80-85° F. did not receive high weights that accompany those types of user interactions.

In light of the foregoing, it should be understood that a preference function may be generated and maintained for each particular day of the week. At the end of each day (e.g., at midnight), the respective day preference function may be updated with the user interactions for the concluding day to keep each day preference function updated with the user's latest temperature preferences. Using the generated preference functions for each day of the week, the process 200 in FIG. 13 may obtain composite preference functions for each day of the week (process block 270). Process block 270 may further include obtaining a day type preference function for either weekdays or the weekend (process block 272), obtaining a week preference function (process block 274), and blending a percentage of the preference function associated with each day with a percentage of the respective day type preference function, the week preference function, or some combination thereof, to obtain the composite preference function for each day (process block 276). It should be understood that the percentages taken of each of the day preference function, the day type preference function for weekdays, and the week preference function may be configured as desired. In an embodiments, the percentage of the day preference function is set to 50%, the percentage of the day type preference function is set to 50%, and the percentage of the week preference function is set to 0%. In another embodiment, the percentage of the day preference function is set to 45%, the percentage of the day type preference function is set to 50%, and the percentage of the week preference function is set to 5%. Then, a week composite preference function may be obtained including the composite preference functions for each day and candidate setpoint schedules may be processed against the week composite preference function to select an automated setpoint schedule for the whole week. In some embodiments, obtaining the composite preference functions for each day and the week may occur each night at midnight. The process for obtaining composite preference functions for each day and the week may be better understood with reference to FIGS. 23-30.

Figure 23:
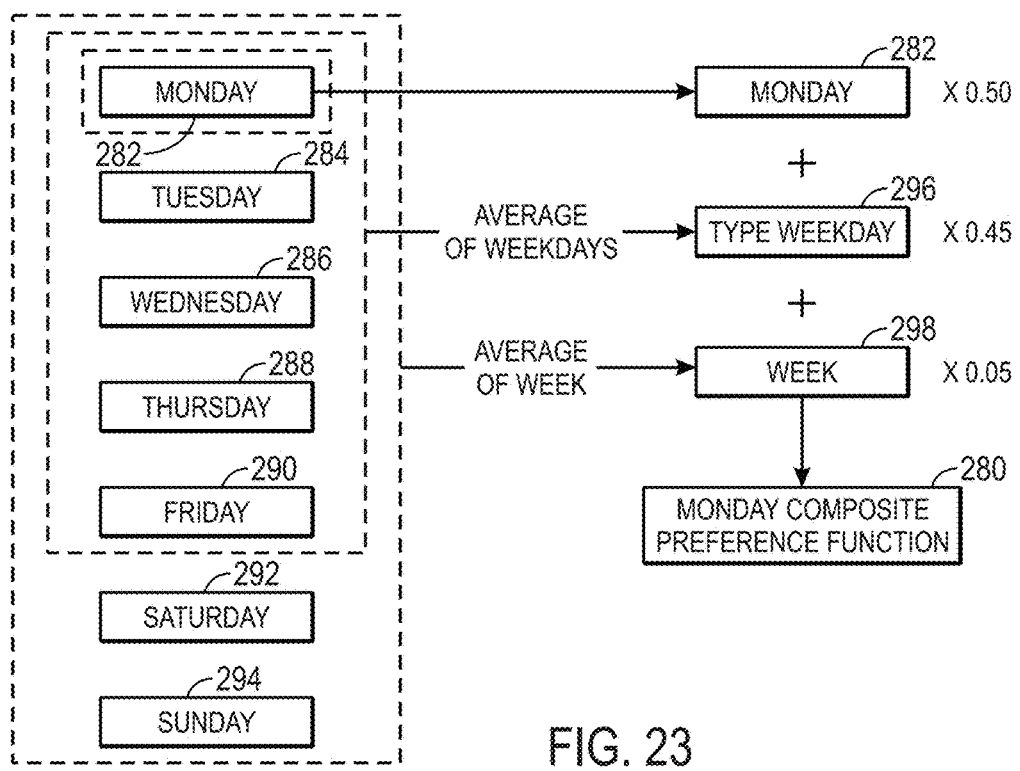
FIG. 23 illustrates a blend of day preference functions used to generate a composite preference function for Monday, in accordance with an embodiment.

FIG. 23 illustrates a blend of day preference functions used to generate a Monday composite preference function 280, in accordance with an embodiment. As illustrated, preference functions for each day of the week (e.g., Monday 282, Tuesday 284, Wednesday 286, Thursday 288, Friday 290, Saturday 292, Sunday 294) may be generated and updated with new user interactions as described above. To obtain the day type preference function 296 for weekdays (since Monday is a weekday), all of the weekday preference functions 282, 284, 286, 288, and 290 may be averaged together. In some embodiments, averaging the day preference functions together may include summing the weights assigned to each respective temperature and time combination across all weekday preference functions and dividing the summed weights by 5 to obtain an average weight assigned to each temperature and time combination in the day type preference function 296 for the weekdays. Next, the week preference function 298 may be obtained by averaging all of the day preference functions 282, 284, 286, 288, 290, 292, and 294 together. In some embodiments, averaging all of the day preference functions together may include summing the weights assigned to each respective temperature and time combination across all day preference functions and dividing the summed weights by 7 to obtain an average weight assigned to each temperature and time in the week preference function 298. Then, to obtain the Monday composite preference function 280, the Monday preference function 282 may be multiplied by a configurable percentage (e.g., 50%) and summed with a configurable percentage (e.g., 45%) of the day type preference function 296 for weekdays and a configurable percentage (e.g., 5%) of the week preference function 298.

In some embodiments, the daily preference function may be weighted equally with the day type preference function (e.g., 50% and 50%), and the percentage of the week preference function 298 may not be included in the composite preference function 280 (e.g., the week preference function may form 0% of the composite preference function 298). This may be true for all of the daily preference functions that may be generated.

Figure 24:
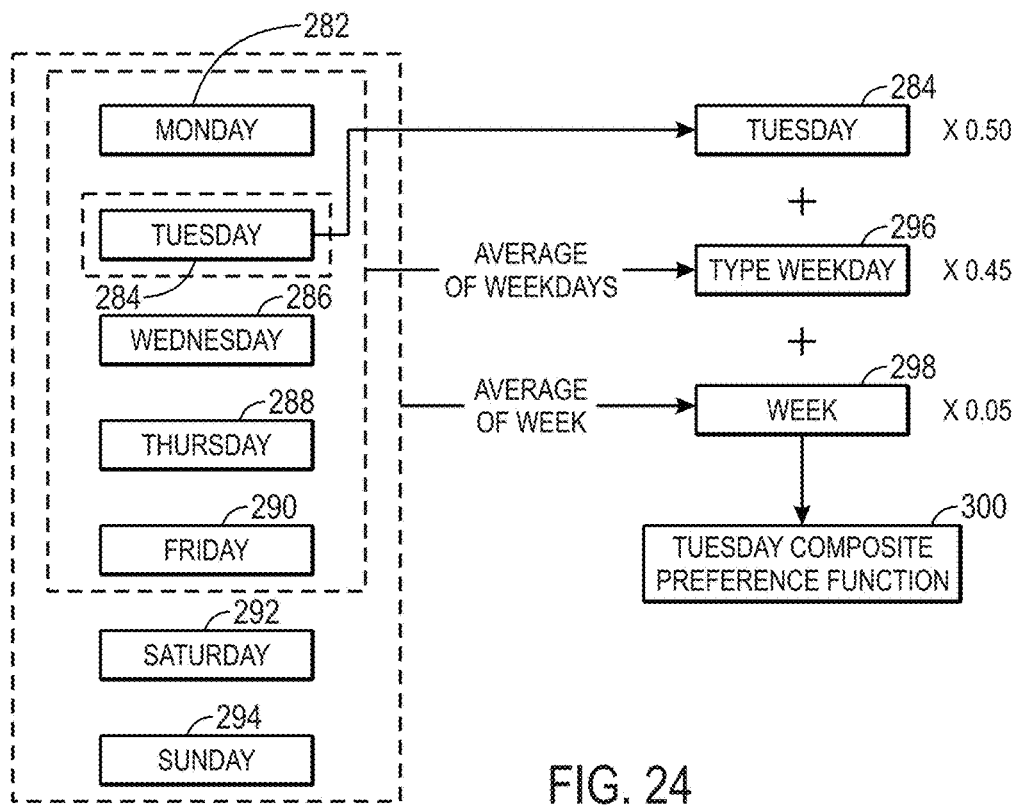
FIG. 24 illustrates a blend of day preference functions used to generate a composite preference function for Tuesday, in accordance with an embodiment.

FIG. 24 illustrates a blend of day preference functions used to generate a Tuesday composite preference function 300, in accordance with an embodiment. As illustrated, preference functions for each day of the week (e.g., Monday 282, Tuesday 284, Wednesday 286, Thursday 288, Friday 290, Saturday 292, Sunday 294) may be generated and updated with new user interactions as described above. To obtain the day type preference function 296 for weekdays (since Tuesday is a weekday), all of the weekday preference functions 282, 284, 286, 288, and 290 may be averaged together. Next, the week preference function 298 may be obtained by averaging all of the day preference functions 282, 284, 286, 288, 290, 292, and 294 together. Then, to obtain the Tuesday composite preference function 300, the Tuesday preference function 284 may be multiplied by a configurable percentage (e.g., 50%) and summed with a configurable percentage (e.g., 45%) of the day type preference function 296 for weekdays and a configurable percentage (e.g., 5%) of the week preference function 298.

Figure 25:
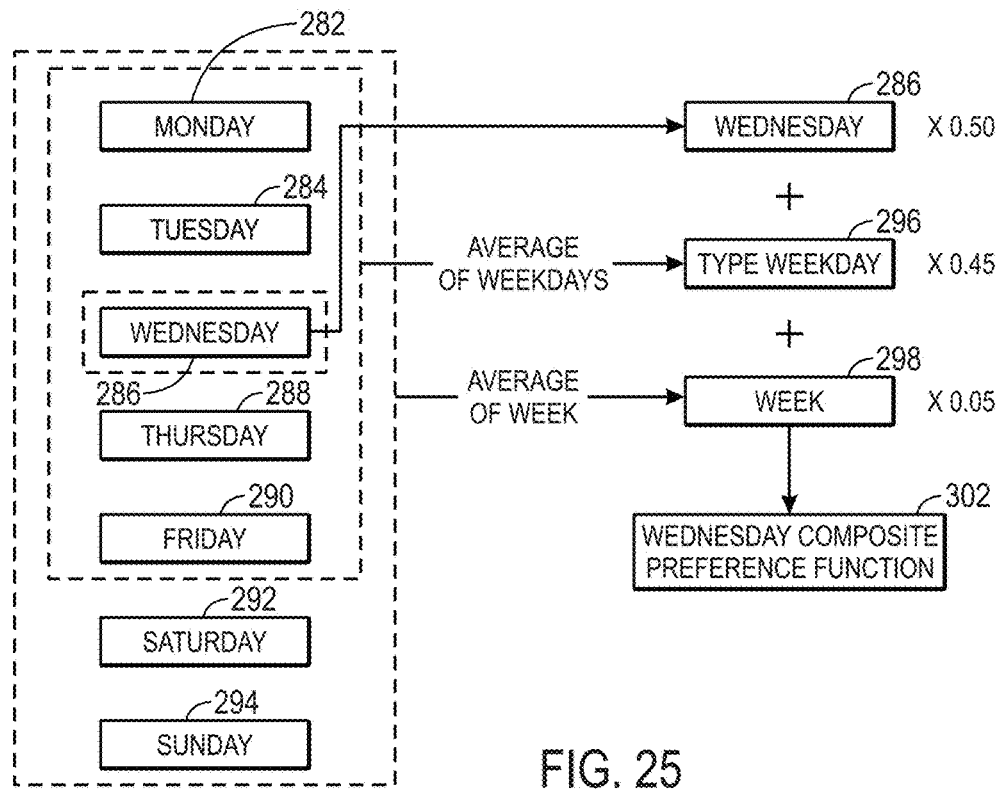
FIG. 25 illustrates a blend of day preference functions used to generate a composite preference function for Wednesday, in accordance with an embodiment.

FIG. 25 illustrates a blend of day preference functions used to generate a Wednesday composite preference function 302, in accordance with an embodiment. As illustrated, preference functions for each day of the week (e.g., Monday 282, Tuesday 284, Wednesday 286, Thursday 288, Friday 290, Saturday 292, Sunday 294) may be generated and updated with new user interactions as described above. To obtain the day type preference function 296 for weekdays (since Wednesday is a weekday), all of the weekday preference functions 282, 284, 286, 288, and 290 may be averaged together. Next, the week preference function 298 may be obtained by averaging all of the day preference functions 282, 284, 286, 288, 290, 292, and 294 together. Then, to obtain the Wednesday composite preference function 302, the Wednesday preference function 286 may be multiplied by a configurable percentage (e.g., 50%) and summed with a configurable percentage (e.g., 45%) of the day type preference function 296 for weekdays and a configurable percentage (e.g., 5%) of the week preference function 298.

Figure 26:
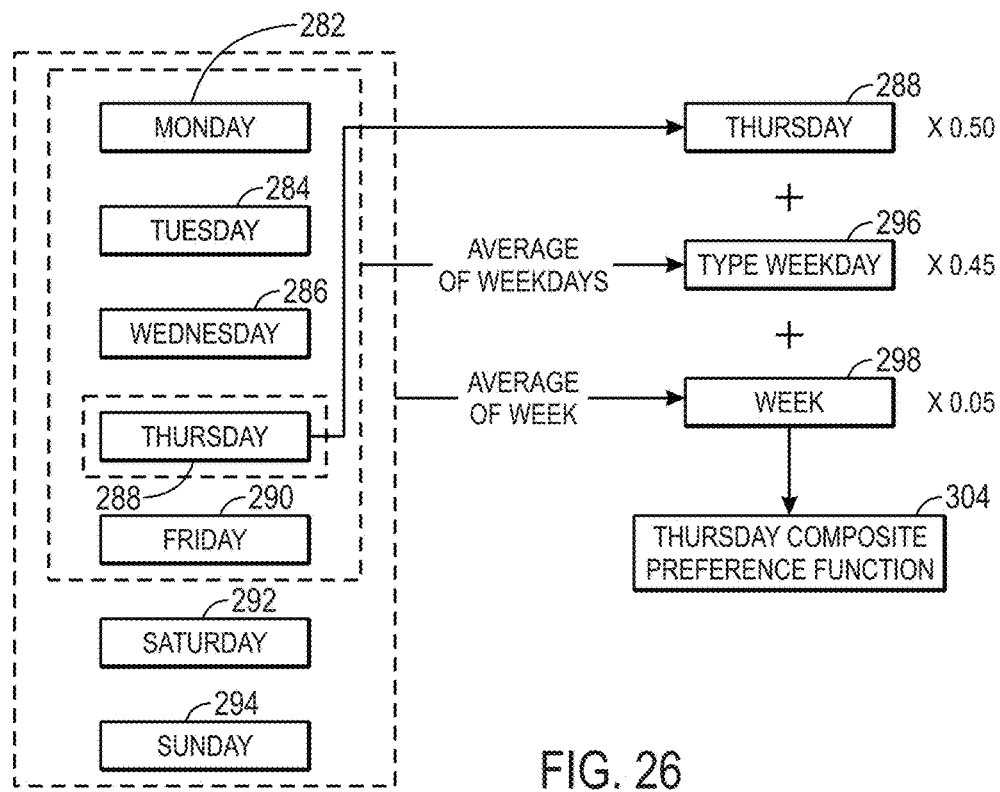
FIG. 26 illustrates a blend of day preference functions used to generate a composite preference function for Thursday, in accordance with an embodiment.

FIG. 26 illustrates a blend of day preference functions used to generate a Thursday composite preference function 304, in accordance with an embodiment. As illustrated, preference functions for each day of the week (e.g., Monday 282, Tuesday 284, Wednesday 286, Thursday 288, Friday 290, Saturday 292, Sunday 294) may be generated and updated with new user interactions as described above. To obtain the day type preference function 296 for weekdays (since Thursday is a weekday), all of the weekday preference functions 282, 284, 286, 288, and 290 may be averaged together. Next, the week preference function 298 may be obtained by averaging all of the day preference functions 282, 284, 286, 288, 290, 292, and 294 together. Then, to obtain the Thursday composite preference function 304, the Thursday preference function 288 may be multiplied by a configurable percentage (e.g., 50%) and summed with a configurable percentage (e.g., 45%) of the day type preference function 296 for weekdays and a configurable percentage (e.g., 5%) of the week preference function 298.

Figure 27:
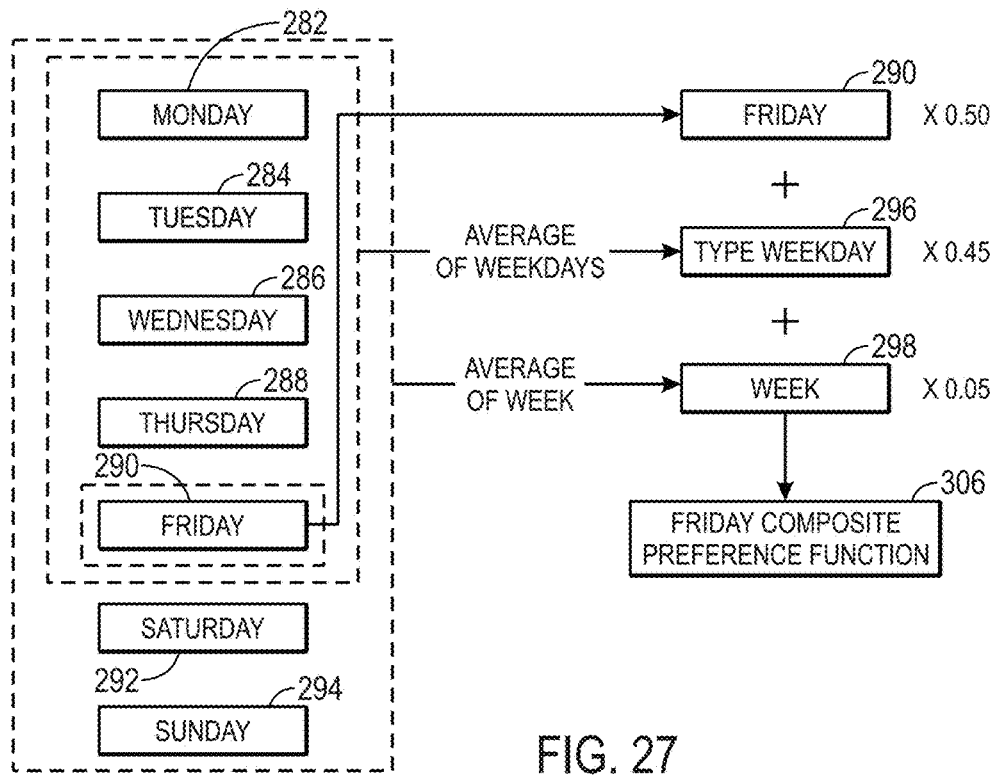
FIG. 27 illustrates a blend of day preference functions used to generate a composite preference function for Friday, in accordance with an embodiment.

FIG. 27 illustrates a blend of day preference functions used to generate a Friday composite preference function 306, in accordance with an embodiment. As illustrated, preference functions for each day of the week (e.g., Monday 282, Tuesday 284, Wednesday 286, Thursday 288, Friday 290, Saturday 292, Sunday 294) may be generated and updated with new user interactions as described above. To obtain the day type preference function 296 for weekdays (since Friday is a weekday), all of the weekday preference functions 282, 284, 286, 288, and 290 may be averaged together. Next, the week preference function 298 may be obtained by averaging all of the day preference functions 282, 284, 286, 288, 290, 292, and 294 together. Then, to obtain the Friday composite preference function 306, the Friday preference function 290 may be multiplied by a configurable percentage (e.g., 50%) and summed with a configurable percentage (e.g., 45%) of the day type preference function 310 for weekends and a configurable percentage (e.g., 5%) of the week preference function 298.

Figure 28:
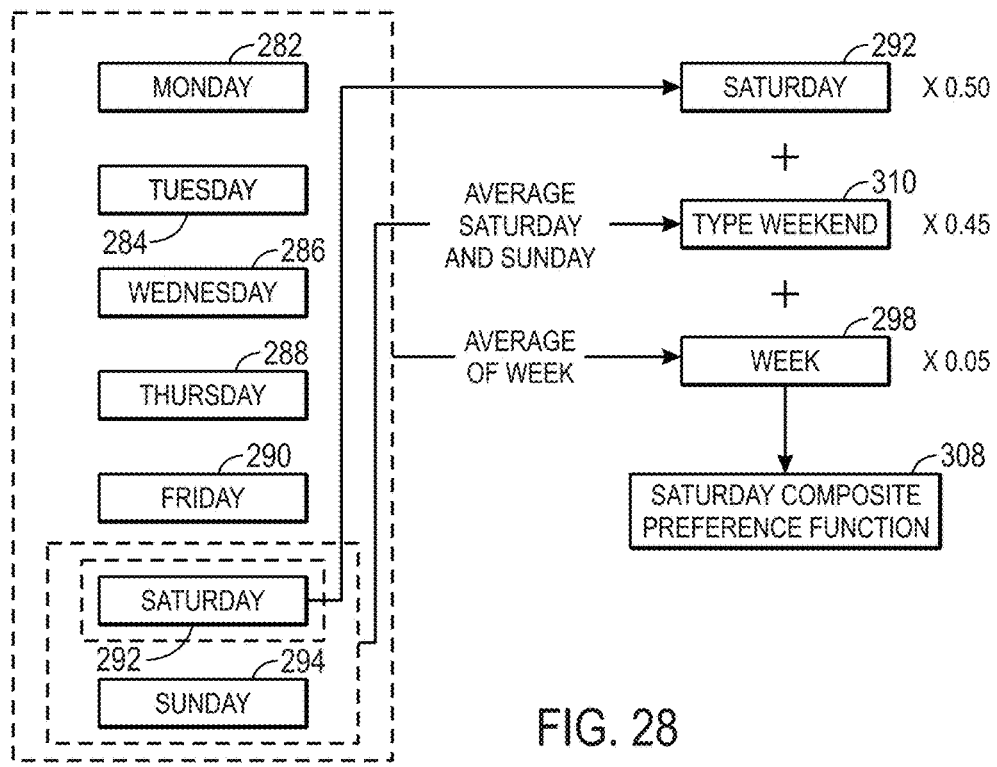
FIG. 28 illustrates a blend of day preference functions used to generate a composite preference function for Saturday, in accordance with an embodiment.

FIG. 28 illustrates a blend of day preference functions used to generate a Saturday composite preference function 308, in accordance with an embodiment. As illustrated, preference functions for each day of the week (e.g., Monday 282, Tuesday 284, Wednesday 286, Thursday 288, Friday 290, Saturday 292, Sunday 294) may be generated and updated with new user interactions as described above. To obtain the day type preference function 310 for the weekend (since Sunday is part of the weekend), the Saturday and Sunday preference functions 292 and 294 may be averaged together. Next, the week preference function 298 may be obtained by averaging all of the day preference functions 282, 284, 286, 288, 290, 292, and 294 together. Then, to obtain the Sunday composite preference function 312, the Sunday preference function 294 may be multiplied by a configurable percentage (e.g., 50%) and summed with a configurable percentage (e.g., 45%) of the day type preference function 310 for weekends and a configurable percentage (e.g., 5%) of the week preference function 298.

FIG. 29 illustrates a blend of day preference functions used to generate a composite preference function for Sunday 312, in accordance with an embodiment. As illustrated, preference functions for each day of the week (e.g., Monday 282, Tuesday 284, Wednesday 286, Thursday 288, Friday 290, Saturday 292, Sunday 294) may be generated and updated with new user interactions as described above. To obtain the day type preference function 310 for the weekend (since Saturday is part of the weekend), the Saturday and Sunday preference functions 292 and 294 may be averaged together. Next, the week preference function 298 may be obtained by averaging all of the day preference functions 282, 284, 286, 288, 290, 292, and 294 together. Then, to obtain the Sunday composite preference function 312, the Sunday preference function 294 may be multiplied by a configurable percentage (e.g., 50%) and summed with a configurable percentage (e.g., 45%) of the day type preference function 310 for weekends and a configurable percentage (e.g., 5%) of the week preference function 298.

FIG. 30 illustrates a week composite preference function 320 that includes the composite preference functions for each day of the week (e.g., Monday 280, Tuesday 300, Wednesday 302, Thursday 304, Friday 306, Saturday 308, Sunday 312), in accordance with an embodiment. As discussed above, the enhanced automated control scheduling may select a candidate setpoint schedule for an entire week that best fits the week composite preference function 320 taking into consideration several constraints. Thus, the candidate setpoint schedule for the week that is selected may optimize a score output by being processed against the composite preference functions for Monday 280, Tuesday 300, Wednesday 302, Thursday 304, Friday 306, Saturday 308, and Sunday 312. As described above and in more detail below, the score output may include summing the weights of each setpoint temperature at each setpoint time in the candidate setpoint schedules across every day of the week to produce and applying certain scoring modifications, such as reducing the score based on the number of setpoints, among other things. Therefore, by using the week composite preference function 320, the enhanced automated control scheduling enables selecting tailored, automated setpoint schedules that holistically consider user preferences across individual days, types of days (weekdays and weekends), and the week as a whole.

Generating a Candidate Automated Device Control Schedule that Best Fits Preference Function(s)

As may be appreciated, continuously updating each day's preference function with new user interactions may cause the weights assigned to temperatures and times in those preference functions to adjust. Consequently, a candidate automated device control schedule that best fits the one or more preference functions or optimizes a score output when processed against the preference functions may change as the preference functions change. Thus, at a desired time (e.g., midnight every night) after the preference function for the concluding day is updated with that day's user interactions, or lack thereof, the enhanced automated control scheduling may search for a candidate automated device control schedule that optimizes a score output when compared against the one or more preference functions. A "candidate automated device control schedule" may refer to any schedule of control decisions for a device that is generated and tested against the preference function. An example of a candidate automated device control schedule may include a candidate setpoint schedule (the example referred to throughout the rest of this section) used by a thermostat 46 to control an environmental control system. In other embodiments, however, as noted above, the candidate automated device control schedule may be any suitable automated schedule to control and electronic device (e.g., a schedule of lighting levels for smart lighting in relation to time of day and/or in relation to content on a media device, such as a television; or a schedule of desk heights in relation to time of day).

Figure 31:
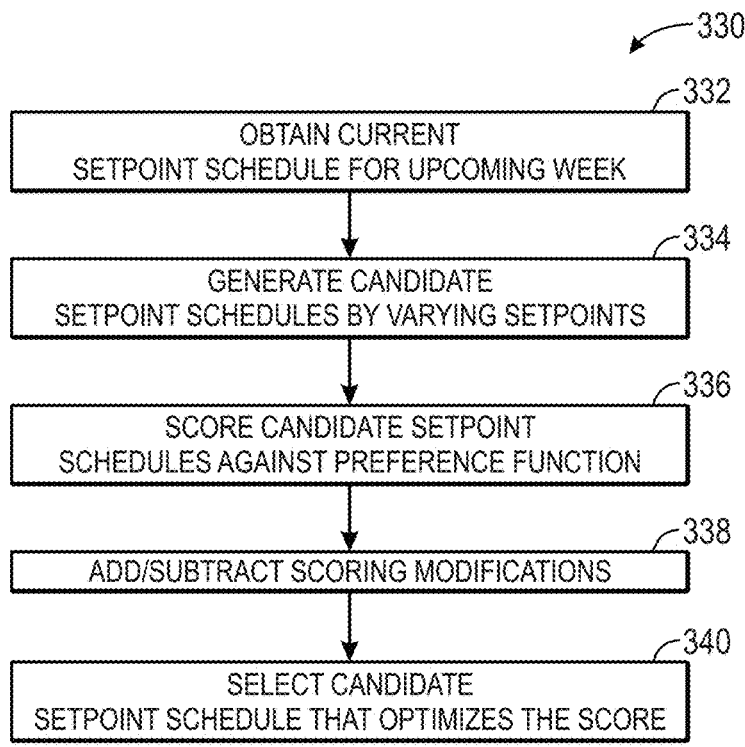
FIG. 31 illustrates a flow diagram of a process suitable for generating and selecting a candidate setpoint schedule that optimizes a score output by being processed against preference function(s), in accordance with an embodiment.

A process 330 suitable for generating and selecting a candidate setpoint schedule that optimizes a score output by being processed against preference functions is illustrated in FIG. 31. The process 330 may include obtaining the current setpoint schedule for the upcoming week (process block 332), generating candidate setpoint schedules by performing operations (e.g., varying setpoints) (process block 334), scoring candidate setpoint schedules against preference function(s) (process block 336), adding/subtracting scoring modifications (process block 338), and selecting the candidate setpoint schedule that optimizes the score (process block 340). In some embodiments, when scheduling for the week, the "preference functions" may refer to the composite preference functions for each day that form the week composite preference function, as described above. In some embodiments, if only the upcoming day is being scheduled, the "preference function" may refer to the composite preference function for the particular day being scheduled.

Assuming that the upcoming week is being scheduled, the current setpoint schedule for the upcoming week may be obtained from memory 27 of the thermostat 10 or an external source (e.g., server, database, web service) (process block 332). If the current setpoint schedule was previously generated and stored, candidate setpoint schedules may be generated by varying the setpoints in that current setpoint schedule (process block 334). For example, operations may be performed on the setpoints in the current setpoint schedule to generate several variations to serve as candidate setpoint schedules. These candidate setpoint schedules may be tested to determine whether the modifications increase the score when processed against the preference functions. That is, an initial candidate setpoint schedule may be generated by performing different operations (e.g., add a setpoint, change a setpoint, delete a setpoint) at different times on the current setpoint schedule to improve the score output by processing the candidate setpoint schedule against the preference functions. Then, the candidate setpoint schedule with the highest score may be selected and more operations may be performed at different times on that candidate setpoint schedule, which further may be tested, ultimately determining a candidate setpoint schedule with a highest score as against the preference function.

As previously discussed, the score may include a summation of the weights mapped to all of the setpoint temperatures at the setpoint times throughout the preference functions and adding and/or subtracting scoring modifications, as discussed below.

Figure 32:
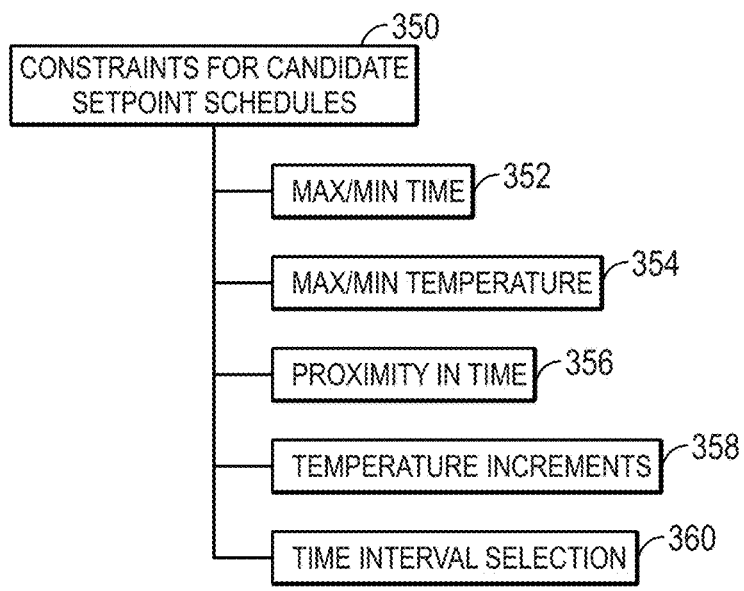
FIG. 32 illustrates a schematic diagram of constraints for generating candidate setpoint schedules, in accordance with an embodiment.

There are certain constraints 350, however, that may be applied when generating candidate setpoint schedules, as shown in FIG. 32. In some embodiments, the operations performed adhere to the constraints 350 when generating candidate setpoint schedules. A first constraint 352 may include the maximum and minimum time that setpoints can be scheduled. In some embodiments, the maximum time that setpoints can be scheduled inhibits setpoints from being scheduled later than the latest time the user has ever interacted with the thermostat 46, and the minimum time that setpoints can be scheduled inhibits setpoints from being scheduled earlier than the earliest time the user has ever interacted with the thermostat 46. A second constraint 354 may include the maximum and minimum temperatures for setpoints. In some embodiments, the maximum temperature to which a setpoint can be set inhibits setpoint temperatures from being scheduled that are warmed than the warmest temperature ever selected by the user, and the minimum temperature to which a setpoint can be set inhibits setpoint temperatures from being scheduled that are cooler than the coolest temperature ever selected by the user. The constraints 352 and 354 provide bounds that are dynamic and focused on the user's preferences. For example, if the user has never interacted with the thermostat 46 after 10 PM or before 7 AM, scheduling a setpoint between those times (e.g., at 2 AM) that causes the HVAC system to turn on or off could startle the user in the middle of the night. Likewise, if the user has never selected a setpoint temperature below 70° F., scheduling a setpoint with a setpoint temperature of 60° F. could make the user uncomfortably cold and cause frustration.

A third constraint 356 may relate to the proximity in time that setpoints are scheduled. That is, this constraint 356 may inhibit setpoints from being scheduled within a configurable amount of time to each other. In some embodiments, the amount of time may be set to 1 hour; however any desirable amount of time may be used. Inhibiting any two setpoints from being closer than 1 hour apart in time may encourage fewer setpoint changes and smaller setpoint schedules, thereby enhancing efficiency. A fourth constraint 358 may include the setpoint temperature increments. For example, constraint 358 may dictate that all setpoint temperature change are made in increments of 0.2° C.; however, any desirable increment may be used. A fifth constraint 360 may include the time interval for when setpoints are scheduled. In some embodiments, this constraint 360 may constrain all setpoints to be scheduled at the top or bottom of the hour (e.g., no setpoint scheduled at 8:39 AM, but rather at 8:30 AM).

Figure 33:
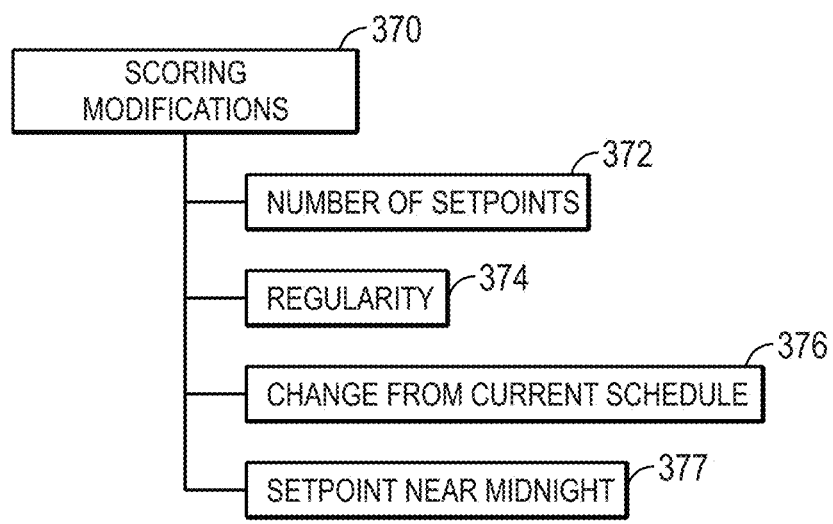
FIG. 33 illustrates a schematic diagram of scoring modifications to increase the likelihood of selecting a candidate setpoint schedule that best fits user preferences, in accordance with an embodiment.

After each candidate setpoint schedule is scored, there may be certain scoring modifications subtracted from the output scores for each candidate setpoint schedule (process block 338). FIG. 33 illustrates various scoring modifications 370 that may be added or subtracted from the score of each candidate setpoint schedule. A first scoring modification 372 may include the number of setpoints scheduled in the candidate setpoint schedule. For example, a configurable value may be multiplied by the number of setpoints scheduled and subtracted from the score. In some embodiments, if there is less than a threshold number of setpoints, a value may be added to the score. This scoring modification 372 discourages large numbers of setpoints to encourage smaller setpoint schedules.

A second scoring modification 374 may include the regularity of setpoints. For example, a higher value may be subtracted for setpoints that are irregular. In an embodiment, a subtraction may be made for each time and temperature combination that there is a setpoint between days of the same type (e.g., weekdays or the weekend). To illustrate, if there is one setpoint scheduled at noon to 72° F. for a weekday, and one setpoint scheduled at 11:45 to 72° F. for a subsequent weekday, then subtractions are made for both. However, if both setpoints were at noon on both weekdays, then only one subtraction may be performed. This scoring modification 374 may encourage regularity and uniformity of the setpoint schedule across days of the same type. In some embodiments, there may be a time period (e.g., after 7 days) at which schedule changes cause scores to be reduced. Also, there may be another time period (e.g., after 14 days) after which schedule changes cause scores to become more heavily reduced. A third scoring modification 376 may include changes from the current schedule. In some embodiments, this constraint 376 may reduce the score when the candidate setpoint schedule includes setpoints that differ from the current setpoint schedule. A fourth scoring modification 378 may include subtracting a value from the score for setpoints near midnight. For example, a value of 50 may be subtracted from a score that has a setpoint near midnight. This scoring modification 377 may discourage scheduling setpoints near midnight.

Following the constraints, candidate setpoint schedules may continue to be generated and the scoring process, including adding/subtracting scoring modifications, may be iteratively performed until time runs out or there are no improvements that optimize the score output by processing the candidate setpoint schedule through the preference functions. Indeed, in some embodiments, there may be a configuration parameter that sets the time limit for the scoring process (e.g., 3000 milliseconds (ms), 4000 ms, 5000 ms, or any suitable time limit), but the time limit should be less than the thermostat's timeout limit. The scoring process may approximate the best solution to the scheduling optimization problem by selecting the candidate setpoint schedule with the optimal score (process block 340), thereby providing a selected setpoint schedule closely fit to the user's temperature preferences to control the environmental control system for the upcoming week. As mentioned, the discussion of the process 330 above related to finding an optimal candidate setpoint schedule for the upcoming week, but the process 330 may apply to finding an optimal candidate setpoint schedule for any suitable amount of time, such as the next day, the next few days, the next month, and so forth.

Figure 34:
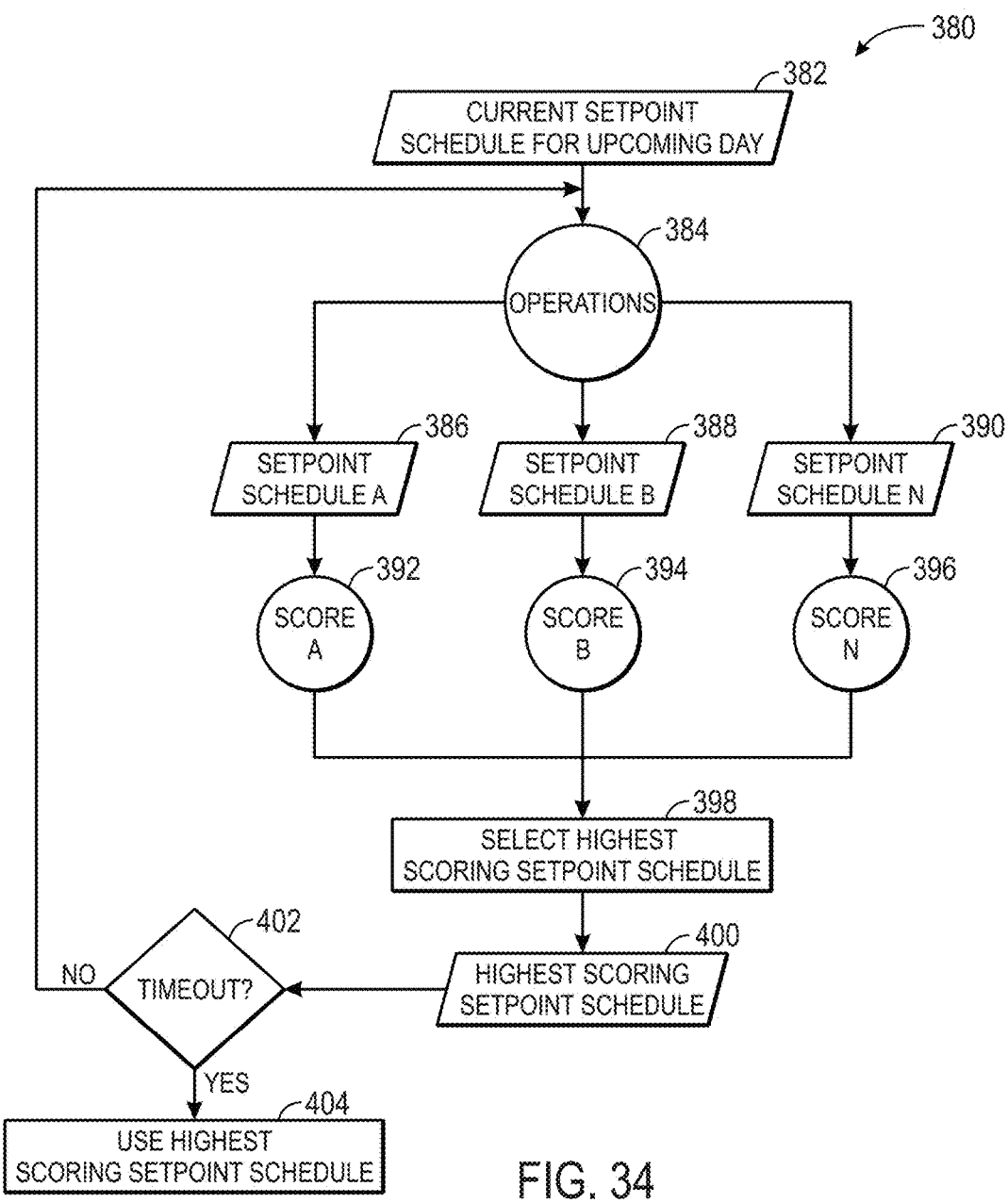
FIG. 34 illustrates a schematic diagram of a process for iteratively generating candidate setpoint schedules and calculating their scores, in accordance with an embodiment.

FIG. 34 illustrates a schematic diagram 380 for iteratively generating candidate setpoint schedules and calculating their scores, in accordance with an embodiment. The schematic diagram 380 may include obtaining the current setpoint schedule for the upcoming week (block 382), performing operations on the current setpoint schedule (block 384) to generate a number of candidate setpoint schedules (data blocks 386, 388, and 390), and calculating the score output by processing each candidate setpoint schedule against the preference functions (blocks 392, 394, and 396). As mentioned above, processing the candidate setpoint schedules against the preference functions may include processing the candidate setpoint schedules against the composite preference functions for each particular day of the week (also referred to as the week composite preference function). More specifically, in process block 384, the operations that may be performed on the current setpoint schedule may include adding a setpoint at a different time, changing the time at which a setpoint is set (e.g., shifting setpoints), changing a setpoint temperature of a setpoint, removing a setpoint, and so forth. It should be understood, that the constraints defined above may be adhered to when performing the operations to generate the candidate setpoint schedules. Performing the various operations may result in generating different candidate setpoint schedules, such as candidate setpoint schedule A (block 386), candidate setpoint schedule B (block 388), or any number of candidate setpoint schedules n (block 390). In some embodiments, the number of candidate setpoint schedules to generate may be configurable.

Once the resulting candidate setpoint schedules are generated, the process 380 may output a score by processing the candidate setpoint schedules against the preference functions. For example, score A (block 392) may be output for setpoint candidate schedule A 386 by processing it against the preference functions, score B (block 394) may be output for candidate setpoint schedule B 388 by processing it against the preference functions, and so forth for n number of candidate setpoint schedule scores (e.g., score n (block 396)). Also, the scores may be increased or decreased by the scoring modifications described above. Then, in block 398, the candidate setpoint schedule that produced the highest score (data block 400) may be selected. It should be noted that there may be a score (e.g., −10000, −15000, or the like) that is assigned to the lowest scoring candidate setpoint schedule to remove it from consideration. It should also be noted that, in some embodiments, there may be a configurable divisor (e.g., 100, 150, 200, 250, or the like) that is used to fit the maximum score into a desired type of value. The process 380 may determine whether the time limit for searching has been met (decision block 402). If not, the highest scoring candidate setpoint schedule may be run through the process 380 again by performing operations 384 on it to generate new candidate setpoint schedules to optimize the score, and so forth. If the time limit has been met or there are no more improvements available to optimize the score, then the highest scoring candidate setpoint schedule may be used to control the environmental control system.

Figure 35:
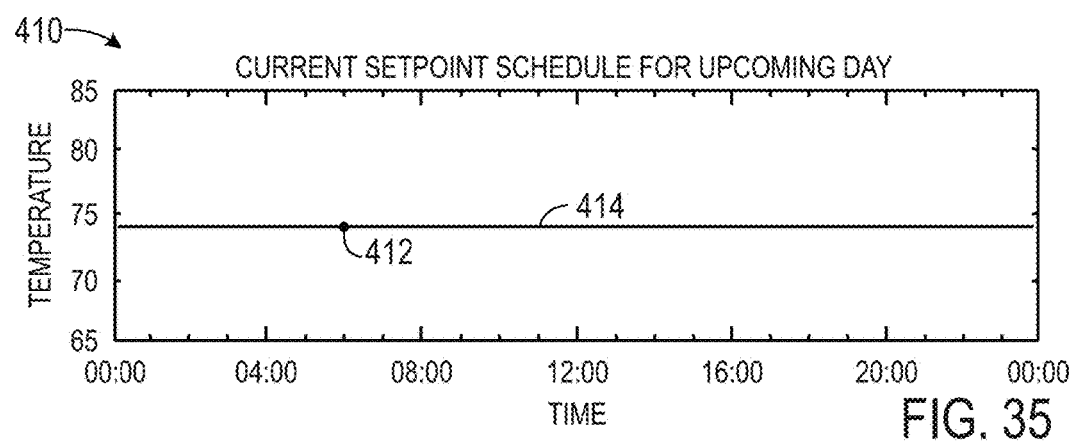
FIG. 35 illustrates an example of an original setpoint schedule for an upcoming day, in accordance with an embodiment.

Describing an example of the scoring process may be beneficial. As such, FIG. 35 illustrates a current setpoint schedule 410 for an upcoming day, in accordance with an embodiment. It should be noted that, in some embodiments, the current setpoint schedule may represent the upcoming week, and the current setpoint schedule 410 for the upcoming day is used for explanatory purposes. In the current setpoint schedule 410, there is one setpoint 412 scheduled for 74° F. throughout the entire day. Thus, the setpoint temperature 414 remains at 74° F. throughout the day.

Figure 36:
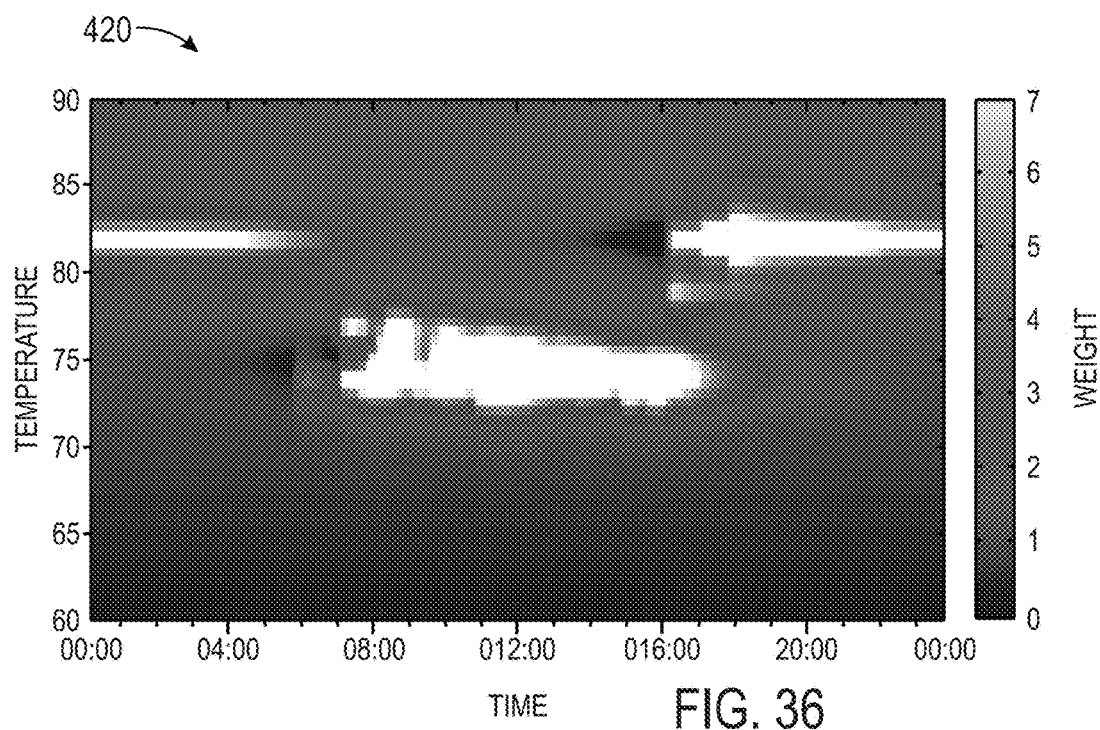
FIG. 36 illustrates an example preference function used to process candidate setpoint schedules generated based on the original setpoint schedule of FIG. 35, in accordance with an embodiment.
Figure 37:
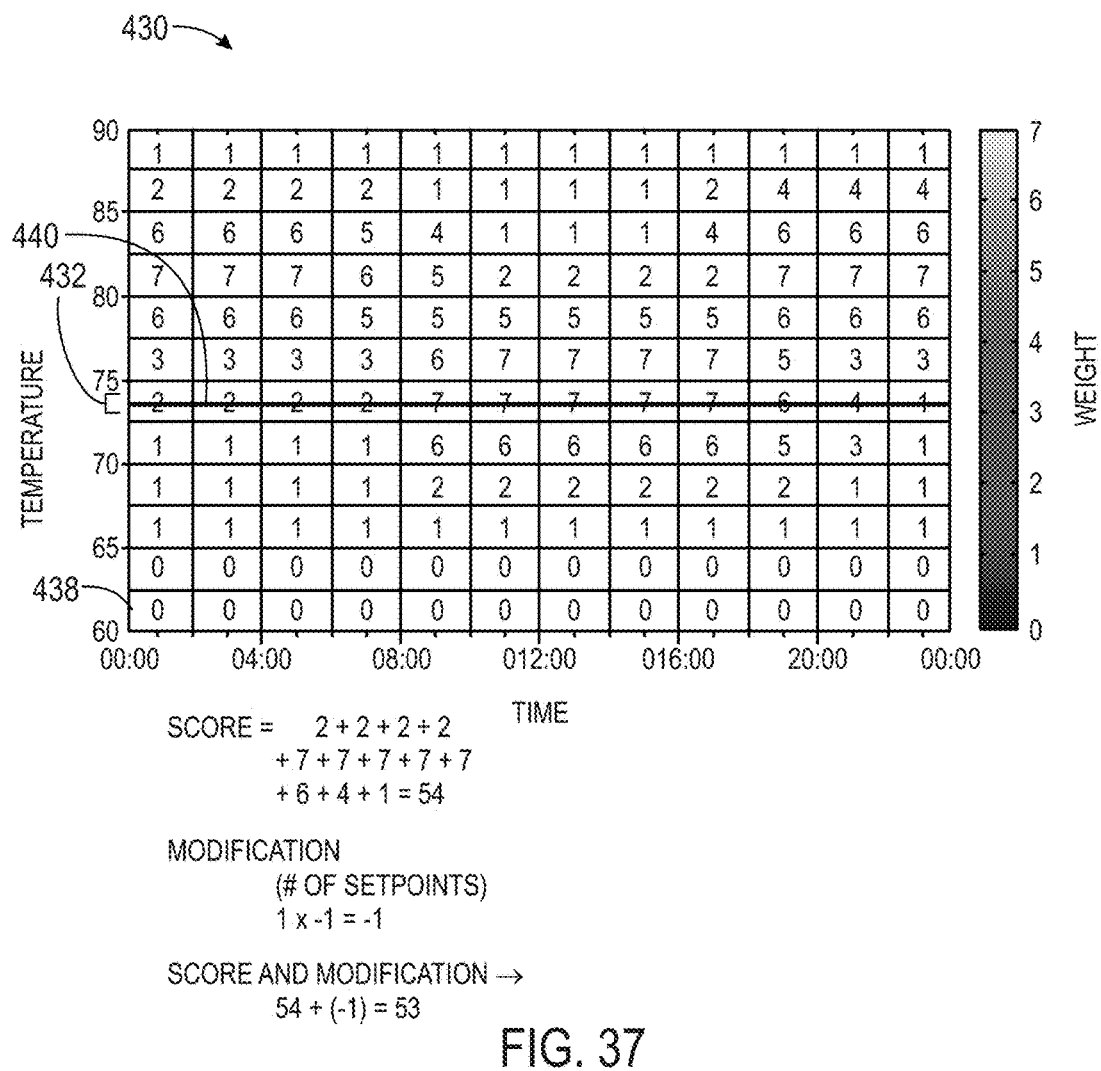
FIG. 37 illustrates a simplification of the example preference function including a matrix with mapped weights, against which a first candidate setpoint schedule is processed to output a score, in accordance with an embodiment.

FIG. 36 illustrates a preference function 420 for the upcoming day used to process candidate setpoint schedules generated based on the setpoint schedule 410 of FIG. 35, in accordance with an embodiment. As illustrated, the preference function 420 includes high weights mapped around 82° F. from midnight to 6:00, high weight distribution mapped around 74° F. from 6:00 to 16:00, and high weight distribution around 82° F. from 16:00 to the following midnight. The preference function 420 from FIG. 36 is represented in matrix form 430 in FIGS. 37-39, which illustrate how the selection of a candidate setpoint schedule is made by selecting an optimal score output by processing different candidate setpoint schedules 432, 434, and 436 against the preference function 430. In the depicted embodiments, the preference function is represented as a 12 row by 12 column matrix including a rectangular array of weights in each element of the array. Each element represents a 2.5° F. temperature range and a 2 hour time interval. For example, element 438 in FIG. 37 represents the temperature range from 60° F. to 62.5° F. and the time interval from 0 to 2:00 hours. It should be understood that the temperature ranges and time intervals represented by the elements are for illustration purposes only and, in some embodiments, the preference function may assign a weight to any suitable temperature range or time interval, such every minute, 15 minutes, 30 minutes, and so forth. It should be noted that the candidate setpoint schedule 432 is the current setpoint schedule for the upcoming day, and candidate setpoint schedules, 434, and 436 may have been generated during the optimization process by varying setpoints in the current setpoint schedule for the upcoming day while adhering to the constraints discussed above.

Beginning with FIG. 37, the candidate setpoint schedule 432 was generated by based on the current setpoint schedule for the upcoming day and includes a single setpoint 440. The setpoint temperature covers elements with assigned weights of 2, 2, 2, 2, 7, 7, 7, 7, 7, 6, 4, and 1. The score output by processing the candidate setpoint schedule 432 against the preference function 430 is the summation of all of the respective weights assigned at the setpoint temperatures and setpoint times. Thus, the score output by comparing candidate setpoint schedule 432 to the preference function 430 is 54. However, in some embodiments, a scoring modification may increase or decrease the score of the candidate setpoint schedule 432. In the depicted embodiment, a scoring modification may include reducing the score based on the number of setpoints in the candidate setpoint schedule 432 by any suitable value, such as −1. The candidate setpoint schedule 432 includes only one setpoint so a scoring modification of −1 may reduce the score to 53.

Figure 38:
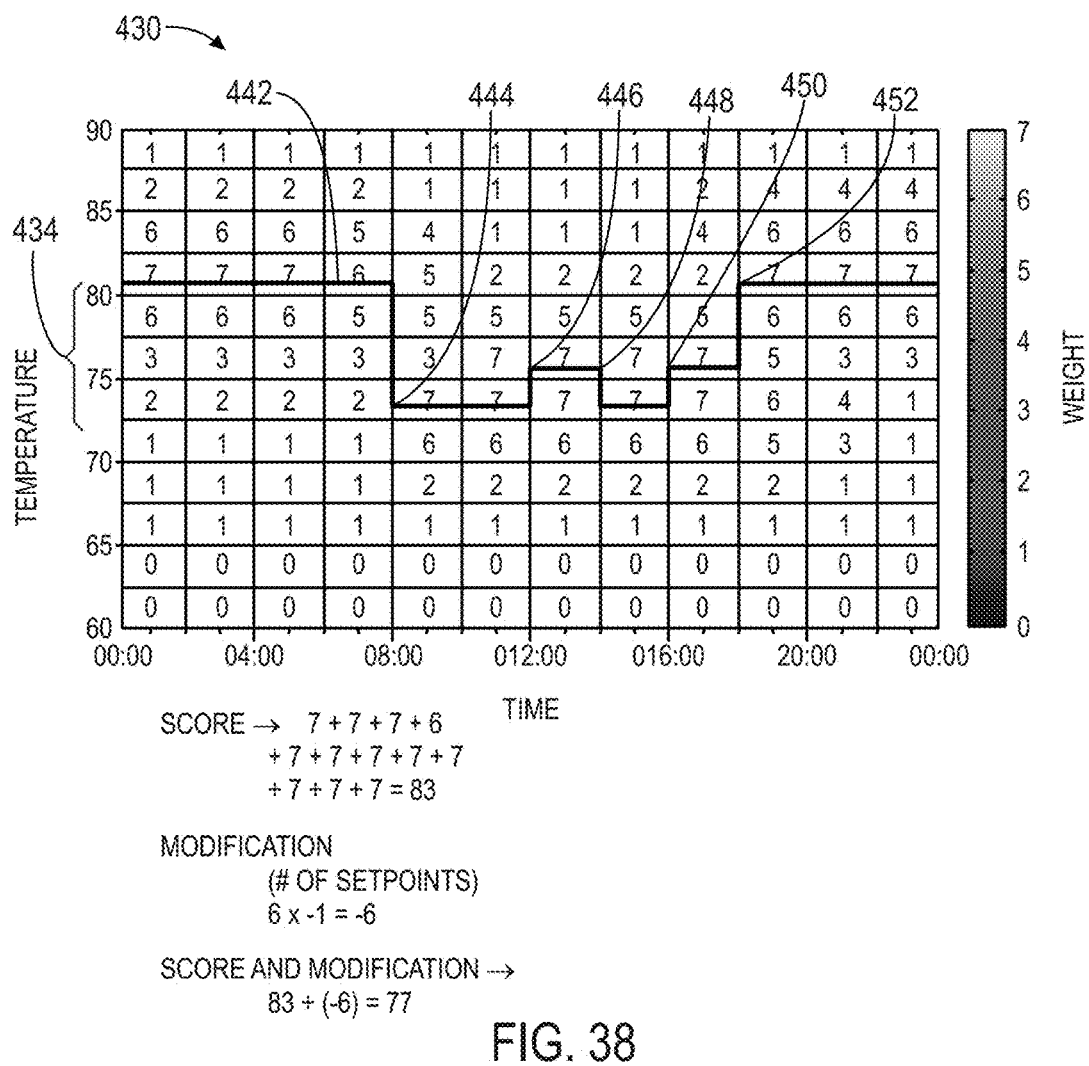
FIG. 38 illustrates a simplification of the example preference function including a matrix with mapped weights, against which a second candidate setpoint schedule is processed to output a score, in accordance with an embodiment.

In FIG. 38, the candidate setpoint schedule 434 was generated by selecting setpoints 442, 444, 446, 448, 450, and 452 with the highest possible weight at any given time interval. The candidate setpoint schedule 434 adheres to the constraint of inhibiting setpoints from being scheduled within an hour of each other because all of the setpoints are scheduled at least 2 hours apart. As depicted, the setpoints cover elements with assigned weights of 7, 7, 7, 6, 7, 7, 7, 7, 7, 7, 7, and 7. Thus, when the candidate setpoint schedule 434 is processed against the preference function 430, a score of 83 is output, which is higher than the score output by processing candidate setpoint schedule 432 in FIG. 37, which was 54. There are 6 setpoints in candidate setpoint schedule 434 and, thus, a modification of −6 reduces the score of candidate setpoint schedule 434 from 83 to 77.

Figure 39:
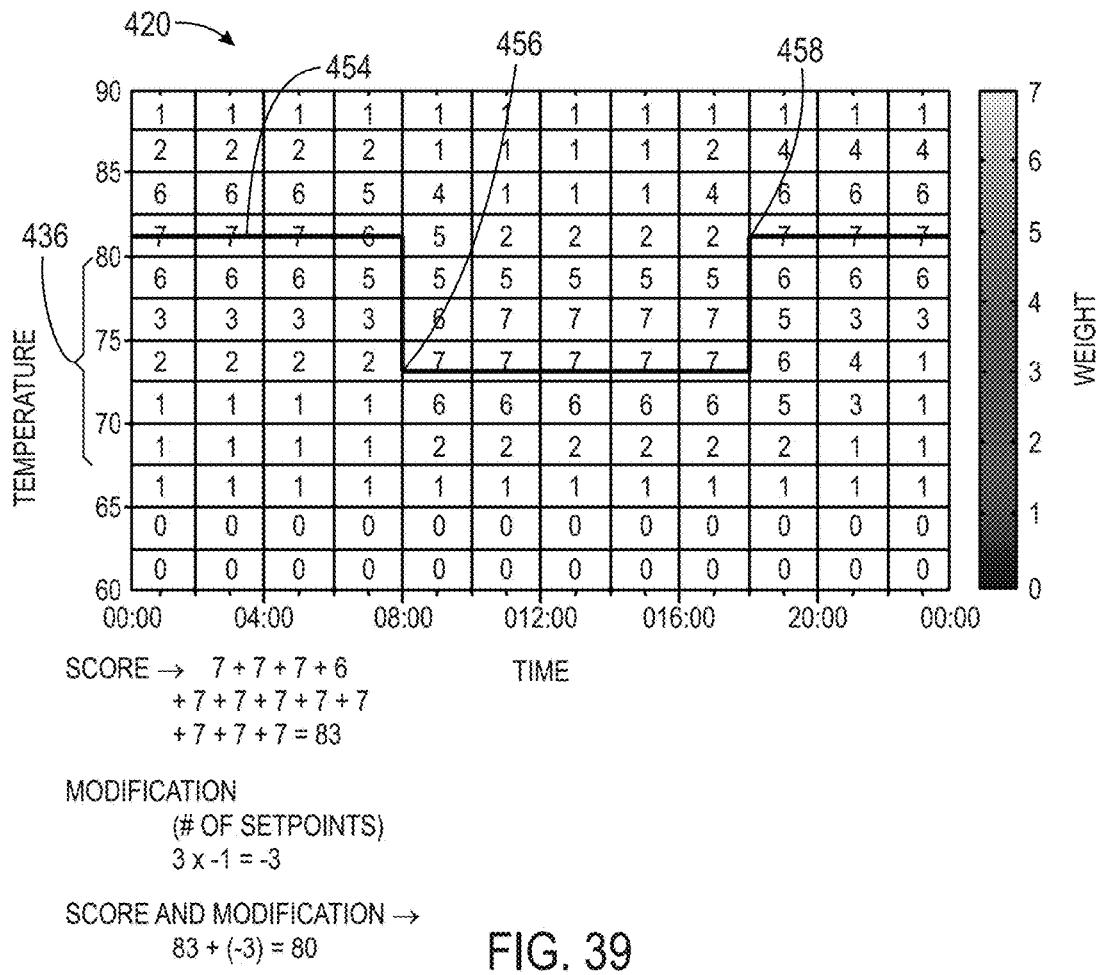
FIG. 39 illustrates a simplification of the example preference function including a matrix with mapped weights, against which a third candidate setpoint schedule is processed to output a score, in accordance with an embodiment.
Figure 40:
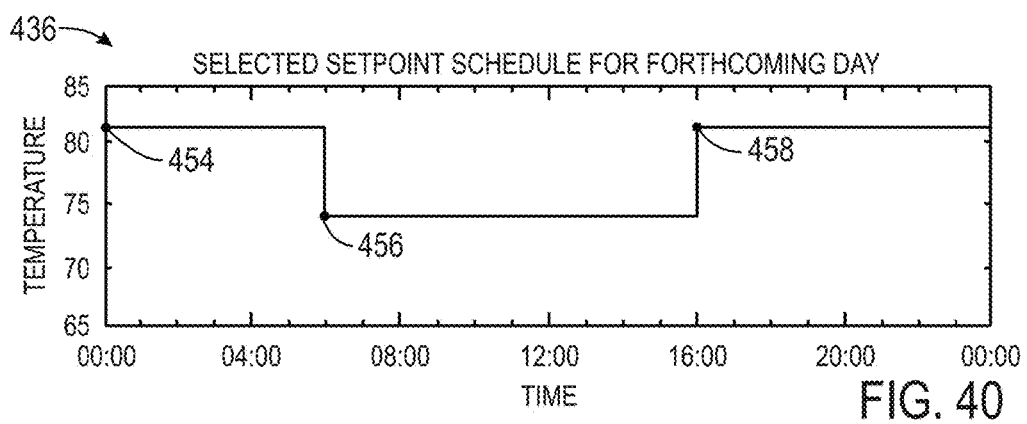
FIG. 40 illustrates a selected setpoint schedule generated for the forthcoming day based on the candidate setpoint schedule that generated the highest score (FIG. 39), in accordance with an embodiment.

Last, in FIG. 39, the candidate setpoint schedule 436 was generated by selecting setpoints 454, 456, and 458 with the highest possible weight at any given time interval. For example, setpoint 454 covers four elements from 80-82.5° F. from 00:00 to 8:00 hours, which are assigned weights of 7, 7, 7, and 6. Setpoint 456 covers five elements from 72.5-75° F. from 8:00 to 18:00 hours, which are assigned weights of 7, 7, 7, 7, and 7. Last, setpoint 458 covers three elements from 80-82.5° F. from 18:00 to 00:00 hours, which are assigned weights of 7, 7, and 7. The score output by processing the candidate setpoint schedule 436 against the preference function 430 equals a total of 83, which is the same score output by candidate setpoint schedule 434 in FIG. 38 pre-modification. Here, the candidate setpoint schedule 436 included 3 setpoints which is multiplied by −1 to obtain a scoring modification of −3. The modification may then be added to the score, resulting in a score of 80. As should be noticed, even though both candidate setpoint schedules 434 and 436 output the same raw score of 83, the scoring modification broke the tie by reducing the score of candidate setpoint schedule 434 based on its greater number of setpoints. As a result, candidate setpoint schedule 436 has the optimized score and would be selected out of all three candidate setpoint schedules 432, 434, and 436. For example, FIG. 40 illustrates the selected setpoint schedule 436 for the upcoming day that includes the three setpoints 454, 456, and 458. The selected setpoint schedule 436 may be applied to control the environmental control system for the upcoming day accordingly.

Figure 41:
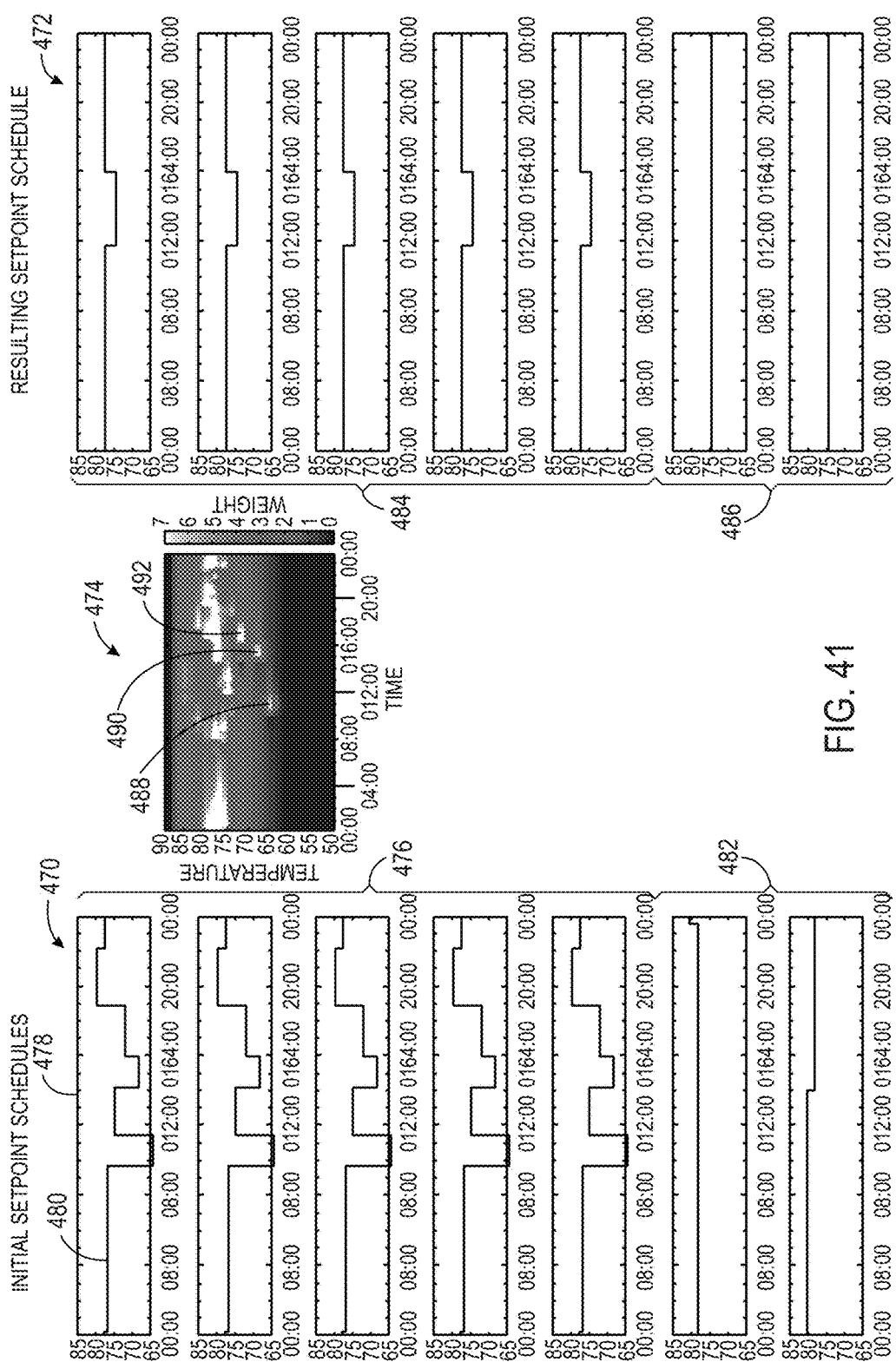
FIG. 41 illustrates an example showing the effect of including an efficiency bonus in a preference function, in accordance with an embodiment.

To further illustrate the efficiency bonus weight, FIG. 41 depicts a comparison of initial setpoint schedules 470 and resulting setpoint schedules 472 selected after being processed through an associated preference function 474 including an efficiency bonus, in accordance with an embodiment. Both setpoint schedules 470 and 472 represent a week of setpoint schedules for each day of the week in an office building. Also, the setpoint schedules 470 and 472 were based on the same user interactions over the same time period.

As may be seen in the setpoint schedules 470, during working hours in the weekday schedules 476, there are numerous setpoints throughout the day, which may be inefficient. Taking the setpoint schedule 478 for Monday, a first setpoint 480 is set to ~77° F. until 10:00 and then the setpoint changes to 65° F. until about 11:30. At 11:30, the setpoint changes to 75° F. until 14:00, where the setpoint changes to 70° F. The setpoint proceeds to be changed three more times throughout the rest of the day. With a total of six setpoint changes, some of which are relatively close to one another, the setpoint schedule 478 runs the environmental control system inefficiently. The setpoint schedules for the other weekdays are identical and not highly efficient. The weekend schedules 482, for when the user is not present in the building, only include one setpoint change each.

In contrast, the weekday schedules 484 of the resulting setpoint schedules 472 only include two setpoint changes. The first setpoint change occurs at 11:45 and lowers the setpoint from ~77° F. to 75° F. and the second setpoint change occurs at 16:00 and raises the setpoint back to ~77° F. Further, the weekend setpoint schedules 486 have zero setpoint changes. Thus, the setpoint schedules 472 selected are much more efficient and smaller than initial setpoint schedules 470.

The preference function 474 shows the weights assigned to each temperature at each time. As previously discussed, a temperature change made by the user may be assigned a high weight (e.g., 5-7) and represented by a very light color. Thus, each setpoint temperature change by the user is depicted in the preference function with the a very light color. For example, setpoint 488 is shown where the user changed the setpoint temperature to 65° F. with a high weight, setpoint 490 is shown where the user changed the setpoint temperature to 70° F. with a high weight, and setpoint 492 is shown where the user changed the setpoint temperature to ~72° F. with a high weight. Although, each setpoint 488, 490, and 492 received high weights, none were used in the selected weekday setpoint schedules 484. This may have been due to the efficiency bonus weight. As previously described, higher efficiency bonus weights are added to more efficient temperatures. Thus, higher efficiency bonus weights were added to the temperatures at the times during the setpoints 488, 490, and 492 that were more efficient. As may be seen, there are other temperatures at the same times as setpoints 488, 490, and 492 that receive similar weights (e.g., same color). Thus, the efficiency bonus weight may act as a "tiebreaker" where two temperatures are similarly weighted by selecting the one that is more efficient. Selecting the setpoints to apply in this way may inhibit onetime setpoint changes from being learned and inhibit numerous setpoints in a selected setpoint schedule. As such, the enhanced automated scheduling may inhibit numerous setpoints changes from being made very close in time to one another as was done in the initial setpoint schedules 270.

This written description uses examples to disclose the techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An electronic device comprising:
   storage containing:
      processor-executable instructions;
      a plurality of preference functions, each of which maps weights indicating likely relative user preferences for a range of possible setpoint temperatures for a range of times of day for a particular day of the week; and
      a current setpoint schedule of temperature setpoints over time; and a processor configured to execute the instructions, wherein the instructions are configured to cause the processor to control an environmental control system based at least in part on the current setpoint schedule, wherein the instructions are configured to cause the processor to determine the current setpoint schedule by:

detecting user behavior occurring on a first day of the week that indicates satisfaction or dissatisfaction with setpoint temperatures of the environmental control system in relation to time of day for the first day of the week;

updating one of the plurality of preference functions that corresponds to the first day of the week based at least in part on the detected user behavior;

blending the weights of the preference function corresponding to the first day of the week with the weights of other of the plurality of preference functions to obtain a first composite preference function; and determining the current setpoint schedule at least partly by comparing a plurality of candidate setpoint schedules against the weights of the first composite preference function and selecting the candidate setpoint schedule that has a highest score against the weights of the first composite preference function or has a highest score after one or more scoring modifications, or both.

2. The electronic device of claim 1, wherein the plurality of preference functions contained in the storage comprise a first set of preference functions associated with a first mode of the environmental control system and a second set of preference functions associated with a second mode of the environmental control system.

3. The electronic device of claim 2, wherein the first mode comprises a cooling mode and the second mode comprises a heating mode.

4. The electronic device of claim 1, wherein the instructions cause the processor to determine the current setpoint schedule by determining a week composite preference function by:

blending the weights of the preference function corresponding to a second day of the week with the weights of other of the plurality of preference functions to obtain a second composite preference function;

blending the weights of the preference function corresponding to a third day of the week with the weights of other of the plurality of preference functions to obtain a third composite preference function;

blending the weights of the preference function corresponding to a fourth day of the week with the weights of other of the plurality of preference functions to obtain a fourth composite preference function;

blending the weights of the preference function corresponding to a fifth day of the week with the weights of other of the plurality of preference functions to obtain a fifth composite preference function;

blending the weights of the preference function corresponding to a sixth day of the week with the weights of other of the plurality of preference functions to obtain a sixth composite preference function;

blending the weights of the preference function corresponding to a seventh day of the week with the weights of other of the plurality of preference functions to obtain a seventh composite preference function; and appending the second composite preference function to the first composite preference function, appending the third composite preference function to the second composite preference function, appending the fourth composite preference function to the third composite preference function, appending the fifth composite preference function to the fourth composite preference function, appending the sixth composite preference function to the fifth composite preference function, and appending the seventh composite preference function to the sixth composite preference function to obtain the week composite preference function;

wherein the current setpoint schedule is determined at least partly by comparing the plurality of candidate setpoint schedules against the weights of the week composite preference function and selecting the candidate setpoint schedule that has the highest score against the weights of the week composite preference function or has the highest score after one or more scoring modifications, or both.

5. The electronic device of claim 4, wherein the instructions cause the processor to determine the current setpoint schedule by determining the week composite preference function by:

blending the weights of the preference function corresponding to the first day of the week, wherein the first day of the week corresponds to Monday, with an average of the weights of all of the plurality of preference functions that correspond to weekdays to obtain the first composite preference function;

blending the weights of the preference function corresponding to the second day of the week, wherein the second day of the week corresponds to Tuesday, with an average of the weights of all of the plurality of preference functions that correspond to weekdays to obtain the second composite preference function;

blending the weights of the preference function corresponding to the third day of the week, wherein the third day of the week corresponds to Wednesday, with an average of the weights of all of the plurality of preference functions that correspond to weekdays to obtain the third composite preference function;

blending the weights of the preference function corresponding to the fourth day of the week, wherein the fourth day of the week corresponds to Thursday, with an average of the weights of all of the plurality of preference functions that correspond to weekdays to obtain the fourth composite preference function;

blending the weights of the preference function corresponding to the fifth day of the week, wherein the fifth day of the week corresponds to Friday, with an average of the weights of all of the plurality of preference functions that correspond to weekdays to obtain the first composite preference function;

blending the weights of the preference function corresponding to the sixth day of the week, wherein the sixth day of the week corresponds to Saturday, with an average of the weights of all of the plurality of preference functions that correspond to weekend days to obtain the sixth composite preference function; and blending the weights of the preference function corresponding to the seventh day of the week, wherein the seventh day of the week corresponds to Sunday, with an average of the weights of all of the plurality of preference functions that correspond to weekend days to obtain the seventh composite preference function.

6. The electronic device of claim 1, wherein the preference function that corresponds to the first day of the week is decayed across all of the weights of the preference function that corresponds to the first day of the week by a percentage before being updated based at least in part on the detected user behavior.

7. The electronic device of claim 1, wherein the current setpoint schedule comprises a setpoint schedule for at least the next day.

8. The electronic device of claim 1, wherein the current setpoint schedule comprises a setpoint schedule for at least the next week.

9. The electronic device of claim 1, wherein the instructions are configured to cause the processor to determine the current setpoint schedule at least once each day.

10. The electronic device of claim 1, wherein the instructions are configured to cause the processor to determine the current setpoint schedule only when a threshold amount of user behavior has been detected.

11. The electronic device of claim 1, wherein the instructions are configured to cause the processor to determine the current setpoint schedule only when the processor has controlled the environmental control system in a first mode for at least a first threshold amount of time or has controlled the environmental control system in a second mode for a second threshold amount of time.

12. The electronic device of claim 11, wherein the first threshold amount of time comprises more than 90% of the previous day.

13. An electronic device comprising:
    storage containing:
        processor-executable instructions;
        a preference function that maps weights indicating likely relative user preferences for a range of possible setpoint temperatures for a range of times of day; and
        a current setpoint schedule of temperature setpoints over time; and
    a processor configured to execute the instructions, wherein the instructions are configured to cause the processor to control an environmental control system based at least in part on the current setpoint schedule, wherein the instructions are configured to cause the processor to determine the current setpoint schedule based on the preference function by:
        detecting user behavior that indicates satisfaction or dissatisfaction with setpoint temperatures of the environmental control system in relation to time of day;
        updating the preference function based on the detected user behavior:
            according to a first method for an initial period of time beginning when the processor first determined the current setpoint schedule based on the preference function; and
            according to a second method for a subsequent period of time after the initial period of time;
            wherein the first method prioritizes new behavior over older behavior more than the second method;
        determining the current setpoint schedule at least partly by comparing a plurality of candidate setpoint schedules against the weights of the preference function and selecting the candidate setpoint schedule that has a highest score against the weights of the preference function or has a highest score after one or more scoring modifications, or both.

14. The electronic device of claim 13, wherein the first method of updating the preference function comprises adding a first weight based on tracked behavior that indicates satisfaction and the second method of updating the preference function comprises adding a second weight based on tracked behavior that indicates satisfaction, wherein the first weight is greater than the second weight.

15. The electronic device of claim 13, wherein the first method of updating the preference function comprises decaying all of the weights of the preference function to a greater degree than the second method before otherwise adjusting the preference function.

16. The electronic device of claim 13, wherein the first method of updating the preference function comprises subtracting a first weight based on tracked behavior that indicates dissatisfaction and the second method of updating the preference function comprises subtracting a second weight based on tracked behavior that indicates dissatisfaction, wherein the first weight is greater than the second weight.

17. A method comprising:
    using a first electronic device or a second electronic device to detect user behavior that indicates satisfaction or dissatisfaction with device settings of the first electronic device having a range of possible values in relation to a variable;
    based at least in part on the detected user behavior, using the first electronic device or the second electronic device to determine a preference function that maps weights indicating likely user preferences for the range of possible values of the device setting in relation to a range of values of the variable;
    using the first electronic device or the second electronic device to generate a first automated device control schedule configured to control the first electronic device in relation to the variable by:
        determining a plurality of candidate automated device control schedules;
        comparing each of the plurality of candidate automated device control schedules to the preference function to obtain a first score, wherein the candidate automated device control schedule that best fits the weights of the preference function has the highest first score;
        modifying or not modifying the first score of each of the plurality of candidate automated device control schedules to obtain a second score; and
        selecting one of the plurality of candidate automated device control schedules with the highest second score to be the first automated device control schedule; and
    controlling the first electronic device according to the first automated device control schedule.

18. The method of claim 17, wherein the first electronic device comprises a thermostat, the device setting comprises a setpoint temperature, and the variable comprises a time of day.

19. The method of claim 17, wherein the first electronic device comprises a remotely controlled light, the device setting comprises a lighting level or hue, and the variable comprises a time of day.

20. The method of claim 17, wherein the first electronic device comprises a remotely controlled light, the device setting comprises a lighting level or hue, and the variable comprises a type of content being played on a media device near the remotely controlled light.

21. The method of claim 17, wherein the first electronic device comprises a variable-height desk, the device setting comprises a desk height, and the variable comprises a time of day.

22. The method of claim 17, wherein the preference function comprises a scalar function linking the weights indicating likely user preferences to the range of possible values of the device settings and the range of values of the variable.

23. An electronic device comprising:
 storage containing:
  processor-executable instructions; and
  a preference function that maps weights indicating likely user preferences for the range of possible values of a device setting in relation to a range of values of a variable; and
  a current automated device control schedule configured to control the device setting of the electronic device in relation to the variable; and
 a processor configured to execute the instructions, wherein the instructions are configured to cause the processor to determine the current automated device control schedule based on the preference function by:
  detecting user behavior that indicates satisfaction or dissatisfaction with one or more values of the device setting in relation to the variable;
  updating the preference function based on the detected user behavior; and
  determining the current automated device control schedule at least partly by comparing a plurality of candidate device control schedules against the weights of the preference function and selecting the candidate automated device control schedule that has a highest score against the weights of the preference function or has a highest score after one or more scoring modifications, or both.

24. The electronic device of claim 23, wherein the electronic device comprises a component of a smart lighting system, the device setting comprises a lighting level, and the variable comprises a time of day.

25. The electronic device of claim 23, wherein the variable comprises a type of content being played on a media-playing device.

26. The electronic device of claim 23, wherein the electronic device comprises a variable-height desk, the device setting comprises a desk height, and the variable comprises a time of day.

* * * * *